United States Patent
Ang et al.

(10) Patent No.: US 11,277,235 B2
(45) Date of Patent: Mar. 15, 2022

(54) TECHNIQUES FOR MULTIPLEXING OR CASCADING CONTROL INFORMATION AND DATA WITHIN A TRANSMISSION TIME INTERVAL

(71) Applicant: QUALCOMM Incorporated, San Diego, CA (US)

(72) Inventors: Peter Pui Lok Ang, San Diego, CA (US); Tao Luo, San Diego, CA (US); Tingfang Ji, San Diego, CA (US); Jing Jiang, San Diego, CA (US); Saurabha Rangrao Tavildar, Jersey City, NJ (US); Yang Yang, San Diego, CA (US); Jamie Menjay Lin, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/351,164

(22) Filed: Nov. 14, 2016

(65) Prior Publication Data
US 2017/0149543 A1 May 25, 2017

Related U.S. Application Data

(60) Provisional application No. 62/265,337, filed on Dec. 9, 2015, provisional application No. 62/259,010, filed on Nov. 23, 2015.

(51) Int. Cl.
*H04L 5/00* (2006.01)
*H04W 72/04* (2009.01)
*H04W 88/08* (2009.01)

(52) U.S. Cl.
CPC .......... *H04L 5/0048* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

| 8,363,606 B2 | 1/2013 | Montojo et al. |
| 9,276,722 B2 | 3/2016 | Gaal et al. |

(Continued)

FOREIGN PATENT DOCUMENTS

| CN | 101060477 A | 10/2007 |
| CN | 102883368 A | 1/2013 |

(Continued)

OTHER PUBLICATIONS

ISA/EP, International Search Report and Written Opinion of the International Searching Authority, Int'l Application No. PCT/US2016/062085, dated Feb. 13, 2017, European Patent Office, Rijswijk, NL, 11 pgs.

(Continued)

*Primary Examiner* — Gregory B Sefcheck
*Assistant Examiner* — Suk Jin Kang
(74) *Attorney, Agent, or Firm* — Holland & Hart LLP

(57) ABSTRACT

Techniques are described for wireless communication. One method includes identifying a transmission time interval (TTI)-level control region, where the cascaded control region includes a TTI-level common control region and a TTI-level UE-specific control region, and where the TTI-level common control region has a pointer to a location of the TTI-level UE-specific control region; and demodulating at least one of the TTI-level common control region and the TTI-level UE-specific control region. Some techniques enable control information in a first region to point to a second region that includes additional control information. Some techniques enable two-stages of control. Semi-persistent scheduling/prescheduling control may be configured to (Continued)

cause an entity to refrain from demodulating one of the stages of control.

27 Claims, 28 Drawing Sheets

(52) U.S. Cl.
CPC .......... *H04L 5/0091* (2013.01); *H04W 72/04* (2013.01); *H04W 88/08* (2013.01)

(56) References Cited

U.S. PATENT DOCUMENTS

| | | | |
|---|---|---|---|
| 2009/0088148 A1* | 4/2009 | Chung | H04L 5/0007 455/423 |
| 2010/0034303 A1* | 2/2010 | Damnjanovic | H04L 5/003 375/260 |
| 2010/0120442 A1* | 5/2010 | Zhuang | H04L 5/0032 455/450 |
| 2010/0260164 A1* | 10/2010 | Moon | H04L 5/0007 370/345 |
| 2011/0021228 A1* | 1/2011 | Kim | H04L 5/0091 455/507 |
| 2011/0038275 A1* | 2/2011 | Kim | H04W 48/16 370/252 |
| 2011/0077039 A1* | 3/2011 | Lee | H04L 5/0007 455/507 |
| 2012/0033643 A1* | 2/2012 | Noh | H04L 5/0048 370/335 |
| 2012/0320838 A1* | 12/2012 | Yang | H04L 5/0053 370/329 |
| 2013/0195067 A1* | 8/2013 | Khoshnevis | H04L 5/0094 370/330 |
| 2013/0265944 A1* | 10/2013 | Frenne | H04L 1/0031 370/329 |
| 2013/0294247 A1* | 11/2013 | Zhu | H04W 72/0486 370/235 |
| 2014/0078980 A1* | 3/2014 | Frenne | H04L 5/0007 370/329 |
| 2014/0105154 A1* | 4/2014 | Yang | H04L 5/0053 370/329 |
| 2014/0105164 A1* | 4/2014 | Moulsley | H04W 72/1289 370/329 |
| 2014/0185578 A1* | 7/2014 | Park | H04L 5/0053 370/329 |
| 2014/0219224 A1* | 8/2014 | Lee | H04L 5/0007 370/329 |
| 2014/0328277 A1* | 11/2014 | Xiao | H04B 7/024 370/329 |
| 2014/0348091 A1* | 11/2014 | Seo | H04L 5/003 370/329 |
| 2015/0003360 A1* | 1/2015 | Liu | H04L 5/001 370/329 |
| 2015/0071194 A1* | 3/2015 | Kim | H04L 5/0048 370/329 |
| 2015/0195069 A1* | 7/2015 | Yi | H04W 4/70 370/329 |
| 2015/0304017 A1* | 10/2015 | Zhuang | H04B 7/15507 370/315 |
| 2015/0365928 A1* | 12/2015 | Lee | H04L 1/1671 370/329 |
| 2016/0029363 A1* | 1/2016 | Kim | H04L 5/0007 370/329 |
| 2016/0135182 A1* | 5/2016 | Jung | H04L 5/0064 370/336 |
| 2016/0143008 A1* | 5/2016 | Lee | H04W 72/042 370/336 |
| 2016/0205664 A1* | 7/2016 | Zhang | H04L 5/00 370/312 |
| 2016/0316462 A1* | 10/2016 | Kim | H04L 5/001 |
| 2016/0353436 A1* | 12/2016 | Au | H04L 5/0007 |
| 2017/0094643 A1* | 3/2017 | Park | H04W 24/00 |
| 2017/0094648 A1* | 3/2017 | Yang | H04L 1/0046 |
| 2017/0142712 A1* | 5/2017 | Lee | H04W 72/0446 |
| 2017/0171842 A1* | 6/2017 | You | H04L 5/0048 |
| 2017/0181137 A1* | 6/2017 | Yang | H04W 72/02 |
| 2017/0195999 A1* | 7/2017 | Feng | H04L 5/0053 |
| 2017/0303171 A1* | 10/2017 | Jonsson | H04W 36/0055 |
| 2017/0303250 A1* | 10/2017 | Shao | H04W 72/042 |
| 2017/0359810 A1* | 12/2017 | Kuchibhotla | H04L 5/0007 |
| 2017/0367080 A1* | 12/2017 | Yang | H04L 5/0053 |
| 2018/0007664 A1* | 1/2018 | Gho | H04W 72/042 |
| 2018/0049165 A1* | 2/2018 | Byun | H04W 72/042 |
| 2018/0131598 A1* | 5/2018 | Suzuki | H04L 5/001 |
| 2018/0152930 A1* | 5/2018 | Moulsley | H04L 5/0053 |
| 2018/0227104 A1* | 8/2018 | Han | H04L 5/0035 |
| 2018/0234962 A1* | 8/2018 | Kim | H04L 5/0007 |
| 2018/0242318 A1* | 8/2018 | Christensson | H04W 52/0206 |
| 2018/0270854 A1* | 9/2018 | Lee | H04L 1/00 |
| 2019/0288824 A1* | 9/2019 | Chavva | H04L 5/14 |
| 2019/0335459 A1* | 10/2019 | Zheng | H04W 72/0406 |
| 2019/0357240 A1* | 11/2019 | Kim | H04W 72/1263 |
| 2020/0404710 A1* | 12/2020 | Bhorkar | H04W 28/065 |

FOREIGN PATENT DOCUMENTS

| | | |
|---|---|---|
| CN | 102893684 A | 1/2013 |
| EP | 1953943 A2 | 8/2008 |
| EP | 2705626 B1 | 4/2015 |
| WO | WO-2008030798 A2 | 3/2008 |
| WO | WO-2011140384 A2 | 11/2011 |
| WO | WO-2013008958 A1 * | 1/2013 .......... H04L 1/0046 |

OTHER PUBLICATIONS

Nokia Siemens Networks: "On DL Backhaul Control Channel Design Aspects", 3GPP TSG-RAN Meeting #60bis, R1-101915, 3GPP, hybrid AND TDM AND FDM, Apr. 5, 2010, 5 pages.

* cited by examiner

TECHNIQUES FOR MULTIPLEXING OR CASCADING CONTROL INFORMATION AND DATA WITHIN A TRANSMISSION TIME INTERVAL

CROSS REFERENCES

The present application for patent claims priority to U.S. Provisional Patent Application No. 62/259,010 by ANG, et al., entitled "TECHNIQUES FOR MULTIPLEXING OR CASCADING CONTROL INFORMATION AND DATA WITHIN A TRANSMISSION TIME INTERVAL," filed Nov. 23, 2015, and to U.S. Provisional Patent Application No. 62/265,337, by ANG, et al., entitled "RESOURCE BLOCK WITH EMBEDDED CONTROL INFORMATION", filed Dec. 9, 2015, assigned to the assignee hereof. Both applications are incorporated herein by reference.

INTRODUCTION

The present disclosure, for example, relates to wireless communication systems, and more particularly to techniques for multiplexing or cascading control information and data within a transmission time interval (TTI).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (radio heads (RHs)) in communication with a number of access node controllers (ANCs), where a set of one or more radio heads, in communication with an ANC, defines an eNB. A base station or radio head may communicate with a set of UEs on downlink channels (e.g., for transmissions from a base station or radio head to a UE) and uplink channels (e.g., for transmissions from a UE to a base station or radio head).

Control information and data transmitted on a downlink channel in a LTE/LTE-A network may be multiplexed using Time Division Multiplexing (TDM) techniques, with control information transmitted on a set of time resources allocated to a physical downlink control channel (PDCCH) at the beginning of a subframe. Data may be transmitted following the PDCCH. Alternatively, control information and data transmitted on a downlink channel in a LTE/LTE-A network may be multiplexed using Frequency Division Multiplexing (FDM) techniques, with control information transmitted within a narrow band of frequency resources allocated to an enhanced PDCCH (ePDCCH). The ePDCCH may span the entire width (or duration) of a subframe, as may data transmitted on other frequency resources of the subframe. TDM techniques and FDM techniques are each associated with advantages and disadvantages.

SUMMARY

A method of wireless communication at a user equipment (UE) is described. The method may include identifying a transmission time interval (TTI) comprising a cascaded control region, the cascaded control region comprising a TTI-level common control region and a TTI-level UE-specific control region, the TTI-level common control region having a pointer to a location of the TTI-level UE-specific control region and demodulating at least one of the TTI-level common control region or the TTI-level UE-specific control region.

An apparatus for wireless communication at a user equipment (UE) is described. The apparatus may include means for identifying a transmission time interval (TTI) comprising a cascaded control region, the cascaded control region comprising a TTI-level common control region and a TTI-level UE-specific control region, the TTI-level common control region having a pointer to a location of the TTI-level UE-specific control region and means for demodulating at least one of the TTI-level common control region or the TTI-level UE-specific control region.

Another apparatus for wireless communication is described. The apparatus may include a processor, memory in electronic communication with the processor, and instructions stored in the memory. The instructions may be operable to cause the processor to identify a transmission time interval (TTI) comprising a cascaded control region, the cascaded control region comprising a TTI-level common control region and a TTI-level UE-specific control region, the TTI-level common control region having a pointer to a location of the TTI-level UE-specific control region and demodulate at least one of the TTI-level common control region or the TTI-level UE-specific control region.

A non-transitory computer readable medium for wireless communication at a user equipment (UE) is described. The non-transitory computer-readable medium may include instructions operable to cause a processor to identify a transmission time interval (TTI) comprising a cascaded control region, the cascaded control region comprising a TTI-level common control region and a TTI-level UE-specific control region, the TTI-level common control region having a pointer to a location of the TTI-level UE-specific control region and demodulate at least one of the TTI-level common control region or the TTI-level UE-specific control region.

In some examples of the method, apparatus, and non-transitory computer-readable medium described above, the demodulating comprises: demodulating the TTI-level common control region to obtain the pointer. Some examples of the method, apparatus, and non-transitory computer-readable medium described above may further include processes, features, means, or instructions for demodulating the TTI-level UE-specific control region at the location identified by the pointer.

In some examples of the method, apparatus, and non-transitory computer-readable medium described above, the TTI-level common control region comprises resource block (RB) allocation information for the TTI-level UE-specific control region.

Some examples of the method, apparatus, and non-transitory computer-readable medium described above may further include processes, features, means, or instructions for receiving semi-persistent scheduling (SPS) information indicating semi-persistent resources prior to receiving the TTI, the SPS information identifying the location of the TTI-level UE-specific control region.

In some examples of the method, apparatus, and non-transitory computer-readable medium described above, demodulating comprises: refraining from demodulating the TTI-level common control region. Some examples of the method, apparatus, and non-transitory computer-readable medium described above may further include processes, features, means, or instructions for demodulating the TTI-level UE-specific control region.

Some examples of the method, apparatus, and non-transitory computer-readable medium described above may further include processes, features, means, or instructions for tuning to a first frequency range to receive the TTI-level common control region. Some examples of the method, apparatus, and non-transitory computer-readable medium described above may further include processes, features, means, or instructions for tuning to a second frequency range to receive data and the TTI-level UE-specific control region, where in the second frequency range may be different from the first frequency range. Some examples of the method, apparatus, and non-transitory computer-readable medium described above may further include processes, features, means, or instructions for releasing the SPS information based at least in part on the TTI-level UE-specific control region.

Some examples of the method, apparatus, and non-transitory computer-readable medium described above may further include processes, features, means, or instructions for releasing the SPS information may be performed without retuning to the first frequency range.

In some examples of the method, apparatus, and non-transitory computer-readable medium described above, the TTI-level UE-specific control region may be time-division multiplexed with the data and indicates whether to release the SPS information.

Some examples of the method, apparatus, and non-transitory computer-readable medium described above may further include processes, features, means, or instructions for identifying a resource block that includes the TTI-level UE-specific control region. Some examples of the method, apparatus, and non-transitory computer-readable medium described above may further include processes, features, means, or instructions for determining whether the identified resource block may be assigned to the UE based at least in part on the TTI-level UE-specific control region.

In some examples of the method, apparatus, and non-transitory computer-readable medium described above, the determining occurs without decoding the TTI-level common control region.

Some examples of the method, apparatus, and non-transitory computer-readable medium described above may further include processes, features, means, or instructions for performing an error check of the TTI-level UE-specific control region, wherein the determining may be based at least in part on an outcome of the error check.

Some examples of the method, apparatus, and non-transitory computer-readable medium described above may further include processes, features, means, or instructions for decoding a signal comprising a grouped payload and the TTI-level UE-specific control region, wherein the grouped payload comprises a first payload designated to the UE and a second payload designated to another UE. Some examples of the method, apparatus, and non-transitory computer-readable medium described above may further include processes, features, means, or instructions for determining a portion of the signal that includes the second payload based at least in part on the TTI-level UE-specific control region.

Some examples of the method, apparatus, and non-transitory computer-readable medium described above may further include processes, features, means, or instructions for identifying and demodulating broadcast control information received as unicast information in the TTI-level UE-specific control region.

In some examples of the method, apparatus, and non-transitory computer-readable medium described above, the TTI-level common control region may be located at an intersection of a first subset of time resources of the TTI and a first subset of frequency resources of the TTI, and wherein the TTI-level common control region and the TTI-level UE-specific control region may be non-overlapping.

Some examples of the method, apparatus, and non-transitory computer-readable medium described above may further include processes, features, means, or instructions for receiving a first demodulation reference signal (DMRS) within the cascaded control region. Some examples of the method, apparatus, and non-transitory computer-readable medium described above may further include processes, features, means, or instructions for demodulating the TTI-level common control region based at least in part on the first DMRS.

Some examples of the method, apparatus, and non-transitory computer-readable medium described above may further include processes, features, means, or instructions for determining the cascaded control region comprises an incoming data assignment for the UE. Some examples of the method, apparatus, and non-transitory computer-readable medium described above may further include processes, features, means, or instructions for demodulating a second TTI-level UE-specific control region based on the first DMRS, the second TTI-level UE-specific control region occupying the first subset of frequency resources following the cascaded control region.

Some examples of the method, apparatus, and non-transitory computer-readable medium described above may further include processes, features, means, or instructions for demodulating, based at least in part on a second DMRS received in a second TTI, at least one of a FDM control region or data region in the second TTI.

Some examples of the method, apparatus, and non-transitory computer-readable medium described above may further include processes, features, means, or instructions for demodulating a second cascaded control region at an intersection of a second subset of time resources within a second TTI and a second subset of frequency resources within the second TTI. Some examples of the method, apparatus, and non-transitory computer-readable medium described above may further include processes, features, means, or instructions for determining, from a second TTI-level common control region received in the second cascaded control region, that the second TTI does not contain a transmission for the UE.

Some examples of the method, apparatus, and non-transitory computer-readable medium described above may further include processes, features, means, or instructions for entering a microsleep for a remainder of the second TTI upon determining that the second TTI does not contain a transmission for the UE.

A method of wireless communication at a user equipment (UE) is described. The method may include identifying a first transmission time interval (TTI)-level control region, wherein the first TTI-level control region is located at an intersection of a first subset of time resources within a first TTI and a first subset of frequency resources within the first TTI, demodulating the identified first TTI-level control region, identifying, from a first set of control information received in the first TTI-level control region, a location of a first UE-specific region within the first TTI, wherein the first TTI-level control region and the first UE-specific region are non-overlapping, and demodulating the identified first UE-specific region.

An apparatus for wireless communication at a user equipment (UE) is described. The apparatus may include means for identifying a first transmission time interval (TTI)-level control region, wherein the first TTI-level control region is located at an intersection of a first subset of time resources within a first TTI and a first subset of frequency resources within the first TTI, means for demodulating the identified first TTI-level control region, means for identifying, from a first set of control information received in the first TTI-level control region, a location of a first UE-specific region within the first TTI, wherein the first TTI-level control region and the first UE-specific region are non-overlapping, and means for demodulating the identified first UE-specific region.

Another apparatus for wireless communication is described. The apparatus may include a processor, memory in electronic communication with the processor, and instructions stored in the memory. The instructions may be operable to cause the processor to identify a first transmission time interval (TTI)-level control region, wherein the first TTI-level control region is located at an intersection of a first subset of time resources within a first TTI and a first subset of frequency resources within the first TTI, demodulate the identified first TTI-level control region, identify, from a first set of control information received in the first TTI-level control region, a location of a first UE-specific region within the first TTI, wherein the first TTI-level control region and the first UE-specific region are non-overlapping, and demodulate the identified first UE-specific region.

A non-transitory computer readable medium for wireless communication at a user equipment (UE) is described. The non-transitory computer-readable medium may include instructions operable to cause a processor to identify a first transmission time interval (TTI)-level control region, wherein the first TTI-level control region is located at an intersection of a first subset of time resources within a first TTI and a first subset of frequency resources within the first TTI, demodulate the identified first TTI-level control region, identify, from a first set of control information received in the first TTI-level control region, a location of a first UE-specific region within the first TTI, wherein the first TTI-level control region and the first UE-specific region are non-overlapping, and demodulate the identified first UE-specific region.

Some examples of the method, apparatus, and non-transitory computer-readable medium described above may further include processes, features, means, or instructions for receiving a cell-specific reference signal (CRS) within the first TTI-level control region. Some examples of the method, apparatus, and non-transitory computer-readable medium described above may further include processes, features, means, or instructions for demodulating the first set of control information based at least in part on the CRS.

Some examples of the method, apparatus, and non-transitory computer-readable medium described above may further include processes, features, means, or instructions for receiving a first demodulation reference signal (DMRS) within the first TTI-level control region. Some examples of the method, apparatus, and non-transitory computer-readable medium described above may further include processes, features, means, or instructions for demodulating the first set of control information based at least in part on the first DMRS.

Some examples of the method, apparatus, and non-transitory computer-readable medium described above may further include processes, features, means, or instructions for determining the first TTI-level control region comprises an incoming data assignment for the UE. Some examples of the method, apparatus, and non-transitory computer-readable medium described above may further include processes, features, means, or instructions for demodulating a second UE-specific region based on the first DMRS, the second UE-specific region occupying the first subset of frequency resources following the first TTI-level control region.

Some examples of the method, apparatus, and non-transitory computer-readable medium described above may further include processes, features, means, or instructions for demodulating, based at least in part on a second DMRS received in a second TTI, at least one of a FDM control region or data region in the second TTI.

In some examples of the method, apparatus, and non-transitory computer-readable medium described above, the first UE-specific region comprises a data region.

In some examples of the method, apparatus, and non-transitory computer-readable medium described above, the first UE-specific region comprises a control region.

In some examples of the method, apparatus, and non-transitory computer-readable medium described above, a downlink control information (DCI) payload for the UE may be distributed between the first TTI-level control region and the first UE-specific region.

Some examples of the method, apparatus, and non-transitory computer-readable medium described above may further include processes, features, means, or instructions for demodulating a second TTI-level control region at an intersection of a second subset of time resources within a second TTI and a second subset of frequency resources within the second TTI. Some examples of the method, apparatus, and non-transitory computer-readable medium described above may further include processes, features, means, or instructions for determining, from a second set of control information received in the second TTI-level control region, that the second TTI does not contain a transmission for the UE.

Some examples of the method, apparatus, and non-transitory computer-readable medium described above may further include processes, features, means, or instructions for entering a microsleep for a remainder of the second TTI upon determining that the second TTI does not contain a transmission for the UE.

A method of wireless communication at a base station is described. The method may include identifying a set of user equipment (UEs) to receive information in a first transmission time interval (TTI), generating the first TTI to include a first TTI-level control region comprising control information for each UE in the set of UEs, and a number of UE-specific regions, wherein the first TTI-level control region is located at an intersection of a first subset of time resources within the first TTI and a first subset of frequency resources within the first TTI, wherein the first TTI-level control region and the number of UE-specific regions are non-overlapping, and wherein the first TTI-level control region comprises a pointer to at least one of the UE-specific regions, and transmitting the first TTI.

An apparatus for wireless communication at a base station is described. The apparatus may include means for identifying a set of user equipment (UEs) to receive information in a first transmission time interval (TTI), means for generating the first TTI to include a first TTI-level control region comprising control information for each UE in the set of UEs, and a number of UE-specific regions, wherein the first TTI-level control region is located at an intersection of a first subset of time resources within the first TTI and a first subset of frequency resources within the first TTI, wherein the first TTI-level control region and the number of UE-specific regions are non-overlapping, and wherein the first TTI-level control region comprises a pointer to at least one of the UE-specific regions, and means for transmitting the first TTI.

Another apparatus for wireless communication is described. The apparatus may include a processor, memory in electronic communication with the processor, and instructions stored in the memory. The instructions may be operable to cause the processor to identify a set of user equipment (UEs) to receive information in a first transmission time interval (TTI), generate the first TTI to include a first TTI-level control region comprising control information for each UE in the set of UEs, and a number of UE-specific regions, wherein the first TTI-level control region is located at an intersection of a first subset of time resources within the first TTI and a first subset of frequency resources within the first TTI, wherein the first TTI-level control region and the number of UE-specific regions are non-overlapping, and wherein the first TTI-level control region comprises a pointer to at least one of the UE-specific regions, and transmit the first TTI.

A non-transitory computer readable medium for wireless communication at a base station is described. The non-transitory computer-readable medium may include instructions operable to cause a processor to identify a set of user equipment (UEs) to receive information in a first transmission time interval (TTI), generate the first TTI to include a first TTI-level control region comprising control information for each UE in the set of UEs, and a number of UE-specific regions, wherein the first TTI-level control region is located at an intersection of a first subset of time resources within the first TTI and a first subset of frequency resources within the first TTI, wherein the first TTI-level control region and the number of UE-specific regions are non-overlapping, and wherein the first TTI-level control region comprises a pointer to at least one of the UE-specific regions, and transmit the first TTI.

A method of wireless communication at a base station is described. The method may include identifying a set of user equipment (UEs) to receive information in a first transmission time interval (TTI), generating the first TTI to include a cascaded control region, the cascaded control region comprising a TTI-level common control region and a number of TTI-level UE-specific control regions, the TTI-level common control region having a pointer to a location of each TTI-level UE-specific control region, and transmitting the first TTI.

An apparatus for wireless communication at a base station is described. The apparatus may include means for identifying a set of user equipment (UEs) to receive information in a first transmission time interval (TTI), means for generating the first TTI to include a cascaded control region, the cascaded control region comprising a TTI-level common control region and a number of TTI-level UE-specific control regions, the TTI-level common control region having a pointer to a location of each TTI-level UE-specific control region, and means for transmitting the first TTI.

Another apparatus for wireless communication is described. The apparatus may include a processor, memory in electronic communication with the processor, and instructions stored in the memory. The instructions may be operable to cause the processor to identify a set of user equipment (UEs) to receive information in a first transmission time interval (TTI), generate the first TTI to include a cascaded control region, the cascaded control region comprising a TTI-level common control region and a number of TTI-level UE-specific control regions, the TTI-level common control region having a pointer to a location of each TTI-level UE-specific control region, and transmit the first TTI.

A non-transitory computer readable medium for wireless communication at a base station is described. The non-transitory computer-readable medium may include instructions operable to cause a processor to identify a set of user equipment (UEs) to receive information in a first transmission time interval (TTI), generate the first TTI to include a cascaded control region, the cascaded control region comprising a TTI-level common control region and a number of TTI-level UE-specific control regions, the TTI-level common control region having a pointer to a location of each TTI-level UE-specific control region, and transmit the first TTI.

In some examples of the method, apparatus, and non-transitory computer-readable medium described above, the TTI-level common control region may be located at an intersection of a first subset of time resources and a first subset of frequency resources, and wherein the TTI-level common control region and the number of TTI-level UE-specific control regions may be non-overlapping.

A method of wireless communication at a subordinate entity is described. The method may include tuning to a first frequency range to receive common control information, after establishing a semi-persistent scheduling (SPS) configuration, tuning to a second frequency range to receive data and embedded control information, wherein the second frequency range is different from the first frequency range, and without retuning to the first frequency range, using the embedded control information to determine whether to release the SPS configuration.

An apparatus for wireless communication at a subordinate entity is described. The apparatus may include means for tuning to a first frequency range to receive common control information, means for after establishing a semi-persistent scheduling (SPS) configuration, tuning to a second frequency range to receive data and embedded control information, wherein the second frequency range is different from the first frequency range, and means for without retuning to the first frequency range, using the embedded control information to determine whether to release the SPS configuration.

Another apparatus for wireless communication is described. The apparatus may include a processor, memory in electronic communication with the processor, and instructions stored in the memory. The instructions may be operable to cause the processor to tune to a first frequency range to receive common control information, after establishing a semi-persistent scheduling (SPS) configuration, tuning to a second frequency range to receive data and embedded control information, wherein the second frequency range is different from the first frequency range, and without retuning to the first frequency range, using the embedded control information to determine whether to release the SPS configuration.

A non-transitory computer readable medium for wireless communication at a subordinate entity is described. The non-transitory computer-readable medium may include instructions operable to cause a processor to tune to a first frequency range to receive common control information, after establishing a semi-persistent scheduling (SPS) configuration, tuning to a second frequency range to receive data and embedded control information, wherein the second frequency range is different from the first frequency range, and without retuning to the first frequency range, using the embedded control information to determine whether to release the SPS configuration.

In some examples of the method, apparatus, and non-transitory computer-readable medium described above, the embedded control information may be time-division multiplexed with the data and indicates whether to release the SPS configuration.

A method of wireless communication at a subordinate entity is described. The method may include receiving information comprising a semi-persistent scheduling (SPS) configuration for the subordinate entity, using the SPS configuration, identifying a resource block that includes embedded control information, and without decoding a common control channel, using the embedded control information to confirm whether the resource block is assigned to the subordinate entity.

An apparatus for wireless communication at a subordinate entity is described. The apparatus may include means for receiving information comprising a semi-persistent scheduling (SPS) configuration for the subordinate entity, means for using the SPS configuration, identifying a resource block that includes embedded control information, and means for without decoding a common control channel, using the embedded control information to confirm whether the resource block is assigned to the subordinate entity.

Another apparatus for wireless communication is described. The apparatus may include a processor, memory in electronic communication with the processor, and instructions stored in the memory. The instructions may be operable to cause the processor to receive information comprising a semi-persistent scheduling (SPS) configuration for the subordinate entity, use the SPS configuration, identifying a resource block that includes embedded control information, and without decoding a common control channel, using the embedded control information to confirm whether the resource block is assigned to the subordinate entity.

A non-transitory computer readable medium for wireless communication at a subordinate entity is described. The non-transitory computer-readable medium may include instructions operable to cause a processor to receive information comprising a semi-persistent scheduling (SPS) configuration for the subordinate entity, use the SPS configuration, identifying a resource block that includes embedded control information, and without decoding a common control channel, using the embedded control information to confirm whether the resource block is assigned to the subordinate entity.

In some examples of the method, apparatus, and non-transitory computer-readable medium described above, the using the embedded control information to confirm whether resource block may be assigned to the subordinate entity comprises: performing an error check on the embedded control information. Some examples of the method, apparatus, and non-transitory computer-readable medium described above may further include processes, features, means, or instructions for based on an outcome of the error check, determining whether the resource block may be assigned to the subordinate entity.

A method of wireless communication at a subordinate entity is described. The method may include decoding a signal comprising a grouped payload and embedded control information, wherein the grouped payload comprises a payload designated to the subordinate entity and another payload designated to another subordinate entity and using the embedded control information to determine which portion of the decoded signal includes the payload designated for the subordinate entity.

An apparatus for wireless communication at a subordinate entity is described. The apparatus may include means for decoding a signal comprising a grouped payload and embedded control information, wherein the grouped payload comprises a payload designated to the subordinate entity and another payload designated to another subordinate entity and means for using the embedded control information to determine which portion of the decoded signal includes the payload designated for the subordinate entity.

Another apparatus for wireless communication is described. The apparatus may include a processor, memory in electronic communication with the processor, and instructions stored in the memory. The instructions may be operable to cause the processor to decode a signal comprising a grouped payload and embedded control information, wherein the grouped payload comprises a payload designated to the subordinate entity and another payload designated to another subordinate entity and use the embedded control information to determine which portion of the decoded signal includes the payload designated for the subordinate entity.

A non-transitory computer readable medium for wireless communication at a subordinate entity is described. The non-transitory computer-readable medium may include instructions operable to cause a processor to decode a signal comprising a grouped payload and embedded control information, wherein the grouped payload comprises a payload designated to the subordinate entity and another payload designated to another subordinate entity and use the embedded control information to determine which portion of the decoded signal includes the payload designated for the subordinate entity.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
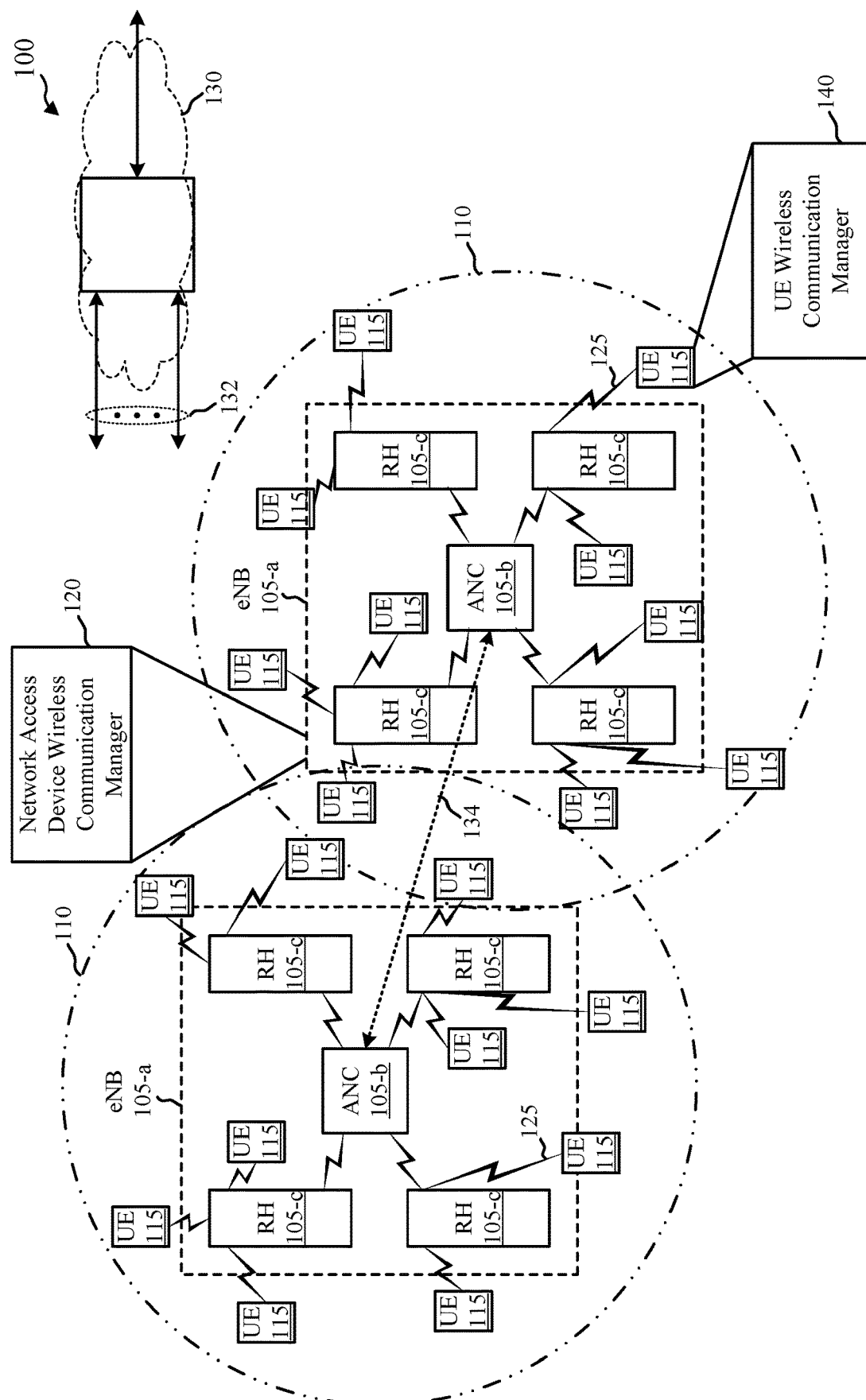
FIG. 1 shows an example of a wireless communication system, in accordance with one or more aspects of the disclosure.

Techniques are described in which control information and data are multiplexed or cascaded within a TTI (e.g., a subframe). In a LTE/LTE-A network, control information and data may be multiplexed within a subframe using TDM techniques (with control information being transmitted on a PDCCH) or FDM techniques (with control information being transmitted on an ePDCCH). A PDCCH is cell-specific reference signal (CRS)-based and may be demodulated based on a CRS common to all UEs, whereas an ePDCCH is demodulation reference signal (DMRS)-based and may be demodulated based on a DMRS specific to a UE or set of UEs. The user (UE) capacity of a PDCCH may be scaled by dynamically adjusting the number of symbol periods (e.g., OFDM symbol periods) allocated to the PDCCH and signaling the number of symbol periods allocated to the PDCCH on a physical control format indicator channel (PCFICH). The transmission of control information on an ePDCCH can provide more flexible user capacity scaling, but at the cost of greater latency (e.g., because control information transmitted on an ePDCCH is spread over time).

5G networks are being designed to support significantly greater bandwidth operations than LTE/LTE-A networks. As previously mentioned, conventional techniques for multiplexing control information and data within a TTI (e.g., a subframe) may not be adequate for some 5G applications. Some of the techniques described in the present disclosure enable the multiplexing of control information and data using hybrid TDM-FDM techniques. The hybrid TDM-FDM techniques may be CRS-based, DMRS-based, or a combination thereof. Some techniques described in the present disclosure enable control information to be cascaded between different tiers, such as a first tier including control information common to all UEs and pointers into a second tier. The second tier may include UE-specific control information. Some techniques described in the present disclosure enable control information in a first region to point to another region that includes additional control information. Some techniques described in the present disclosure two-stages of control with semi-persistent scheduling/prescheduling control for skipping a first control. The techniques may be used individually or in combination to provide, in some examples, more flexible user capacity scaling, support for bandwidth-limited devices, and/or other advantages.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

FIG. 1 illustrates an example of a wireless communication system 100, in accordance with one or more aspects of the disclosure. The wireless communication system 100 may include network access devices 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (radio heads (RHs)) 105-c. In an alternative configuration of the wireless communication system 100, the functionality of an ANC 105-b may be provided by a radio head 105-c or distributed across the radio heads 105-c of an eNB 105-a. In another alternative configuration of the wireless communication system 100, the radio heads 105-c may be replaced with base stations, and the ANCs 105—may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110, and may provide one or more remote transceivers associated with an ANC 105-b. A radio head 105-c may perform many of the functions of a LTE/LTE-A base station. In some examples, an ANC 105-b may be implemented in distributed form, with a portion of the ANC 105-b being provided in each radio head 105-c. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, etc. The wireless communication system 100 may include radio heads 105-c (or base stations or other network access devices) of different types (e.g., macro cell and/or small cell network access devices). The geographic coverage areas 110 of the radio heads 105-c or other network access devices may overlap. In some examples, different eNBs 105-*a* may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. For example, each eNB 105-*a* or radio head 105-*c* may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-*a* and/or radio heads 105-*c* may have similar frame timing, and transmissions from different eNBs 105-*a* and/or radio heads 105-*c* may be approximately aligned in time. For asynchronous operation, the eNBs 105-*a* and/or radio heads 105-*c* may have different frame timings, and transmissions from different eNBs 105-*a* and/or radio heads 105-*c* may not be aligned in time. The techniques described herein may be used for either synchronous or asynchronous operations.

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-*c*, ANC 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of eNBs 105-*a*, radio heads 105-*c*, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a radio head 105-*c*, and/or downlink (DL) channels, from a radio head 105-*c* to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques (e.g., as described with reference to FIG. 2), FDM techniques (e.g., as described with reference to FIG. 3), or hybrid TDM-FDM techniques (e.g., as described with reference to FIG. 4, 5, or 6). In some examples, the control information transmitted during a TTI of a downlink channel may be distributed between different control regions in a cascaded manner (e.g., between a common control region and one or more UE-specific control regions).

One or more of the network access devices 105 (e.g., one or more eNBs 105-*a*) may include a network access device wireless communication manager 120. In some examples, the network access device wireless communication manager 120 may be an example of the wireless communication manager 1120 or 1660 described with reference to FIG. 11 or 16, and may be used to identify a set of UEs 115 to receive information in a TTI, generate the TTI, and transmit the TTI. The TTI may be generated to include a TTI-level control region including control information for each UE 115 in the set of UEs 115, and a number of UE-specific regions. The TTI-level control region may be located at an intersection of a subset of time resources within the TTI and a subset of frequency resources within the TTI. The TTI-level control region and the number of UE-specific regions may be non-overlapping. The TTI-level control region may include a pointer to at least one of the UE-specific regions. In the same or alternative examples, the network access device wireless communication manager 120 may be an example of the wireless communication manager 1420 or 1660 described with reference to FIG. 14 or 16, and may be used to identify a set of UEs 115 to receive information in a TTI, generate the TTI, and transmit the TTI. In these examples, the TTI may be generated to include a cascaded control region including a TTI-level common control region and a number of TTI-level UE-specific control regions, where the TTI-level common control region has a pointer to a location of each TTI-level UE-specific control region.

One or more of the UEs 115 may include a UE wireless communication manager 140. In some examples, the UE wireless communication manager 140 may be an example of the wireless communication manager 920 or 1550 described with reference to FIG. 9, 10, or 15, and may be used to identify and demodulate a TTI-level control region, and identify and demodulate a UE-specific region. The TTI-level control region may be located at an intersection of a subset of time resources within a TTI and a subset of frequency resources within the TTI. The location of the UE-specific region within the TTI may be identified from a set of control information received in the TTI-level control region. The TTI-level control region and the UE-specific region may be non-overlapping. In the same or alternative examples, the UE wireless communication manager 140 may be an example of the wireless communication manager 1220, 1320, or 1550 described with reference to FIG. 12, 13, or 15, and may be used to identify a TTI including a cascaded control region, where the cascaded control region includes a TTI-level common control region and a TTI-level UE-specific control region, and where the TTI-level common control region has a pointer to a location of the TTI-level UE-specific control region. In these examples, the UE wireless communication manager 140 may also be used to demodulate at least one of the TTI-level common control region and the TTI-level UE-specific control region.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, the radio heads 105-*c* and/or UEs 115 may include multiple antennas for employing antenna diversity schemes to improve communication quality and reliability between radio heads 105-*c* and UEs 115. Additionally or alternatively, radio heads 105-*c* and/or UEs 115 may employ multiple-input, multiple-output (MIMO) techniques that may take advantage of multi-path environments to transmit multiple spatial layers carrying the same or different coded data.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
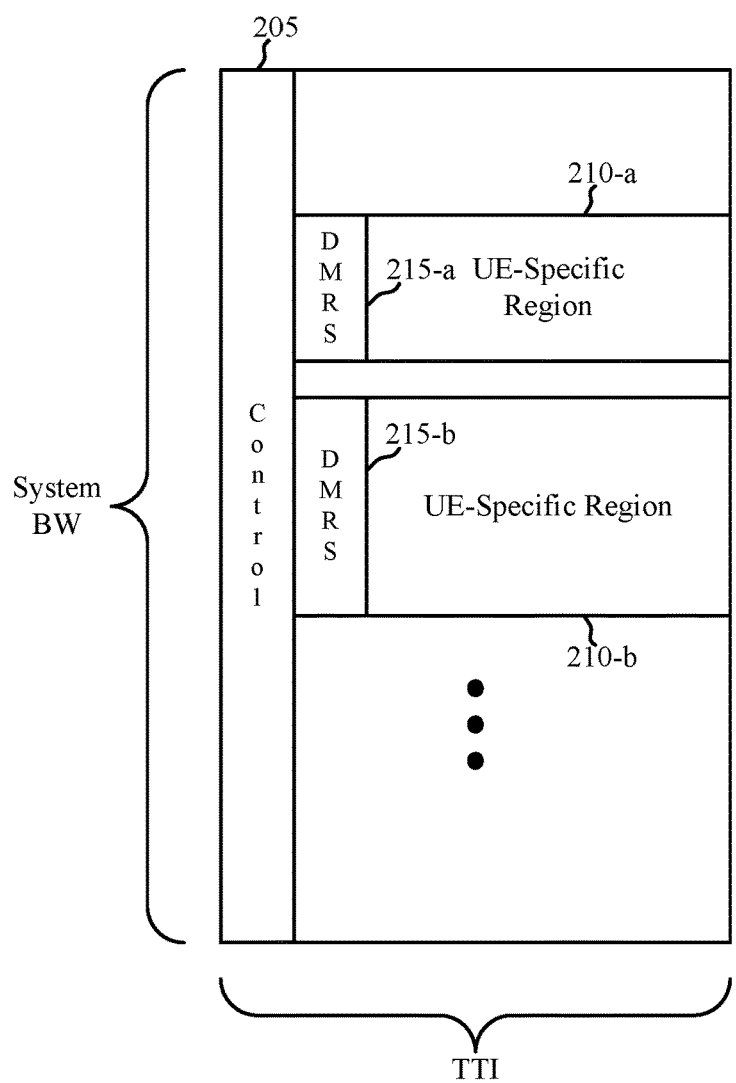
FIG. 2 shows a time-frequency representation of a TTI, in accordance with one or more aspects of the present disclosure.

FIG. 2 shows a time-frequency representation of a TTI 200 (e.g., a subframe), in accordance with one or more aspects of the present disclosure. By way of example, control information and data are multiplexed within the TTI 200 using TTI-level TDM techniques. In some examples, the control information and data multiplexed within the TTI 200 may be transmitted from an ANC to a UE through a radio head, or from a radio head or base station to a UE, as described with reference to FIG. 1.

A control region 205 (e.g., a TTI-level control region) may be transmitted at a beginning of the TTI 200. In some examples, as shown, the control region 205 may be CRS-based and include a CRS usable by UEs to demodulate the control region 205. In these examples, the control region 205 may span a subset of time resources (e.g., 1, 2, or 3 OFDM symbol periods) of the TTI 200 and the entire bandwidth (e.g., a system bandwidth) of the TTI 200. In some other examples (not shown), the control region 205 may be DMRS-based and include a number of DMRS-based control regions, with each DMRS-based control region spanning a different portion of the bandwidth of the TTI 200. In these latter examples, each DMRS may be usable by a set of one or more UEs to demodulate a portion of the control region 205.

The control region 205 may include a set of control information, which control information includes a pointer to each of one or more UE-specific regions 210 within the TTI 200. For example, the control region 205 may include pointers to a first UE-specific region 210-a, a second UE-specific region 210-b, etc. When the control region 205 is CRS-based, the control region 205 may include one or more pointers to one or more UE-specific regions 210. When the control region 205 is DMRS-based, each portion of the control region may include a pointer to one or more UE-specific regions transmitted within the same frequency bandwidth in which the DMRS-based portion of the control region is transmitted. Each UE-specific region 210 may be specific to a single UE or to a group of UEs, depending on configuration (and thus, each pointer to a UE-specific region may be assigned to or coded for a single UE or group of UEs). The control region 205 and UE-specific region(s) 210 may be non-overlapping.

The one or more UE-specific regions 210 may be FDM and DMRS-based, and each UE-specific region 210 may be associated with a DMRS usable to demodulate the UE-specific region 210. For example, when the control region 205 is CRS-based, the first UE-specific region 210-a may include a first DMRS 215-a, and the second UE-specific region 210-b may include a second DMRS 215-b. When the control region 205 is DMRS-based, the DMRSs transmitted in different portions of the control region may be used to demodulate respective UE-specific regions transmitted within the same frequency bandwidth.

The TTI-level TDM configuration of the TTI 200 concentrates control information at the beginning of the TTI, enabling a maximum duration mircosleep for a UE that demodulates the control region 205 (or a portion of the control region 205) and determines the TTI 200 does not include a transmission for the UE. However, when the control region 205 is CRS-based, the TTI 200 does not support the multiplexing of UEs supporting different bandwidths, because every UE receiving information in the TTI 200 has to be able to receive the entire bandwidth of the control region 205. Also, because a UE cannot use the CRS associated with the control region 205 to demodulate a UE-specific region 210, a DMRS for each UE-specific region 210 has to be transmitted in addition to the CRS associated with the control region 205, resulting in significant reference signal (pilot signal) overhead.

Figure 3:
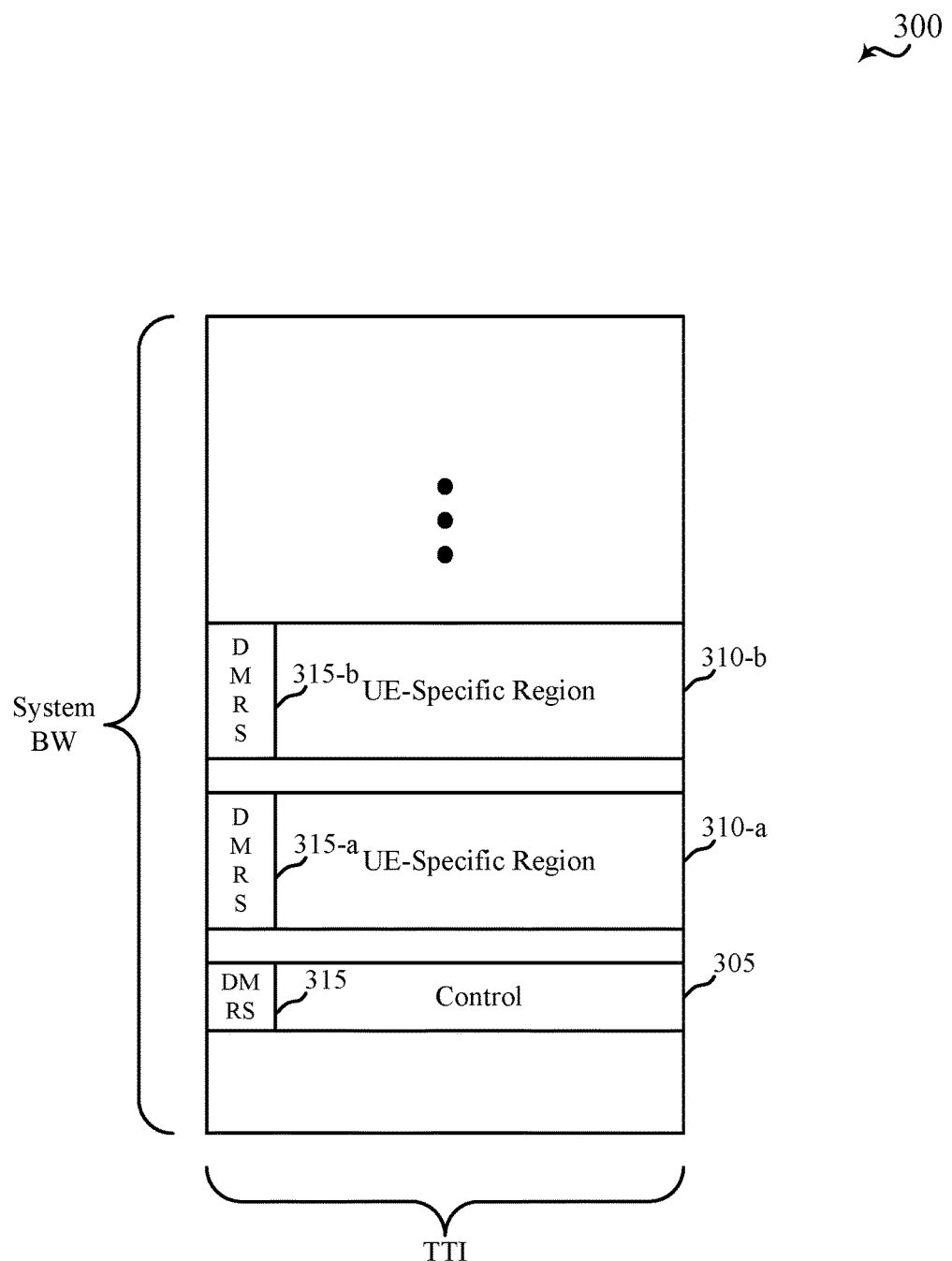
FIG. 3 shows a time-frequency representation of a TTI, in accordance with one or more aspects of the present disclosure.

FIG. 3 shows a time-frequency representation of a TTI 300 (e.g., a subframe), in accordance with one or more aspects of the present disclosure. By way of example, control information and data are multiplexed within the TTI 300 using TTI-level FDM techniques. In some examples, the control information and data multiplexed within the TTI 300 may be transmitted from an ANC to a UE through a radio head, or from a radio head or base station to a UE, as described with reference to FIG. 1.

A control region 305 (e.g., a TTI-level control region) may be transmitted across all time resources of the TTI 300 and within a subset of frequency resources of the TTI 300. In some examples, the control region 305 may be DMRS-based and include a DMRS 315 usable by UEs to demodulate the control region 305. Alternatively, the control region 305 may be CRS-based and include a CRS usable by UEs to demodulate the control region 305. The control region 305 may include a set of control information, which control information includes a pointer to each of one or more UE-specific regions 310 within the TTI 300. For example, the control region 305 may include pointers to a first UE-specific region 310-a, a second UE-specific region 310-b, etc. Each UE-specific region 310 may be specific to a single UE or to a group of UEs, depending on configuration (and thus, each pointer to a UE-specific region may be assigned to or coded for a single UE or group of UEs).

The one or more UE-specific regions 310 may be FDM and DMRS-based, and each UE-specific region 310 may be associated with a DMRS usable to demodulate the UE-specific region 310. For example, the first UE-specific region 310-a may include a second DMRS 315-a and the second UE-specific region 310-b may include a third DMRS 315-b. The control region 305 and UE-specific region(s) 310 may be non-overlapping.

The TTI-level FDM configuration of the TTI 300 can provide scalability for more users (UEs) than the TTI-level TDM configuration of the TTI 200 described with reference to FIG. 2, and may also provide improved power scalability. DMRS-based configurations of the TTI 300 can support UE-specific beamforming. However, for a downlink coordinated multipoint (CoMP) operation in which the transmission points (TPs) have the same cell ID, and thus the same CRS, demodulating the control region 305 may require the DMRS sent by the same TP.

However, latency for UEs decoding the TTI 300 may be poor because the control region 305 may not be decodable (or fully decodable) until the end of the TTI 300, and thus, the data of the TTI 300 may need to be buffered for the duration of the TTI 300. This may delay the transmission of an ACK or NAK for the TTI 300 and make the TTI 300 non-self-contained.

Figure 4:
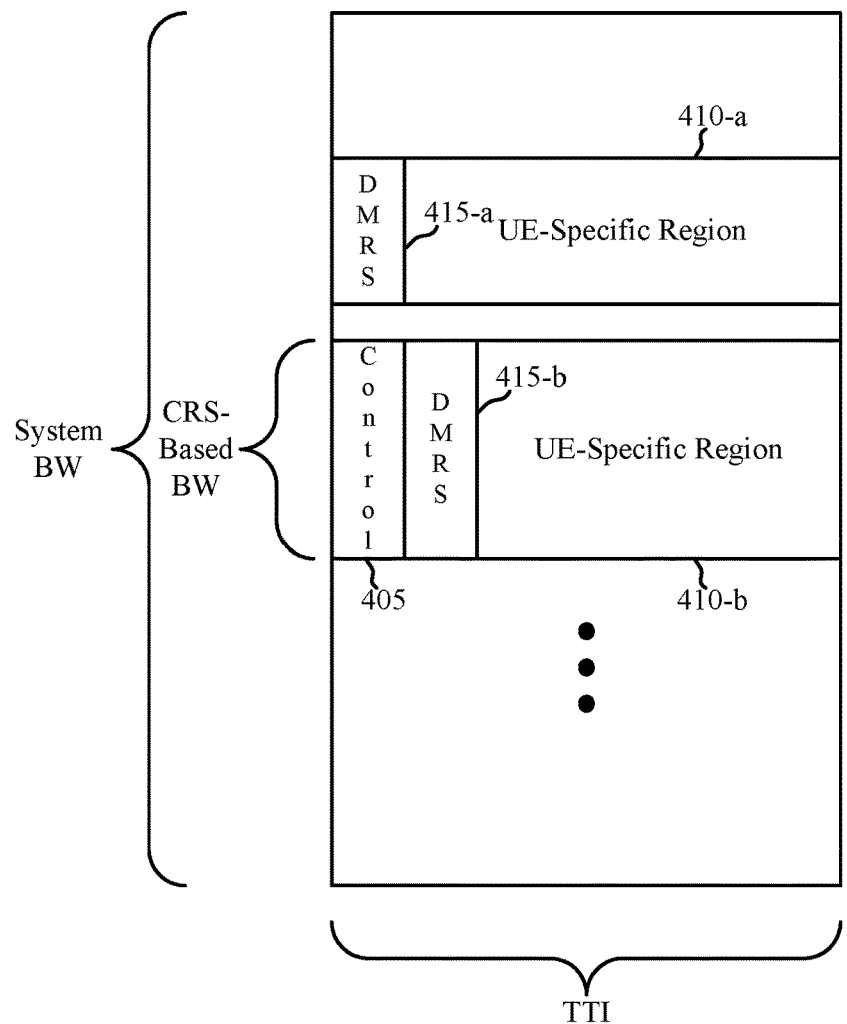
FIG. 4 shows a time-frequency representation of a TTI, in accordance with one or more aspects of the present disclosure.

FIG. 4 shows a time-frequency representation of a TTI 400 (e.g., a subframe), in accordance with one or more aspects of the present disclosure. By way of example, control information and data are multiplexed within the TTI 400 using a combination of TTI-level TDM and FDM techniques, giving the TTI 400 a TTI-level hybrid TDM-FDM configuration. In some examples, the control information and data multiplexed within the TTI 400 may be transmitted from an ANC to a UE through a radio head, or from a radio head or base station to a UE, as described with reference to FIG. 1.

A control region 405 (e.g., a TTI-level control region) may be transmitted at a beginning of the TTI 400. In some examples, as shown, the control region 405 may be CRS-based and include a CRS usable by UEs to demodulate the control region 405. The control region 405 may be located at an intersection of a subset of time resources within the TTI 400 and a subset of frequency resources with the TTI 400. In some examples, the subset of time resources may include 1, 2, or 3 OFDM symbol periods of the TTI 400, and the subset of frequency resources may include a relatively narrow band of frequency resources of the TTI 400 (e.g., a narrow band of frequency resources near the center of a system bandwidth of the TTI 400).

The control region 405 may include a set of control information, which control information includes a pointer to each of one or more UE-specific regions 410 within the TTI 400. For example, the control region 405 may include pointers to a first UE-specific region 410-a, a second UE-specific region 410-b, etc. Each UE-specific region 410 may be specific to a single UE or to a group of UEs, depending on configuration (and thus, each pointer to a UE-specific region may be assigned to or coded for a single UE or group of UEs). The control region 405 and UE-specific region(s) 410 may be non-overlapping. By way of example, the first UE-specific region 410-a may be transmitted on different frequency resources than the control region 405, and the second UE-specific region 410-b may be transmitted on the same frequency resources as the control region 405, but on different time resources. In some examples (not shown), a UE-specific region 410 may be transmitted on frequency resources that partially overlap (or include) the subset of frequency resources on which the control region 405 is transmitted.

The one or more UE-specific regions 410 may be FDM and DMRS-based, and each UE-specific region 410 may be associated with a DMRS usable to demodulate the UE-specific region 410. For example, the first UE-specific region 410-a may include a first DMRS 415-a, and the second UE-specific region 410-b may include a second DMRS 415-b. In some examples, the DMRSs 415 (e.g., the first DMRS 415-a and the second DMRS-b) of the UE-specific regions 410 (e.g., the first UE-specific region 410-a and the second UE-specific region 410-b) may be transmitted using some or all of the subset of time resources used to transmit the control region 405. In some other examples, the DMRSs 415 may be transmitted on a subset of time resources that differ from the subset of time resources used to transmit the control region 405.

The TTI-level hybrid TDM-FDM configuration of the TTI 400 provides some of the benefits of the TTI-level TDM configuration of the TTI 200 (described with reference to FIG. 2), such as lower latency, faster data processing and/or reduced buffering requirements, and an ability of a UE that demodulate the control region 405 and determines the TTI 400 does not include a transmission for the UE to enter a maximum duration microsleep. The TTI-level hybrid TDM-FDM configuration of the TTI 400 also provides some of the benefits of FDM techniques, such as support for bandwidth adaptation (for power saving), and access by UEs with smaller (narrower) bandwidth support. When the subset of frequencies on which the control region 405 is transmitted span a relatively narrow band and the control region 405 is CRS-based, all UEs (even bandwidth limited UEs) may use the CRS and demodulate the control region 405, making the control region 405 a relatively low overhead control region. Although the limited resources of the control region 405 can limit user capacity scaling in time and frequency, this can be mitigated, for example, by moving users to other control schemes when possible (e.g., using FDM control information and data multiplexing), by reducing a DCI payload size in the control region 405 (e.g., using a cascaded control region, as described with reference to FIG. 8 and distributing a DCI payload for a UE between the control region 405 and a UE-specific control region provided in a UE-specific region 410). When using the control region 405 as part of a cascaded control region for one or more UEs, the control region 405 may only carry essential information, such as RB allocation information.

Figure 5:
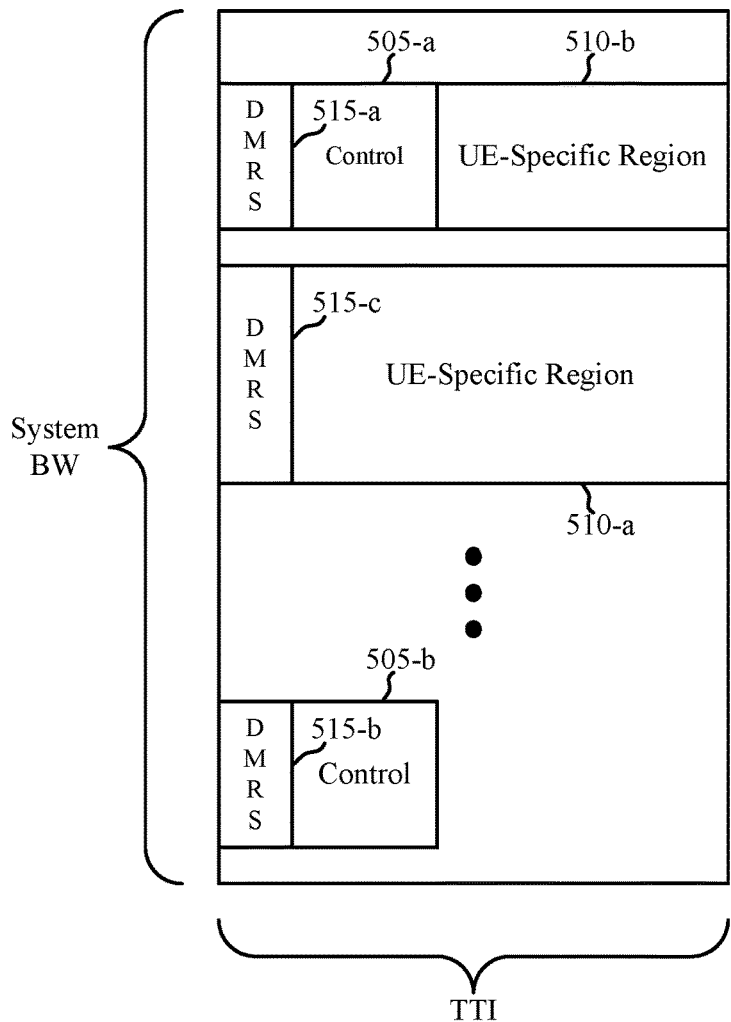
FIG. 5 shows a time-frequency representation of a TTI, in accordance with one or more aspects of the present disclosure.

FIG. 5 shows a time-frequency representation of a TTI 500 (e.g., a subframe), in accordance with one or more aspects of the present disclosure. By way of example, control information and data are multiplexed within the TTI 500 using a combination of TTI-level TDM and FDM techniques, giving the TTI 400 a TTI-level hybrid TDM-FDM configuration. In some examples, the control information and data multiplexed within the TTI 500 may be transmitted from an ANC to a UE through a radio head, or from a radio head or base station to a UE, as described with reference to FIG. 1.

A plurality of control regions 505 (e.g., TTI-level control regions) may be transmitted at a beginning of the TTI 500. In some examples, each control region 505 may be DMRS-based and include a DMRS usable by a set of one or more UEs to demodulate the control region 505. For example, a first control region 505-*a* may include a first DMRS 515-*a* usable to demodulate the first control region 505-*a*, and a second control region 505-*b* may include a second DMRS 515-*b* usable to demodulate the second control region 505-*b*. In some examples, the control regions 505 may span a subset of time resources (e.g., 1, 2, or 3 OFDM symbol periods) of the TTI 500, and different subsets of frequency resources of the TTI 500.

Each of the control regions 505 may include a respective set of control information, which control information may (or may not) include a pointer to at least one UE-specific region 510 within the TTI 500. For example, the first control region 505-*a* may include a pointer to a first UE-specific region 510-*a*. The first control region 505-*a* may also include a pointer to a second UE-specific region 510-*b*, or the second UE-specific region 510-*b* may be known to be associated with the UEs associated with the first control region 505-*a* (e.g., because the first control region 505-*a* and the second UE-specific region 510-*b* are transmitted using the same subset of frequency resources. By way of example, the first control region 505-*a* and the first UE-specific region 510-*a* are shown to be transmitted on different subsets of frequency resources, and the first control region 505-*a* and the second UE-specific region 510-*b* are shown to be transmitted on the same subset of frequency resources (but on different time resources). The second control region 505-*b* may not include a pointer to a UE-specific data region 510, but may include control information such as an uplink grant for a UE. Each UE-specific region 510 may be specific to a single UE or to a group of UEs, depending on configuration (and thus, each pointer to a UE-specific region may be assigned to or coded for a single UE or group of UEs). The control region(s) 505 and UE-specific region(s) 510 may be non-overlapping.

The one or more UE-specific regions 510 may be FDM and DMRS-based. Some UE-specific regions 510 (e.g., the second UE-specific region 510-*b*) may be transmitted on the same subset of frequency resources as an associated control region (e.g., the first control region 505-*a*) and may be demodulated based on a DMRS included in the associated control region. Other UE-specific regions 510 (e.g., the first UE-specific region 510-*a*) may be transmitted on a different subset of frequency resources compared to an associated control region (e.g., the first control region 505-*a*) and may include an additional DMRS 515-*c* usable by a UE to demodulate the UE-specific region. In some examples, a DMRS included in a UE-specific data region may be transmitted using some or all of the time resources used to transmit a corresponding control region for the UE-specific data region (e.g., DMRSs usable by a UE to demodulate the first control region 505-*a* and the first UE-specific region 510-*a* may be transmitted at the same time).

The TTI-level hybrid TDM-FDM configuration of the TTI 500 provides some of the benefits of the TTI-level FDM configuration of the TTI 300 (described with reference to FIG. 2), in addition to some of the benefits of the TTI-level configuration of the TTI 200 (e.g., lower latency, faster data processing and/or reduced buffering requirements, and an ability of a UE that demodulates a control region 505 and determines the TTI 500 does not include a transmission for the UE to enter a maximum duration microsleep. The TTI-level TDM-FDM configuration of the TTI 500 also enables bandwidth adaptation for power saving, where a control region transmitted on a first subset of frequency resources points to a UE-specific region transmitted on a second subset of frequency resources. However, the frequency gap between the first and second subsets of frequency resources may need to be restricted to enable compatibility with bandwidth limited UEs.

A UE or group of UEs may be assigned a control region 505 (or control resources) to monitor for downlink assignments or uplink grants. Broadcast control information may be transmitted as part of a UE-specific region 510 or in a broadcast-specific control region 505.

In some examples, the subset of frequency resources allocated to a control region 505 may be used, following the control region 505, to transmit a UE-specific region 510. In some examples, a control region 505 and UE-specific region 510 that share the same subset of frequency resources may carry control information (e.g., in the control region 505 or UE-specific region 510) and/or data (e.g., in the UE-specific region 510) for the same UE or set of UEs. In some other examples, a control region 505 and UE-specific region 510 that share the same subset of frequency resources may carry control information and/or data for different UEs or sets of UEs. When a control region 505 and UE-specific region 510 share the same subset of frequency resources but carry control information and/or data for different UEs or sets of UEs, a first DMRS may be included in the control region 505 and used by a first UE or first set of UEs to demodulate the control region 505, and a second DMRS may be included in the UE-specific region 510 and used by a second UE or second set of UEs to demodulate the UE-specific region 510.

When a control region 505 occupies just some of the time resources of a resource block (RB) (e.g., 1, 2, or 3 OFDM symbol periods of the RB), and the RB contains a downlink assignment for a set of one or more UEs, the remaining time resources (e.g., OFDM symbol periods) of the RB may be used to transmit data (or additional control information) to the set of one or more UEs. The remaining OFDM symbol periods may alternatively be used for other purposes. When a control region 505 occupies just some of the time resources of a RB, and the RB contains an uplink grant for a UE, without a downlink assignment, the remaining time resources (e.g., OFDM symbol periods) of the RB may be allocated to one or more other UEs, to avoid wasting resources of the RB. However, when allocating the remaining OFDM symbol periods of the RB to one or more other UEs, a second DMRS may need to be transmitted during the RB, since DMRSs are UE-specific. To improve the usage of RBs without incurring the overhead of transmitting two DMRSs within a RB, uplink grants may be transmitted in TTIs having CRS-based control regions, if available (e.g., uplink grants may be transmitted in a TTI such as the TTI 400 described with reference to FIG. 4). In some examples, an intra-TTI boundary may be defined within a RB, to facilitate allocation of different portions of the RB to different UEs or sets of UEs. In some other examples, a control region 505 may include time-critical DCI, and the remaining time resources of a RB in which the control region 505 is transmitted may include non-time-critical DCI (e.g., a transmit power control (TPC) command).

Figure 6:
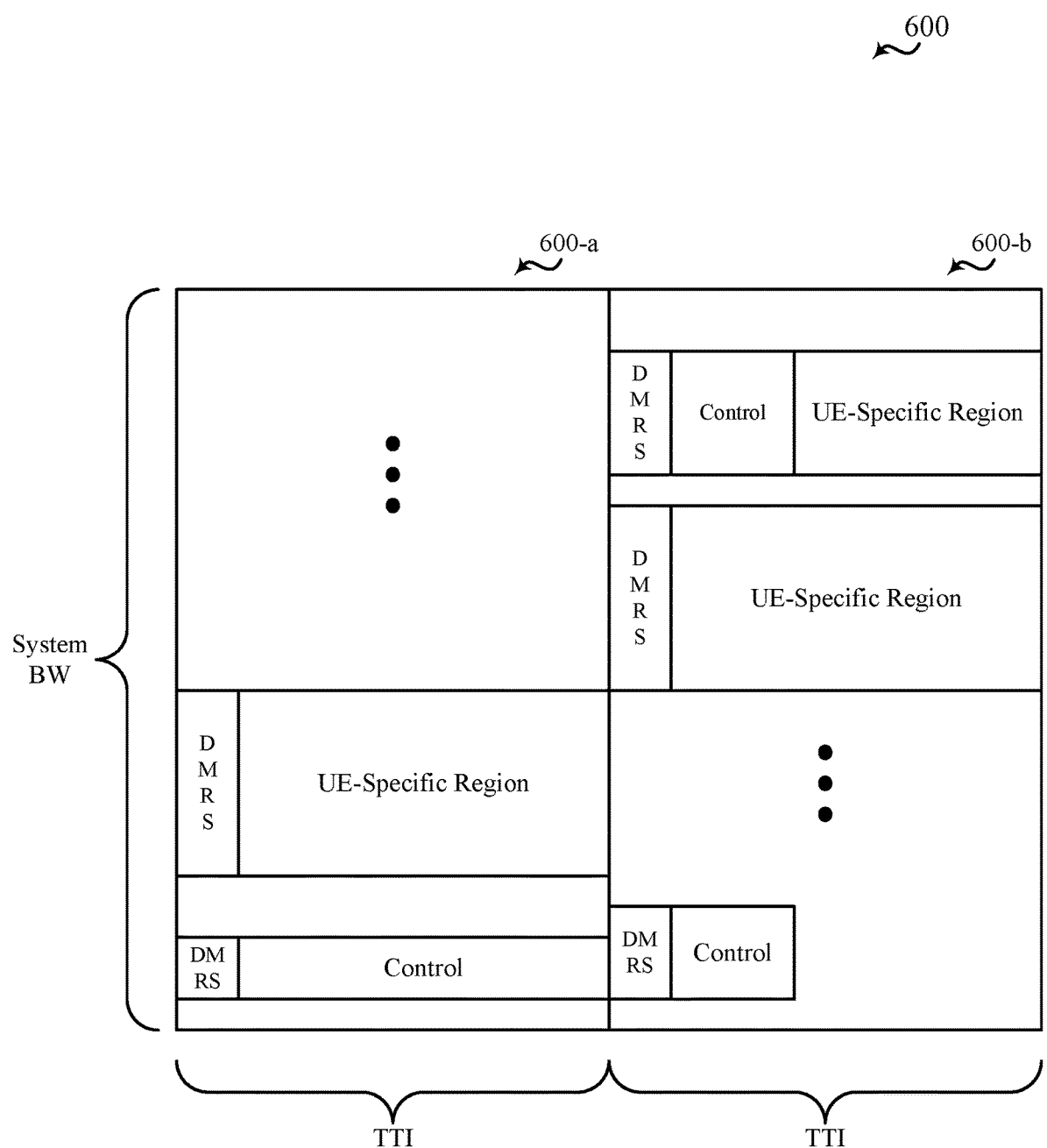
FIG. 6 shows a time-frequency representation of a set of TTIs including a first TTI and a second TTI, in accordance with one or more aspects of the present disclosure.

FIG. 6 shows a time-frequency representation of a set of TTIs 600 including a first TTI 600-*a* and a second TTI 600-*b* (e.g., first and second subframes), in accordance with one or more aspects of the present disclosure. By way of example, control information and data are multiplexed within the first TTI 600-*a* using TTI-level FDM techniques, as described with reference to FIG. 3, and control information and data are multiplexed within the second TTI 600-*b* using a combination of TTI-level TDM and FDM techniques, as described with reference to FIG. 5. The TTI-level TDM and FDM techniques used to multiplex the control information and data within the first TTI 600-*a* and the second TTI 600-*b* may be DMRS-based. In some examples, the control information and data multiplexed within the first TTI 600-*a* and the second TTI 600-*b* may be transmitted from an ANC to a UE through a radio head, or from a radio head or base station to a UE, as described with reference to FIG. 1.

The first TTI 600-*a* may provide more flexible user (UE) capacity scaling than the second TTI 600-*b*, and may be useful in an environment in which a large number of devices (e.g., a large number of IoE devices) exist, and in which some of the devices are associated with large path losses. Although the TTI 600-*a* does not allow a device to enter microsleep, many IoE devices are low duty cycle devices that use low duty cycle discontinuous reception (DRX) to save power (instead of relying on microsleep to save power). Some IoE devices may participate in a data transfer once every few seconds, minutes, or longer. Interspersing TTIs configured using FDM techniques with TTIs configured using a combination of TDM and FDM techniques, can therefore be useful.

In some examples, RBs may be pre-assigned to UEs or sets of UEs across different TTIs (e.g., across the first TTI 600-*a* and the second TTI 600-*b*). Thus, when a UE or set of UEs is not scheduled in one TTI, the RBs assigned to the UE or set of UEs may be wasted. In other examples, RBs may be dynamically reassigned to different UEs or sets of UEs across different TTIs.

The TTIs 600 may be transmitted without a CRS-based control region when a common search space with DMRS-based control is configured. In some examples, the TTIs 600 described with reference to FIG. 6 may support inter-cell interference coordination.

Figure 7:
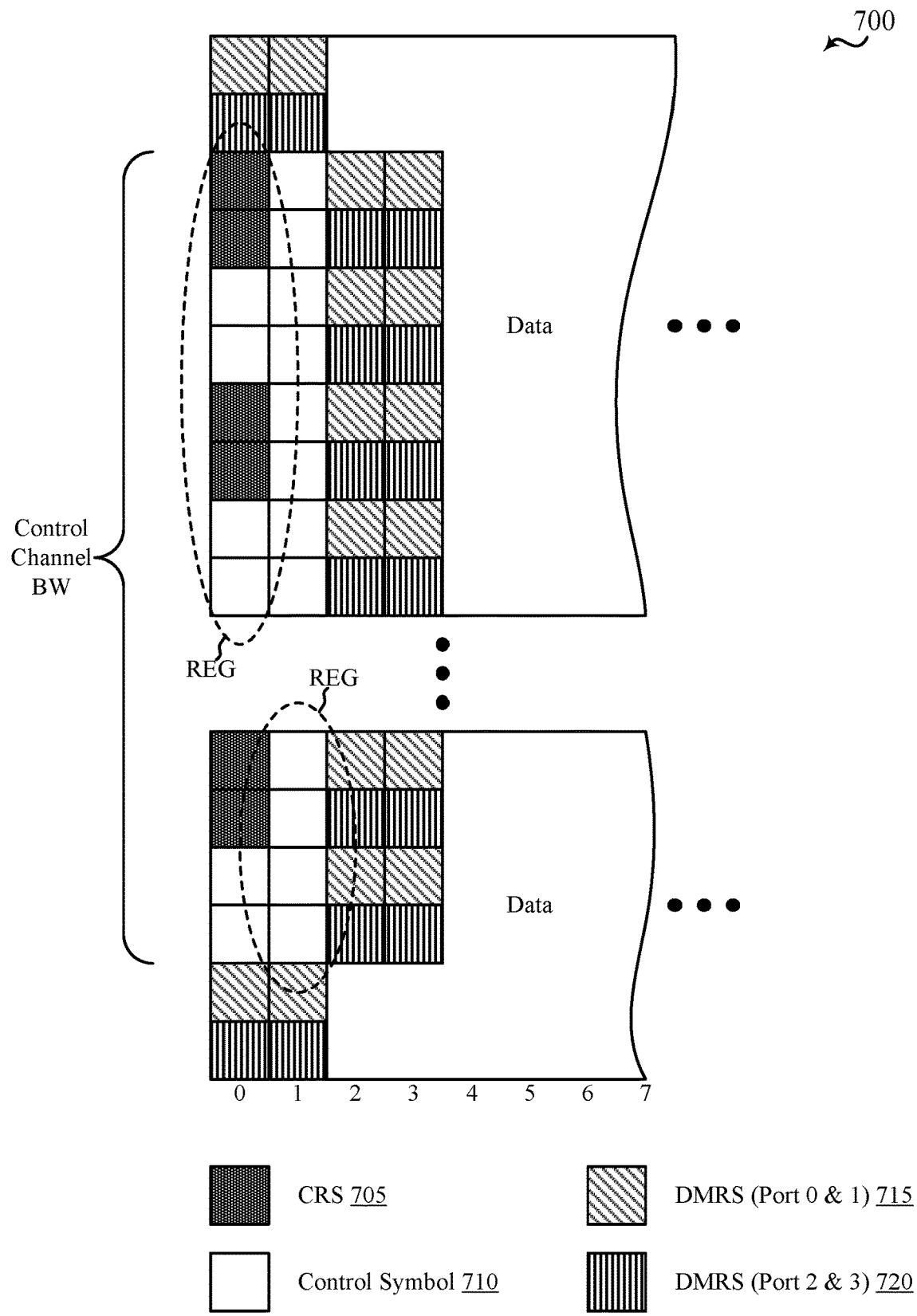
FIG. 7 shows a time-frequency representation of a control region transmitted in a TTI, in accordance with one or more aspects of the present disclosure.

FIG. 7 shows a time-frequency representation of a control region 700 transmitted in a TTI (e.g., in a subframe), in accordance with one or more aspects of the present disclosure. By way of example, the control region 700 is a CRS-based control region and may be an example of the control region 405 described with reference to FIG. 4. However, techniques applied to configure the control region 700 may be applied to configure DMRS-based control regions, such as the control regions 505 described with reference to FIG. 5. In some examples, the control region 700 may be included in a TTI transmitted from an ANC to a UE through a radio head, or from a radio head or base station to a UE, as described with reference to FIG. 1.

The control region 700 may include a CRS 705 and a plurality of resource elements (REs) carrying a control region (or control symbols 710, or set of control information). By way of example, the control region 700 spans two OFDM symbol periods (e.g., OFDM symbol periods 0 and 1). The REs carrying the set of control information may be grouped in resource element groups (REGs) of four tones, with the REGs in the first OFDM symbol period being interlaced with REs used to transmit the CRS 705. The configuration of the REGs may be the same as the configuration of REGs in a LTE/LTE-A system, to facilitate Space-Frequency Block Coding (SFBC) and Frequency Switched Transmit Diversity (FSTD) (e.g., 4× transmit diversity).

The control region 700 may span one or a plurality of RBs in the frequency domain. In some examples, each RB may include 16 tones (compared to 12 tones in each LTE/LTE-A RB). The bandwidth of the control region 700 may be configured as a system setting, and in some examples may be indicated in a physical broadcast channel (PBCH). In one example, the bandwidth of the control region 700 may be 64 RBs (or (64*16+1)*36 kHz=36.9 MHz). In some examples, a control channel element (CCE) may be defined to include 8 REGs (compared to a LTE/LTE-A system, in which a CCE is defined to include 9 REGs). A system having CCEs of 8 REGs, may provide 4*8=32 resource elements, or modulation symbols, for 64 Quadrature Phase Shift Keying (QPSK) coded bits.

In a LTE/LTE-A system, the number of OFDM symbol periods spanned by a control region may vary from 1-3 OFDM symbol periods (or from 2-4 for a 1.4 MHz system). The number of OFDM symbol periods spanned by a control region may be dynamically adjusted per subframe, and may be indicated in a physical channel format indicator channel (PCFICH). However, in a system having greater bandwidth and tighter timing constraints, it can be desirable to limit flexibility in terms of the number of OFDM symbol periods that may be spanned by a control region. Thus, in some examples, the number OFDM symbol periods spanned by the control region 700 may be 2-3 OFDM symbol periods.

As shown in FIG. 7, the control region 700 may be transmitted in a RB including a DMRS 715 transmitted on even tones for ports 0 & 1 of a MIMO antenna array, and a DMRS 720 transmitted on odd tones for ports 2 & 3 of the MIMO antenna array. By way of example, each DMRS may occupy two OFDM symbol periods. The REs of the RB not occupied by the control region 700 or the DMRSs 715 and 720 may be allocated to one or more UE-specific data regions and/or UE-specific control regions.

Figure 8:
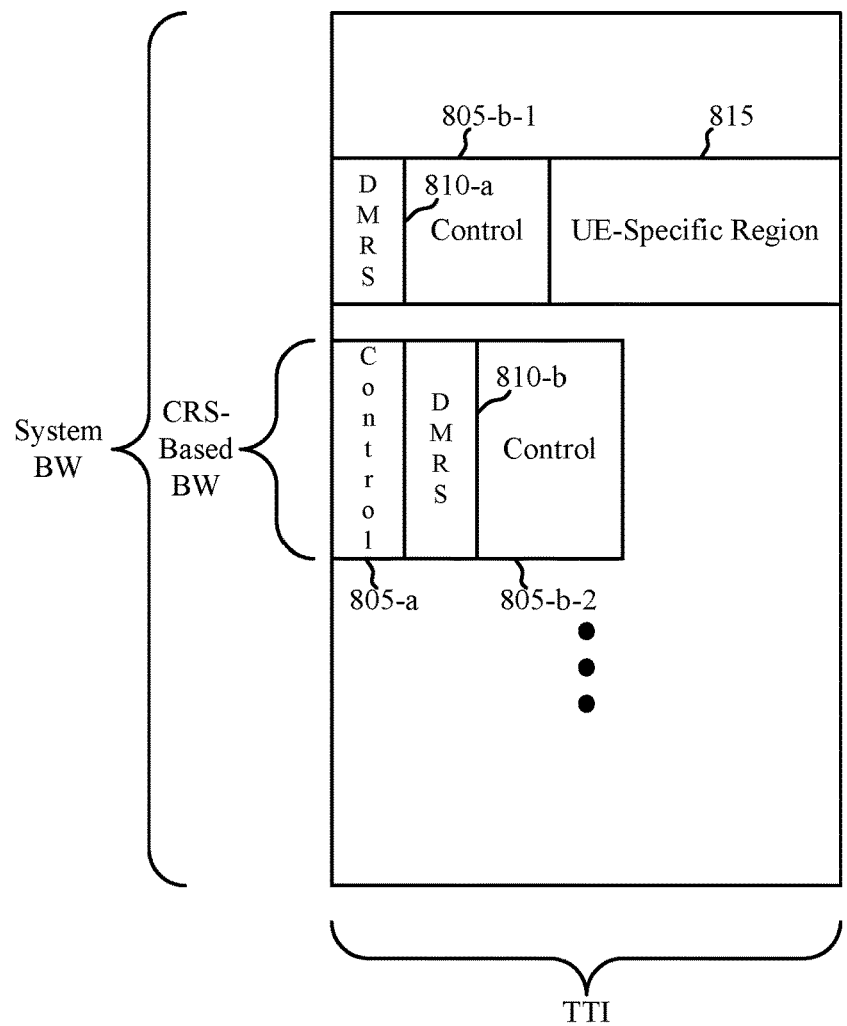
FIG. 8 shows a time-frequency representation of a TTI including a cascaded control region, in accordance with one or more aspects of the present disclosure.

FIG. 8 shows a time-frequency representation of a TTI 800 (e.g., a subframe) including a cascaded control region 805, in accordance with one or more aspects of the present disclosure. By way of example, the cascaded control region 805 is a CRS/DMRS-based cascaded control region. In some examples, the cascaded control region 805 and other elements of the TTI 800 may be included in a TTI transmitted from an ANC to a UE through a radio head, or from a radio head or base station to a UE, as described with reference to FIG. 1.

The cascaded control region 805 (e.g., a TTI-level control region) may include a common control region 805-*a* (or first tier control region) transmitted at a beginning of the TTI 800. In some examples, as shown, the common control region 805-*a* may be CRS-based and include a CRS usable by UEs to demodulate the common control region 805-*a*. The common control region 805-*a* may be located at an intersection of a subset of time resources within the TTI 800 and a subset of frequency resources with the TTI 800. In some examples, the subset of time resources may include 1, 2, or 3 OFDM symbol periods of the TTI 800, and the subset of frequency resources may include a relatively narrow band of frequency resources of the TTI 800 (e.g., a narrow band of frequency resources near the center of a system bandwidth of the TTI 800). In some other examples, the common control region 805-*a* may span the entire system bandwidth of the TTI 800.

The common control region 805-*a* may include a set of control information, which control information may include a pointer to each of one or more UE-specific control regions 805-*b* (or second tier control regions) of the cascaded control region 805. For example, the common control region 805-*a* may include pointers to a first UE-specific control region 805-*b*-1, a second UE-specific control region 805-*b*-2, etc. Each UE-specific control region 805-*b* may be specific to a single UE or to a group of UEs, depending on configuration (and thus, each pointer to a UE-specific control region may be assigned to or coded for a single UE or group of UEs). The common control region 805-*a* and UE-specific region(s) 805-*b* may be non-overlapping. By way of example, the first UE-specific control region 805-*b*-1 may be transmitted on different frequency resources than the common control region 805-*a*, and the second UE-specific control region 805-*b*-2 may be transmitted on the same frequency resources as the common control region 805-*a*, but on different time resources. In some examples (not shown), a UE-specific control region 805-*b* may be transmitted on frequency resources that partially overlap (or include) the subset of frequency resources on which the common control region 805-*a* is transmitted. In some examples, the UE-specific control regions 805-*b* may be DMRS-based (e.g., each UE-specific control region 805-*b* may include a DMRS (e.g., DMRS 810-*a* or 810-*b*) usable by UEs to demodulate the UE-specific control region 805-*b*).

In some examples, the common control region 805-*a* may include dynamic scheduling information (e.g., scheduling information for a dynamically determined set of one or more UEs for which control information or data is transmitted in the TTI 800). The dynamic scheduling information may include information applicable to all scheduled UEs and/or different sets of information applicable to different UEs or sets of UEs. In some examples, the common control region 805-*a* may only carry essential information, such as RB allocation information (including pointers to the UE-specific control regions 805-*b*). In some examples, the pointers to the UE-specific control regions 805-*b* may include LTE/LTE-A PCFICH types of pointers.

In some examples, a UE-specific control region 805-*b* may include UE-specific downlink assignments and/or information usable by a set of one or more UE(s) to demodulate a UE-specific data region (e.g., the first UE-specific control region 805-*b*-1 may include information usable by a set of one or more UEs to demodulate a first UE-specific data region 815). The first UE-specific control region 805-*b*-1 may in some cases be considered a part of the first UE-specific data region 815.

In some examples, a UE-specific control region 805-*b* may just include UE-specific control information (e.g., one or more uplink grants). In some examples, broadcast control information may be unicast to a set of one or more UEs in a UE-specific control region 805-*b*. In some examples, the same broadcast control information may be unicast to multiple sets of one or more UEs in multiple UE-specific control regions 805-*b*.

In some examples, an ANC, radio head, or base station may transmit SPS information and/or prescheduling information in advance of the TTI 800, which SPS information and/or prescheduling information may include a pointer and/or RB allocation information for one or more UE-specific control region 805-*b* in the TTI 800. A UE that receives and decodes the SPS information and/or prescheduling information may refrain from demodulating the common control region 805-*a* and proceed directly to demodulating an assigned UE-specific control region 805-*b*.

A cascaded control region may be provided in each TTI, or may be dynamically employed, when needed, to extend control region capacity. Time-critical control information may be included a common (or first tier) control region, and non-time-critical control information may be included in a number of UE-specific (or second tier) control regions. In some examples, a limited set of non-time-critical control information may also be included in the common control region.

In some examples, the number of OFDM symbol periods over which a common control region of a cascaded control region is transmitted may be fixed or limited, because dynamic expansion or contraction of the common control region may result in data-on-control or control-on-data interference between cells having uncoordinated PCFICH transmissions (which PCFICH transmissions may be used to signal the sizes of the common control regions of the different cells). In some examples, expansion or contraction of a cascaded control region may be limited to expansion or contraction of UE-specific control regions, and the size of the common control region may be fixed or infrequently changed. In some examples, a PCFICH in a common control region may point to a pre-agreed/dedicated DMRS-based hybrid TDM-FDM type of control region for control capacity extension, which DMRS-based hybrid TDM-FDM type of control region may or may not be beamformed and power controlled interference power estimated similarly to a data region.

Figure 9:
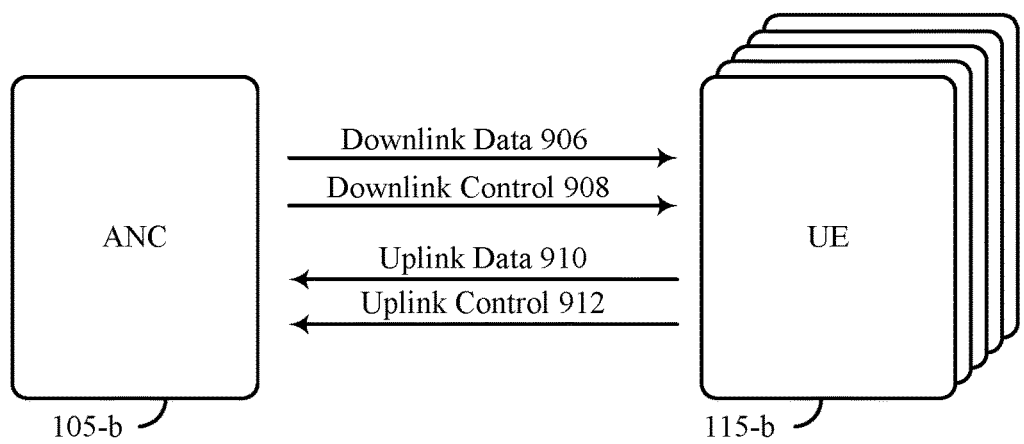
FIG. 9 shows a diagram illustrating an example of a resource configuration that supports integrated control and data within resource blocks according to some aspects of the present disclosure.

FIG. 9 illustrates a diagram 900 showing an example of various communications between an ANC 105-*b* and one or more UEs 115-*b* according to some aspects of the present disclosure. The ANC 105-*b* may be a base station, a node or device responsible for scheduling traffic in a wireless communication network, including various downlink (DL) and uplink (UL) transmissions. The ANC 105-*b* may be referred to as a scheduling entity or a scheduler, and/or any other suitable term without deviating from the scope of the present disclosure. The ANC 105-*b* may be, or may reside within, an eNodeB, a base transceiver station, a radio base station, a radio transceiver, a transceiver function, a basic service set, an extended service set, an access point, a mesh node, a relay, a peer, and/or any other suitable device. In some examples, the functions of the ANC 105-*b* may be performed by a UE 115-*b*.

The UE 115-*b* may be a node or device that receives scheduling and/or control information, including but not limited to scheduling grants, synchronization or timing information, or other control information from another entity in the wireless communication network, such as the ANC 105-*b*. The UE 115-*b* may be a referred to as a subordinate entity, a schedule, and/or any other suitable term without deviating from the scope of the present disclosure. The UE 115-*b* may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable device (e.g., a smart watch, glasses, a health or fitness tracker, etc.), an appliance (e.g., clothes washer/dryer, dishwasher, stove/oven, microwave, etc.), a security system, a sensor, a vending machine, a thermostat, an irrigation controller, an electric vehicle charging station, a water heater, and a utility meter, and/or any other suitable device.

As used herein, 'control channel(s)' may sometimes be used to communicate grant information. The ANC 105-*b* may transmit DL data channel(s) 906 and DL control channel(s) 908. The UE 115-*b* may transmit UL data channel(s) 910 and UL control channel(s) 912. The channels illustrated in FIG. 1 are not necessarily all of the channels that may be utilized by the ANC 105-*b* and/or the UE 115-*b*. Those of ordinary skill in the art will recognize that other channels may be utilized in addition to those illustrated, such as other data, control, and feedback channels. As used herein, the term 'downlink' or 'DL' may refer to a point-to-multipoint transmission originating at the ANC 105-*b*, and the term 'uplink' or 'UL' may refer to a point-to-point transmission originating at the UE 115-*b*. According to aspects of the present disclosure, the terms 'communicate' and/or 'communicating' may refer to transmission and/or reception. One of ordinary skill in the art will understand that many types of technologies may perform such communications without deviating from the scope of the present disclosure. As used herein, the term 'DL-centric time-division duplex (TDD) subframe' may refer to a TDD subframe in which a substantial proportion (e.g., majority) of the information is communicated in the DL direction, even though some of the information may be communicated in the UL direction. Also, the term 'UL-centric TDD subframe' refers to a TDD subframe in which a substantial proportion (e.g., majority) of the information is communicated in the UL direction, even though some information may be communicated in the DL direction.

Figure 10:
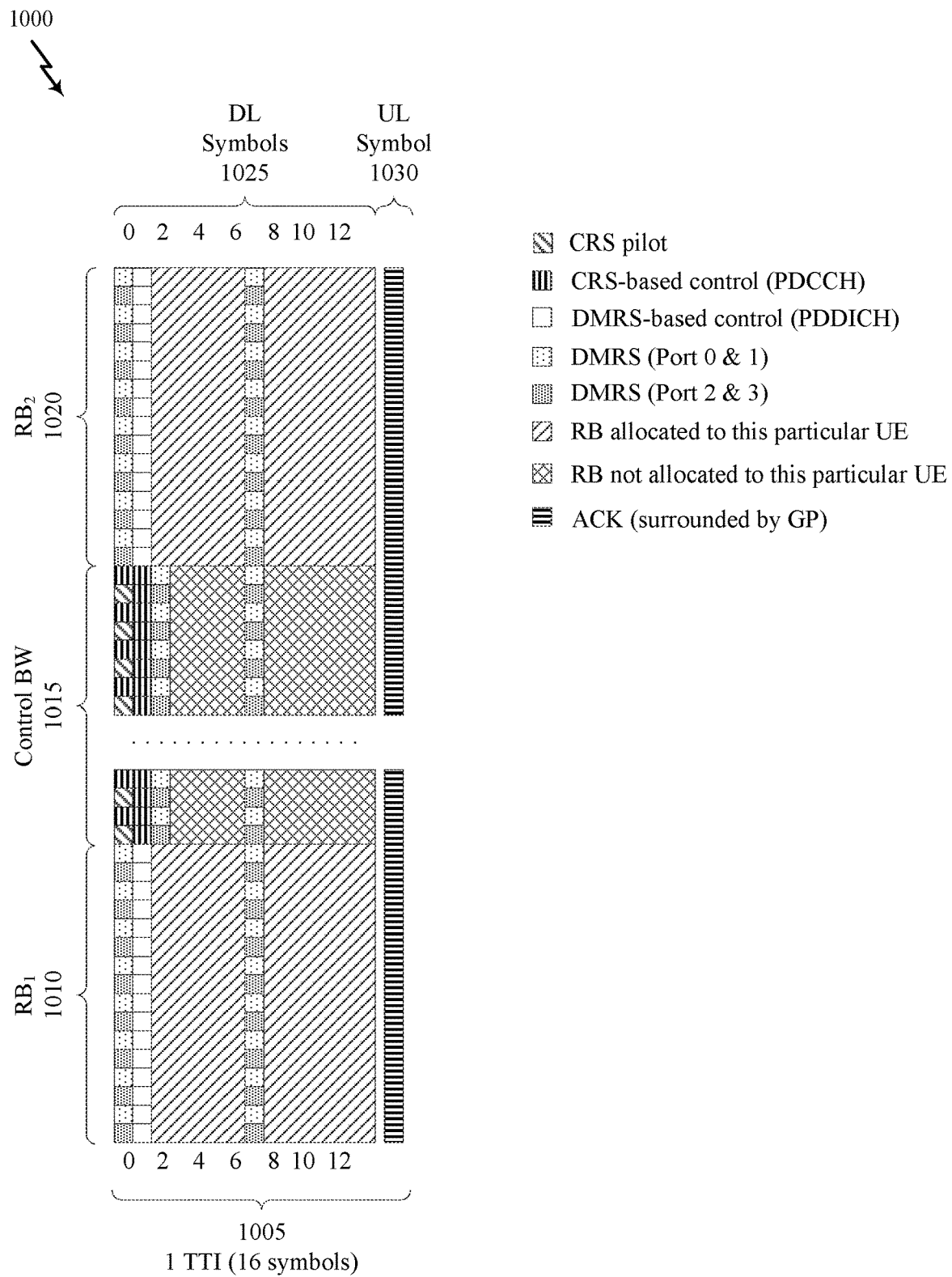
FIG. 10 shows a diagram illustrating an example of one or more techniques for communicating control information according to some aspects of the present disclosure.

FIG. 10 is a diagram 1000 illustrating an example of a resource configuration that supports integrated control and data within resource blocks according to some aspects of the present disclosure. In some configurations, such a resource configuration may represent aspects of techniques implemented by a UE 115-*b* and/or a ANC 105-*b*, as described in greater detail herein. In FIG. 10, a transmission time interval (TTI) 1005 may contain 16 OFDM symbols, which may include DL symbols 1025 and an UL symbol 1030, which may be used to provide an acknowledgment of receipt of the DL symbols 1025. The UL symbol 1030 may be surrounded by a guard period (GP).

In some examples, a control bandwidth (BW) 1015, a first resource block (RB$_1$) 1010, and a second resource block (RB$_2$) 1020 may include various resource elements (REs), as illustrated in FIG. 10. The control BW 1015 may include REs for a cell-specific reference signal (CRS) pilot and CRS-based common control information, REs for a demodulation reference signal (DMRS), and REs that are part of a resource block that is not allocated for a particular UE (e.g., UE 115-*b*). RB$_1$ 1010 and RB$_2$ 1020 may be allocated to the UE (e.g., UE 115-*b*), and may include DMRS REs in a first symbol, followed by physical DL data indicator channel (PDDICH) REs in a second symbol. In some examples, PDDICH REs are multiplexed according to time-division multiplexing (TDM) with data resource blocks allocated to the UE (e.g., UE 115-*b*). Various multiplexing schemes may be used, and placement of the PDDICH REs may be selected to be in a later symbol of the DL symbols 1025. In some examples, if two resource blocks are allocated to a particular UE (e.g., UE 115-*b*), 32 tones may be used for PDDICH, and, if one symbol is used with TDM, it may correspond to one control channel element (CCE). In some examples, rather than having DMRS in the first symbol and PDDICH in the second symbol, the PDDICH and DMRS may be interleaved to occupy both the first and second symbols in alternating tones.

The PDDICH REs may include data demodulation specific control information. For example, the PDDICH REs may include information related to modulation and coding scheme (MCS), new data indicator (NDI), redundancy version (RV), or number of layers of the data REs. In some examples, the PDDICH REs may include an appended cyclic redundancy check (CRC) that may be masked with the UE's cell-radio network temporary identifier (C-RNTI). In one example, the PDDICH may be coded with a tailbiting convolutional code (TBCC) coding scheme with a rate 1/3, and may provide control information for various aggregation levels. Beamforming and transmit diversity schemes also may be used for PDDICH REs. Such a PDDICH as discussed herein may provide a number of benefits. For example, such techniques may reduce loading on CRS-based control and provide enhanced system scalability. A reduced search space may be provided, that is confined to allocated RBs for a UE. Such techniques also may provide more flexible tradeoff between a UE's own data and control, and may allow for dynamic cancellation of prescheduled or semi-persistent scheduled RBs. Further, more self-contained control information may enable lower complexity data interference cancellation.

Figure 11:
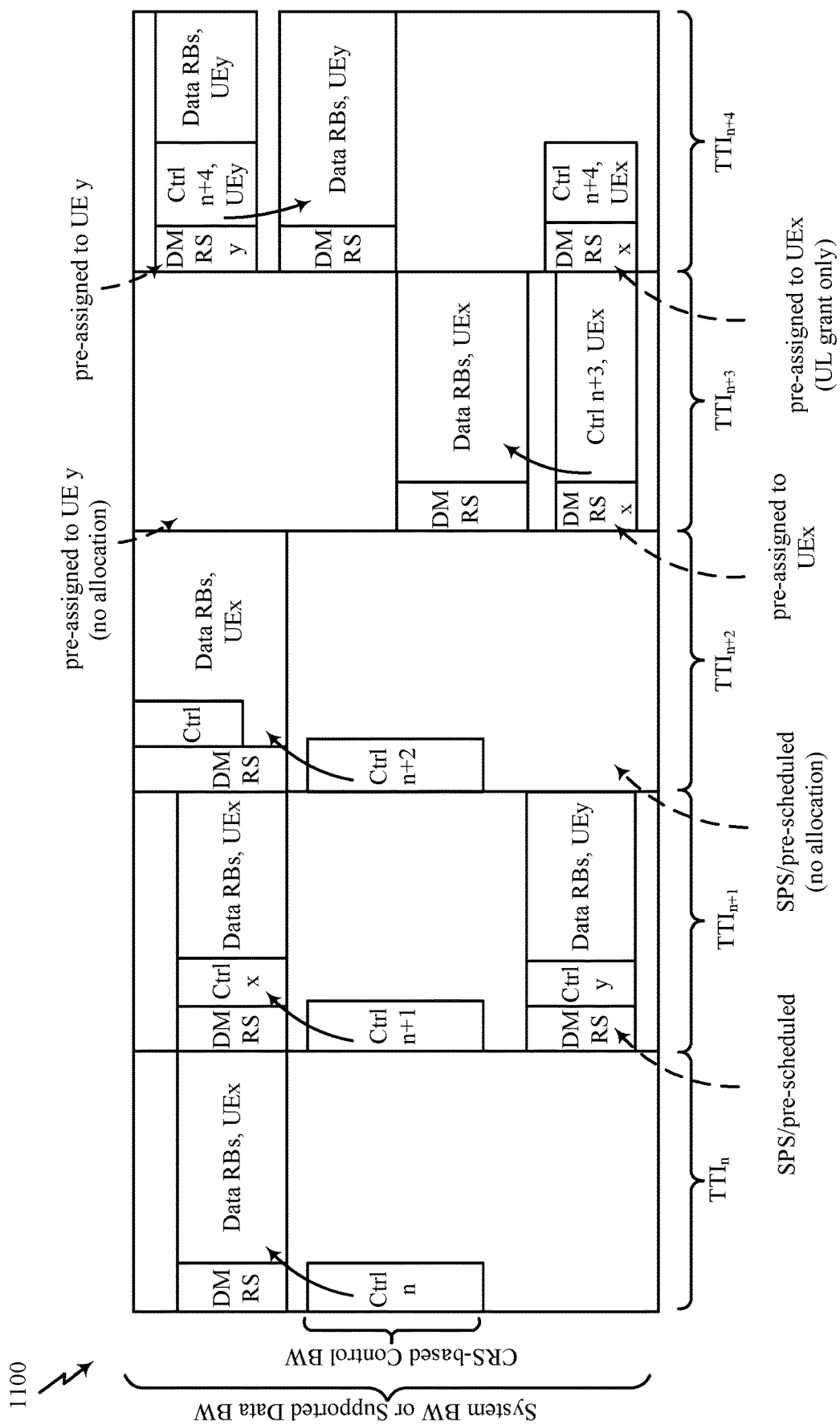
FIG. 11 shows a diagram illustrating an example of embedded control information according to some aspects of the present disclosure.

FIG. 11 is a diagram 1100 illustrating an example of various techniques for communicating control information according to some aspects of the present disclosure. Generally, the ANC 105-*b* provides various types of control information to the UEs 115-*b* (e.g., subordinate entities), and each UE 115-*b* may utilize control information to process (e.g., identify, demodulate, decode) any data designated (e.g., destined, addressed, intended, allocated) for the UE 115-*b*. For instance, the control information may include MCS information corresponding to received data, the number of layers corresponding to received data, and other information suitable for processing received data. Control information may be provided to the UE 115-*b* in various forms, structures, formats, and/or configurations without deviating from the scope of the present disclosure. In some examples, control information is provided to the UE 115-*b* in the form of common control information (e.g., a TTI-level common control region). In some circumstances, common control information may be included in a physical downlink control channel (PDCCH). Common control information may be utilized by any UE 115-*b* within the coverage area of the ANC 105-*b* that transmitted that common control information. In some examples, control information is provided to the UE 115-*b* in the form of user-specific control information (e.g., a TTI-level UE-specific control region). In some circumstances, user-specific control information is included in an enhanced PDCCH (ePDCCH). User-specific control information may be utilized by the UE 115-*b* to which that user-specific control information is designated.

Although various non-limiting examples of control information communication are described herein, one of ordinary skill in the art will understand that control information may be communicated utilizing many additional or alternative techniques without deviating from the scope of the present disclosure. In some circumstances, control information and data may be multiplexed in the time domain (e.g., TDM), the frequency domain (e.g., frequency-division multiplexing (FDM)), and/or some combination thereof (e.g., a hybrid form of multiplexing). The diagram 1100 illustrates various TTIs. Each of the TTIs illustrated in the diagram 1100 illustrates an example of a possible technique for communicating control information, although one of ordinary skill in the art will understand that the sequence/configuration illustrated in this diagram 1100 is not intended to necessary limit the scope of the present disclosure. Without deviating from the scope of the present disclosure, any example provided herein with respect to a particular TTI (e.g., $TTI_n$) may exist with or without any one or more of the other examples provided herein with respect to any other TTI (e.g., $TTI_{n+1}$, $TTI_{n+2}$, $TTI_{n+3}$, $TTI_{n+4}$).

In some examples, control information may be communicated using a technique illustrated with respect to $TTI_n$ in the diagram 1100 of FIG. 11. Common control information or the TTI-level common control region ($Ctrl_n$) may occupy a subset (e.g., not all) of the subcarriers of the available bandwidth. The common control information ($Ctrl_n$) may include resource block allocation information. In other words, the common control information ($Ctrl_n$) may function as a 'pointer' that points the UE 115-*b* to the resource block(s) (e.g., TTI-level UE-specific control region) that are allocated to that particular UE 115-*b*. For example, based on the information included in $Ctrl_n$, the UE 115-*b* may determine which subcarriers correspond to the resource blocks that have the data designated for it. In this manner In some examples, control information may be communicated using techniques illustrated with respect to $TTI_{n+1}$ in the diagram 1100 of FIG. 11. According to some techniques, common control information or the TTI-level common control region ($Ctrl_{n+1}$) occupies a subset (e.g., not all) of the subcarriers of the available bandwidth, and the common control information ($Ctrl_{n+1}$) points the UE 115-*b* ($UE_x$) to user-specific control information or the TTI-level UE-specific control region ($Ctrl_x$) included in other subcarriers. Such user-specific control information ($Ctrl_x$) may be embedded with data designated for that specific user ($UE_x$), as illustrated in the diagram 1100 with respect to $TTI_{n+1}$. According to other techniques, as also illustrated with respect to $TTI_{n+1}$, semi-persistent scheduling (SPS) may be configured such that the communication of user-specific control information or the TTI-level UE-specific control region ($Ctrl_y$) is pre-scheduled during certain time intervals or with certain periodicity. (Additional description pertaining to SPS is provided herein, e.g., with reference to FIG. 7, and therefore will not be repeated here.) For example, $UE_y$ may determine which subcarriers correspond to the resource blocks that have the data designated to it by processing user-specific control information ($Ctrl_y$) without having to process common control information ($Ctrl_{n+1}$). That user-specific control information ($Ctrl_y$) may sometimes be embedded with data designated for that specific user ($UE_y$), as illustrated in the diagram 1100 of FIG. 11. In this manner, the common control information and the user-specific control information may form a cascaded control region. As used herein, the term common control information may refer to information included in a TTI-level common control region. As used herein, the term user-specific control information may refer to data included in a TTI-level UE-specific control region.

In some examples, control information may be communicated using techniques illustrated with respect to $TTI_{n+2}$ in the diagram 1100 of FIG. 11. Common control information or the TTI-level UE-specific control region ($Ctrl_{n+2}$) may occupy a subset (e.g., not all) of the subcarriers of the available bandwidth, and the common control information ($Ctrl_{n+2}$) points the UE 115-*b* ($UE_x$) to user-specific control information or the TTI-level UE-specific control region ($Ctrl_x$) included in other subcarriers. As also described above (e.g., with respect to $TTI_{n+1}$), the user-specific control information ($Ctrl_x$) may be embedded with data designated for that specific user ($UE_x$). In the example of embedded control information illustrated with respect to $TTI_{n+2}$, the embedded user-specific control information ($Ctrl_x$) uses a subset (e.g., not all) of the subcarriers used for communicating data designated for that specific user ($UE_x$). In comparison, the example of embedded user-specific control information ($UE_x$) illustrated (and described above) with respect to $TTI_{n+1}$ provides that the embedded user-specific control information ($Ctrl_x$) uses all (e.g., not a subset) of the subcarriers used for communicating data designated for that specific user ($UE_x$).

In some examples, control information may be communicated using techniques illustrated with respect to $TTI_{n+3}$ in the diagram 1100 of FIG. 11. A specific user ($UE_x$) may be pre-assigned to detect a particular reference signal ($DMRS_x$), as illustrated with respect to $TTI_{n+3}$. That reference signal ($DMRS_x$) may correspond to group control information ($Ctrl_{n+3}$) (e.g., TTI-level common control region) provided in the same subcarrier(s), as also illustrated with respect to $TTI_{n+3}$. Further, the group control information ($Ctrl_{n+3}$) may be embedded within a data region, which is unlike the examples illustrated (and described above) with respect to $TTI_n$, $TTI_{n+1}$, and $TTI_{n+2}$, which do not provide group control information ($Ctrl_n$, $Ctrl_{n+1}$, $Ctrl_{n+2}$) embedded within a data region. During $TTI_{n+3}$, group control information ($Ctrl_{n+3}$) may be embedded in one subset of subcarriers, and that embedded group control information ($Ctrl_{n+3}$) may point to another set of subcarriers that may be used for communicating data designated for a specific UE 115-*b* ($UE_x$), as illustrated in the diagram 1100 with respect to $TTI_{n+3}$. As used herein, 'group control information' may refer to control information that is configured for a group of users that share the same DMRS. For example, group control information may refer to TTI-level common control regions. Put another way, the group control information may be designated for a subset of users that share the same DMRS.

In some examples, control information may be communicated using techniques illustrated with respect to $TTI_{n+4}$ in the diagram 1100 of FIG. 11. (Some aspects provided with respect to $TTI_{n+4}$ are similar to some aspects illustrated and described above with respect to $TTI_{n+3}$ and therefore will not be repeated.) As illustrated with respect to $TTI_{n+4}$, a particular reference signal ($DMRS_x$) may be pre-assigned to $UE_x$, and that reference signal ($DMRS_x$) may correspond to the same subcarriers that have group control information ($Ctrl_{n+4}$) (e.g., TTI-level common control region) embedded with data designated for UE, as illustrated in the diagram 1100 with respect to $TTI_{n+4}$. As also illustrated with respect to $TTI_{n+4}$, another reference signal ($DMRS_y$) may be pre-assigned to $UE_y$, and that reference signal ($DMRS_y$) may correspond to the same subcarriers that have group control information (Ctrl$_{n+4}$) embedded with data designated for UE$_y$. Also, that embedded group control information (Ctrl$_{n+4}$) may point to additional subcarriers that have additional data designated for UE$_y$ (e.g., UE-specific region or TTI-level UE-specific control region), as also illustrated in the diagram 1100 with respect to TTI$_{n+4}$.

As also mentioned above, although various non-limiting examples of control information communication are described herein, one of ordinary skill in the art will understand that control information may be communicated utilizing many techniques without deviating from the scope of the present disclosure. Accordingly, the examples described herein, e.g., with reference to FIG. 11, shall not necessarily limit the scope of the present disclosure. Additional or alternative techniques for communicating control information are within the scope of the present disclosure.

Figure 12:
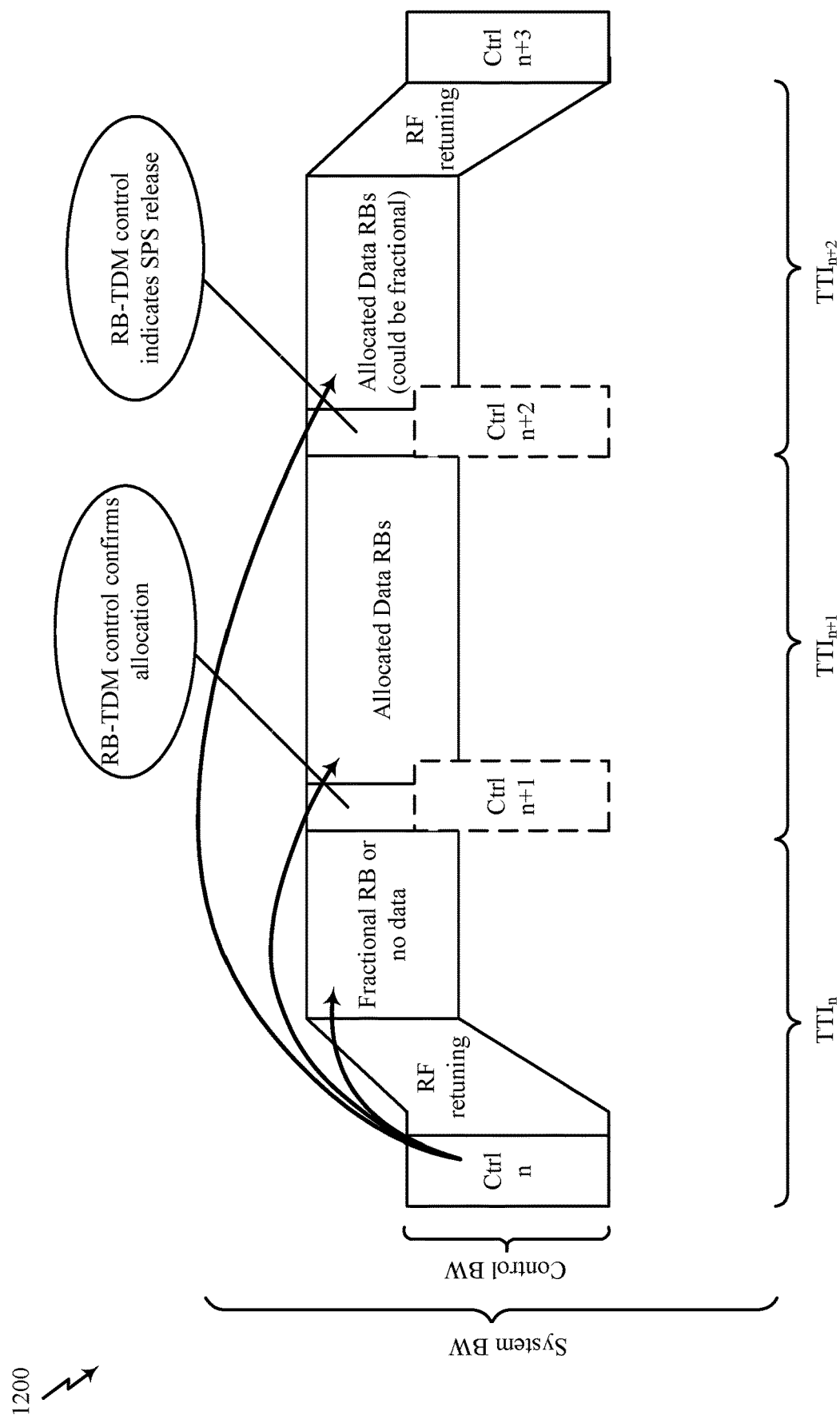
FIG. 12 shows a diagram illustrating an example of a scheduling entity in communication with a subordinate entity in an access network according to some aspects of the present disclosure.

FIG. 12 is a diagram 1200 illustrating an example of embedded control information according to some aspects of the present disclosure. In some configurations, the UE 115-b may perform communication in accordance with an SPS configuration. Generally, SPS may be used for periodic communications based on defined settings. SPS may be suitable for applications with small, predictable, and/or periodic payloads, such as voice over Internet protocol (VoIP) applications. To avoid overwhelming the PDCCH, SPS may be utilized for scheduling certain DL resources. SPS may be configured via a radio resource control (RRC) protocol. In SPS, scheduling for control information may be signaled and/or activated just once on the PDCCH. Subsequently, without needing to receive additional scheduling information for the control information, the UE 115-b may periodically tune to the parameters (e.g., frequencies, subcarriers) designated for receiving the control information. The periodicity with which the UE 115-b tunes to such parameters may be established when the SPS configuration is initially configured. The UE 115-b may use the same pattern until that pattern is modified or released by the ANC 105-b.

With reference to the diagram 1200 illustrated in FIG. 12, the SPS configuration may be established based on information included in the common control information or TTI-level common control region (Ctrl$_n$) received during TTI$_n$. However, in some circumstances, the resource blocks that include the data for a particular UE 115-b may use a different subcarrier. Accordingly, after receiving the common control information (Ctrl$_n$) during TTI$_n$, the UE 115-b may need to perform radio frequency (RF) retuning, as illustrated in the diagram 1200 with respect to TTI$_n$. Because some time is utilized for the RF tuning, only a fraction of the resource block may remain in TTI$_n$, and this fractional resource block may be utilized for communicating data or may include no data, as also illustrated in the diagram 1200 with respect to TTI$_n$. As used herein, the term common control information may refer to information included in a TTI-level common control region.

In some existing systems, a UE 115-b may retune at predetermined time intervals to the subcarriers corresponding to the common control channel (Ctrl$_{n+1}$, Ctrl$_{n+2}$) in order to monitor (e.g., listen to) the common control channel (e.g., PDCCH). The UE 115-b monitors the common control channel in order to determine whether to release the SPS configuration. In some existing systems, the subordinate entity may release the SPS configuration when it detects a PDCCH scrambled with that subordinate entity's SPS C-RNTI. A common control channel scrambled with the subordinate entity's SPS C-RNTI may sometimes be referred to herein as an 'SPS release message.' The SPS release message may be sent at (or near) the end of a talk spurt in applications that relate to VoIP. As an example, at the beginning of TTI$_{n+1}$, such a subordinate entity may tune away from the bandwidth of the resource block having data and tune to the control bandwidth having the common control channel (Ctrl$_{n+1}$) in order to listen for the SPS release message. Also, at the beginning of TTI$_{n+2}$, such a subordinate entity may again tune away from the bandwidth of the resource block having data and retune to the control bandwidth having the common control channel (Ctrl$_{n+2}$) in order to listen for the SPS release message. In some examples, the term common control channel may refer to a TTI-level common control region.

However, first, such retuning operations expend valuable time that could otherwise be utilized for communicating data. Second, monitoring the common control channel (Ctrl$_{n+1}$, Ctrl$_{n+2}$) can consume computational resources that could otherwise be utilized for receiving and processing data. Third, the SPS release message is infrequently included in the common control channel (Ctrl$_{n+1}$, Ctrl$_{n+2}$), so the aforementioned tuning to and monitoring of the common control channel (Ctrl$_{n+1}$, Ctrl$_{n+2}$) infrequently results in any change in the SPS configuration (e.g., release).

According to some aspects of the present disclosure, the UE 115-b may include a resource block that includes embedded control information, and that embedded control information may include information configured to maintain or release the SPS configuration of the UE 115-b. As an example, referring to FIG. 12, instead of retuning to the bandwidth of the common control channel (Ctrl$_{n+i}$) at the beginning of TTI$_{n+1}$, the UE 115-b may simply process the control information embedded in the resource block that includes the data and determine to maintain the SPS configuration. As another example, again referring to FIG. 12, instead of retuning to the bandwidth of the common control channel (Ctrl$_{n+2}$) at the beginning of TTI$_{n+2}$, the UE 115-b may simply process the control information embedded in the resource block that includes the data and determine to release the SPS configuration. In response to the SPS release message, the UE 115-b may release the SPS configuration previously established and retune to the common control channel (Ctrl$_{n+3}$) to receive common control information for subsequent communications. Put another way, in response to receiving the embedded control information, the UE 115-b may release the SPS configuration without retuning its transceiver, monitoring the common control channel (e.g., PDCCH), nor using common control information (e.g., information included in the PDCCH).

One of ordinary skill in the art will understand that the TTIs illustrated in FIG. 12 are provided for illustrative purposes and shall not necessarily limit the scope of the present disclosure. As an example, the TTIs need not be contiguous (e.g., there may be gaps between two TTIs). As another example, the TTIs may have various durations without deviating from the scope of the present disclosure. Additionally, even though the embedded control information is illustrated as being time-division multiplexed (TDM) with the data included in various resource blocks, one of ordinary skill in the art will understand that the embedded control information may be multiplexed in various other manners without deviating from the scope of the present disclosure.

Figure 13:
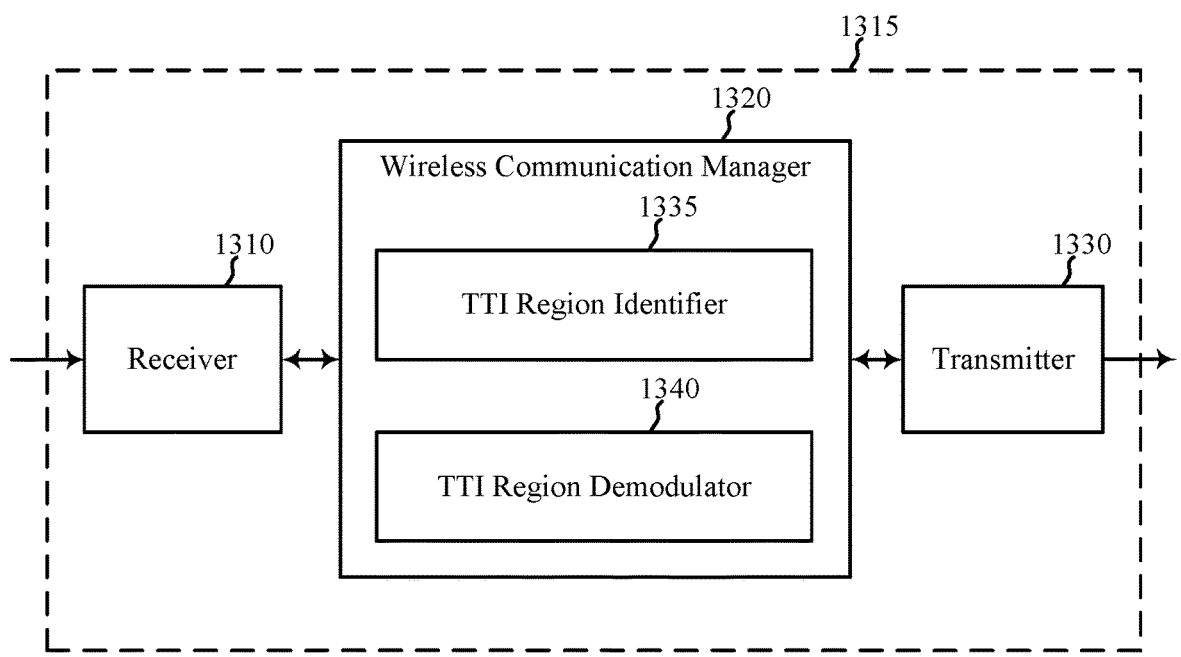
FIG. 13 shows a block diagram of an apparatus for use in wireless communication, in accordance with one or more aspects of the present disclosure.

FIG. 13 shows a block diagram 1300 of an apparatus 1315 for use in wireless communication, in accordance with one or more aspects of the present disclosure. The apparatus 1315 may be an example of aspects of one or more of the UEs 115 described with reference to FIG. 1. The apparatus 1315 may also be or include a processor. The apparatus 1315 may include a receiver 1310, a wireless communication manager 1320, or a transmitter 1330. Each of these components may be in communication with each other.

The components of the apparatus 1315 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1310 may include at least one radio frequency (RF) receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIGS. 1-12. The receiver 1310 may be used to receive various types of data or control signals (i.e., transmissions) over one or more communication links of a wireless communication system, such as one or more communication links of the wireless communication system 100 described with reference to FIG. 1.

In some examples, the transmitter 1330 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIGS. 1-12. The transmitter 1330 may be used to transmit various types of data or control signals (i.e., transmissions) over one or more communication links of a wireless communication system, such as one or more communication links of the wireless communication system 100 described with reference to FIG. 1.

In some examples, the wireless communication manager 1320 may be used to manage one or more aspects of wireless communication for the apparatus 1315. In some examples, part of the wireless communication manager 1320 may be incorporated into or shared with the receiver 1310 or the transmitter 1330. In some examples, the wireless communication manager 1320 may be an example of aspects of the UE wireless communication manager 140 described with reference to FIG. 1. In some examples, the wireless communication manager 1320 may include a TTI region identifier 1335 or a TTI region demodulator 1340.

The TTI region identifier 1335 may be used to identify a first TTI-level control region. The first TTI-level control region may be located at an intersection of a first subset of time resources within a first TTI (e.g., a first subframe) and a first subset of frequency resources within the first TTI. The TTI region identifier 1335 may also be used to identify, from a first set of control information received in the first TTI-level control region, a location of a first UE-specific region within the first TTI. The first UE-specific region may be specific to a single UE or to a group of UEs, depending on configuration (and thus, a pointer to the first UE-specific region (or RB allocation for the first UE-specific region), contained in the first set of control information, may be assigned to or coded for a single UE or group of UEs). The first TTI-level control region and the first UE-specific region may be non-overlapping.

The TTI region demodulator 1340 may be used to demodulate the identified first TTI-level control region and/or the identified first UE-specific region.

Figure 14:
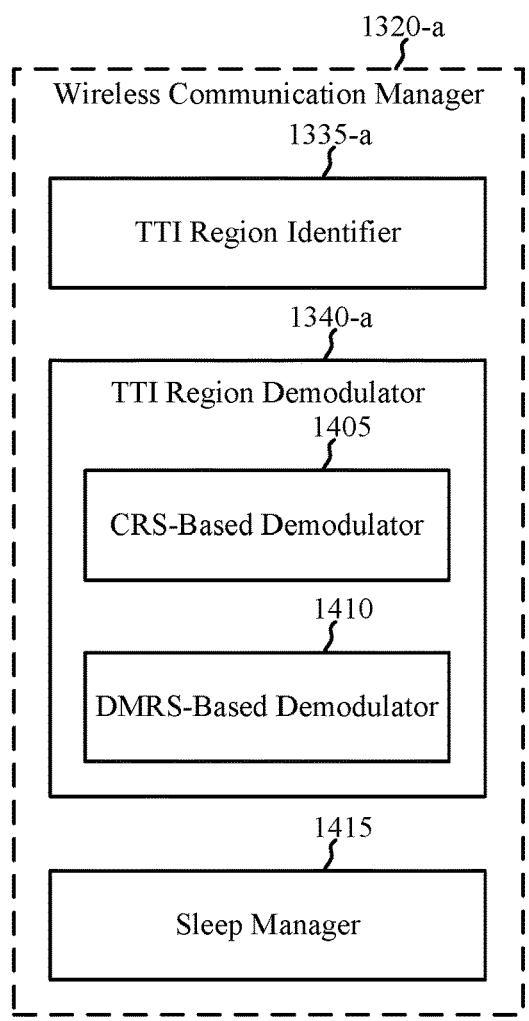
FIG. 14 shows a block diagram of a wireless communication manager for use in wireless communication, in accordance with one or more aspects of the present disclosure.

FIG. 14 shows a block diagram 1400 of a wireless communication manager 1320-*a* for use in wireless communication, in accordance with one or more aspects of the present disclosure. The wireless communication manager 1320-*a* may be an example of aspects of the wireless communication manager 140 or 1320 described with reference to FIG. 1 or 13.

The components of the wireless communication manager 1320-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1320-*a* may be used to manage one or more aspects of wireless communication for a UE or apparatus, such as one of the UEs 115 or apparatus 1315 described with reference to FIG. 1 or 13. In some examples, part of the wireless communication manager 1320-*a* may be incorporated into or shared with a receiver or a transmitter (e.g., the receiver 1310 or the transmitter 1330 described with reference to FIG. 13). In some examples, the wireless communication manager 1320-*a* may include a TTI region identifier 1335-*a*, a TTI region demodulator 1340-*a*, or a sleep manager 1415.

The TTI region identifier 1335-*a* may be used to identify a first TTI-level control region. The first TTI-level control region may be located at an intersection of a first subset of time resources within a first TTI (e.g., a first subframe) and a first subset of frequency resources within the first TTI. The TTI region identifier 1335 may also be used to identify, from a first set of control information received in the first TTI-level control region, a location of a first UE-specific region within the first TTI. The first UE-specific region may be specific to a single UE or to a group of UEs, depending on configuration (and thus, a pointer to the first UE-specific region (or RB allocation for the first UE-specific region), contained in the first set of control information, may be assigned to or coded for a single UE or group of UEs). The first TTI-level control region and the first UE-specific region may be non-overlapping. The first UE-specific region may include a data region and/or a control region (e.g., a second tier of a cascaded TTI-level control region, or a RB-level control region). In some examples, a DCI payload for a wireless device (e.g., a UE) including the wireless communication manager 1320-*a* may be distributed among the first TTI-level control region and the first UE-specific region, as described, for example, with reference to FIG. 8.

The TTI region demodulator 1340-*a* may be used to demodulate the identified first TTI-level control region and/or the identified first UE-specific region.

In some examples, the TTI region demodulator 1340-*a* may include a CRS-based demodulator 1405 or a DMRS-based demodulator 1410. When the first TTI-level control region includes a CRS, the CRS-based demodulator 1405 may be used to demodulate the first TTI-level control region based at least in part on the CRS, as described, for example, with reference to FIG. 4. When the first TTI-level control region includes a DMRS, the DMRS-based demodulator 1410 may be used to demodulate the first TTI-level control region based at least in part on the DMRS, as described, for example, with reference to FIG. 5. The DMRS-based demodulator 1410 may also be used to demodulate DMRS-based UE-specific control regions.

In some examples, the wireless communication manager 1320-*a* may receive control information and/or data in other TTIs configured similarly to the first TTI, and/or in other TTIs configured differently than the first TTI. In the latter case, the TTI region demodulator 1340 or DMRS-based demodulator 1410 may in some cases demodulate at least one of a FDM control region or data region in a second TTI, and may demodulate the FDM control region or data region based at least in part on a second DMRS received in the second TTI (and in some cases may demodulate the control region based on a second DMRS and demodulate the data region based on a third DMRS), as described, for example, with reference to FIGS. 5 and 6.

The sleep manager 1415 may be used to place a UE including the wireless communication manager 1320-*a* into a microsleep, and to wake the UE from the microsleep. For example, the wireless communication manager 1320-*a* may receive a second TTI-level control region within a second TTI (e.g., at an intersection of a second subset of time resources within the second TTI and a second subset of frequency resources within the second TTI); demodulate the second TTI-level control region using the TTI region demodulator 1340-*a*; and determine, from a second set of control information received in the second TTI-level control region, that the second TTI does not contain a transmission for the UE. In these examples, the sleep manager 1415 may cause the UE to enter a microsleep for a remainder of the second TTI.

Figure 15:
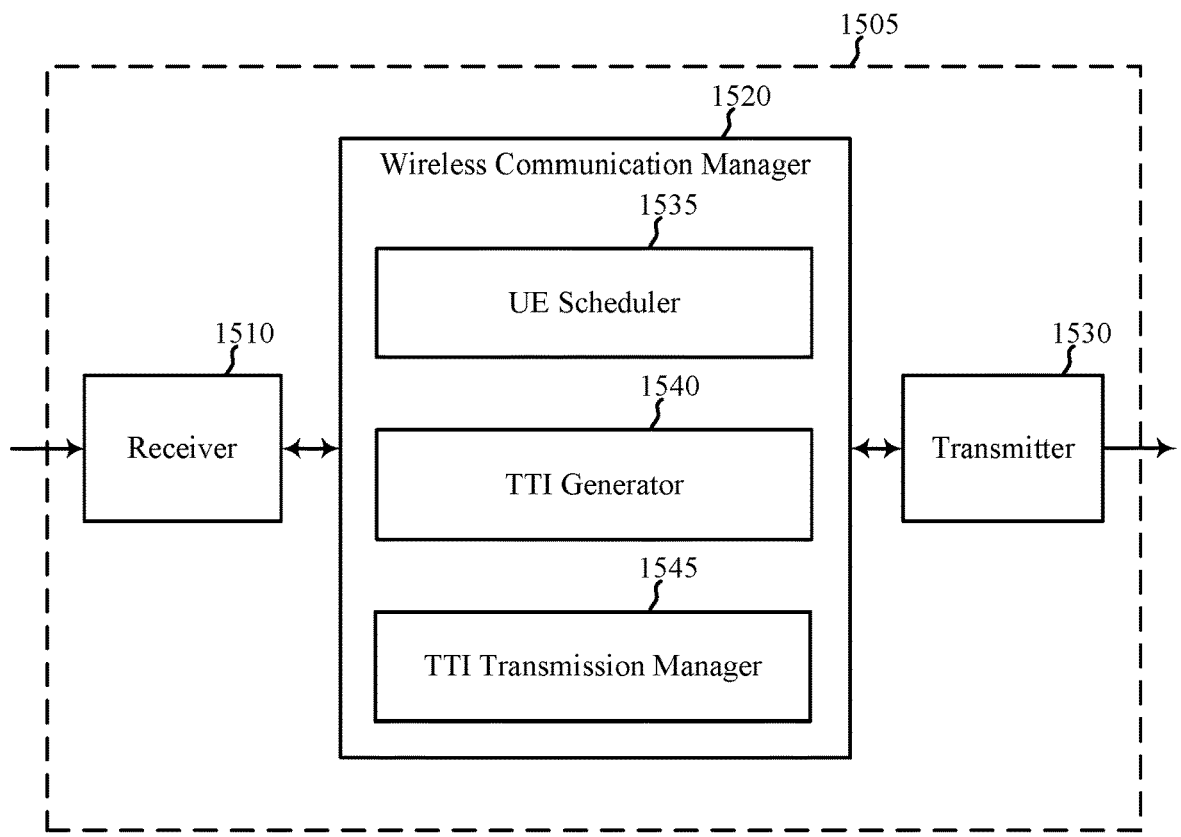
FIG. 15 shows a block diagram of an apparatus for use in wireless communication, in accordance with one or more aspects of the present disclosure.

FIG. 15 shows a block diagram 1500 of an apparatus 1505 for use in wireless communication, in accordance with one or more aspects of the present disclosure. The apparatus 1505 may be an example of aspects of one or more of the network access devices 105 described with reference to FIG. 1. The apparatus 1505 may also be or include a processor. The apparatus 1505 may include a receiver 1510, a wireless communication manager 1520, or a transmitter 1530. Each of these components may be in communication with each other.

The components of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1510 may include at least one RF receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIGS. 1-12. The receiver 1510 may be used to receive various types of data or control signals (i.e., transmissions) over one or more communication links of a wireless communication system, such as one or more communication links of the wireless communication system 100 described with reference to FIG. 1. In some examples, the receiver 1510 may also or alternatively include one or more wired receivers.

In some examples, the transmitter 1530 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIGS. 1-12. The transmitter 1530 may be used to transmit various types of data or control signals (i.e., transmissions) over one or more communication links of a wireless communication system, such as one or more communication links of the wireless communication system 100 described with reference to FIG. 1. In some examples, the transmitter 1530 may also or alternatively include one or more wired transmitters.

In some examples, the wireless communication manager 1520 may be used to manage one or more aspects of wireless communication for the apparatus 1505. In some examples, part of the wireless communication manager 1520 may be incorporated into or shared with the receiver 1510 or the transmitter 1530. In some examples, the wireless communication manager 1520 may be an example of aspects of the network access device wireless communication manager 120 described with reference to FIG. 1. In some examples, the wireless communication manager 1520 may include a UE scheduler 1535, a TTI generator 1540, or a TTI transmission manager 1545.

The UE scheduler 1535 may be used to identify a set of UEs to receive information in a first TTI (e.g., a first subframe).

The TTI generator 1540 may be used to generate the first TTI to include a first TTI-level control region comprising control information for each UE in the set of UEs, and a number of UE-specific regions, as described, for example, with reference to FIG. 4, 5, 6, 7, or 8. The first TTI-level control region may be located at an intersection of a first subset of time resources within the first TTI and a first subset of frequency resources within the first TTI. The first TTI-level control region and the number of UE-specific regions may be non-overlapping. The first TTI-level control region may include a pointer to at least one of the UE-specific regions, and in some cases may include pointers to each UE-specific region. Each of the UE-specific regions may be specific to a single UE or to a group of UEs, depending on configuration (and thus, a pointer to a UE-specific region (or RB allocation for a UE-specific region) may be assigned to or coded for a single UE or group of UEs).

The TTI transmission manager 1545 may be used to transmit the first TTI.

In some examples of the first TTI generated by the TTI generator 1540, each of the UE-specific regions may include a data region and/or a control region (e.g., a second tier of a cascaded TTI-level control region, or a RB-level control region). In some examples, a DCI payload for a UE may be distributed among the first TTI-level control region and one of the UE-specific regions, as described, for example, with reference to FIG. 8.

In some examples of the first TTI generated by the TTI generator 1540, the first TTI-level control region may include a CRS or DMRS for modulating a first set of control information included in the first TTI-level control region, as described, for example, with reference to FIG. 4, 5, 6, 7, 8, 9, 10, 11, or 12.

Figure 16:
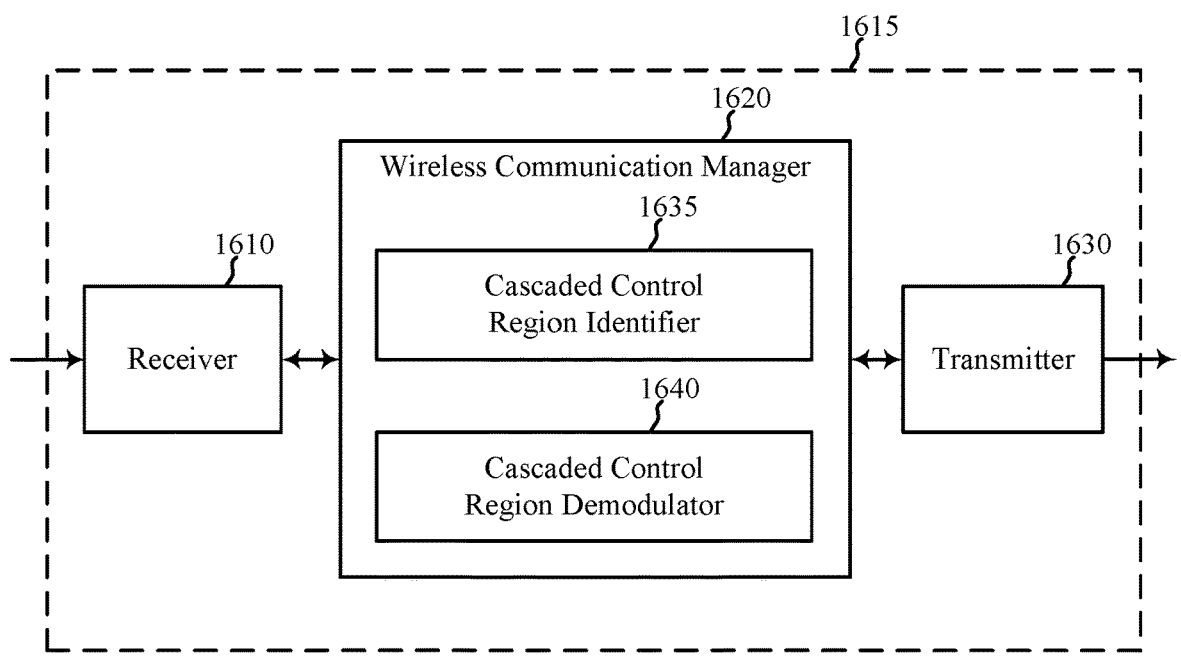
FIG. 16 shows a block diagram of an apparatus for use in wireless communication, in accordance with one or more aspects of the present disclosure.

FIG. 16 shows a block diagram 1600 of an apparatus 1615 for use in wireless communication, in accordance with one or more aspects of the present disclosure. The apparatus 1615 may be an example of aspects of one or more of the UEs 115 described with reference to FIG. 1, or aspects of the apparatus 1315 described with reference to FIG. 13. The apparatus 1615 may also be or include a processor. The apparatus 1615 may include a receiver 1610, a wireless communication manager 1620, or a transmitter 1630. Each of these components may be in communication with each other.

The components of the apparatus 1615 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1610 may include at least one RF receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIGS. 1-12. The receiver 1610 may be used to receive various types of data or control signals (i.e., transmissions) over one or more communication links of a wireless communication system, such as one or more communication links of the wireless communication system 100 described with reference to FIG. 1.

In some examples, the transmitter 1630 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIGS. 1-12. The transmitter 1630 may be used to transmit various types of data or control signals (i.e., transmissions) over one or more communication links of a wireless communication system, such as one or more communication links of the wireless communication system 100 described with reference to FIG. 1.

In some examples, the wireless communication manager 1620 may be used to manage one or more aspects of wireless communication for the apparatus 1615. In some examples, part of the wireless communication manager 1620 may be incorporated into or shared with the receiver 1610 or the transmitter 1630. In some examples, the wireless communication manager 1620 may be an example of aspects of the UE wireless communication manager 140 described with reference to FIG. 1. In some examples, the wireless communication manager 1620 may include a cascaded control region identifier 1635 or a cascaded control region demodulator 1640.

The cascaded control region identifier 1635 may be used to identify a TTI (e.g., a subframe) including a cascaded control region. The cascaded control region may include a TTI-level common control region and a TTI-level UE-specific control region. The TTI-level common control region may include a pointer to a location of the TTI-level UE-specific control region. The TTI-level UE-specific control region may be specific to a single UE or to a group of UEs, depending on configuration (and thus, the pointer to the location of the TTI-level UE-specific control region may be assigned to or coded for a single UE or group of UEs).

In some examples, the cascaded control region identifier 1635 may identify a TTI including a cascaded control region, the cascaded control region including a TTI-level common control region and a TTI-level UE-specific control region, the TTI-level common control region having a pointer to a location of the TTI-level UE-specific control region, tune to a first frequency range to receive the TTI-level common control region, tune to a second frequency range to receive data and the TTI-level UE-specific control region, where in the second frequency range is different from the first frequency range, release the SPS information based on the TTI-level UE-specific control region, tune to a first frequency range to receive common control information, after establishing a semi-persistent scheduling (SPS) configuration, tuning to a second frequency range to receive data and embedded control information, where the second frequency range is different from the first frequency range, identify a resource block that includes the TTI-level UE-specific control region, determine whether the identified resource block is assigned to the UE based on the TTI-level UE-specific control region, perform an error check of the TTI-level UE-specific control region, where the determining is based on an outcome of the error check, receive a first demodulation reference signal (DMRS) within the cascaded control region, determine the cascaded control region includes an incoming data assignment for the UE, determine, from a second TTI-level common control region received in the second cascaded control region, that the second TTI does not contain a transmission for the UE, enter a microsleep for a remainder of the second TTI upon determining that the second TTI does not contain a transmission for the UE, decode a signal including a grouped payload and embedded control information, where the grouped payload includes a payload designated to the subordinate entity and another payload designated to another subordinate entity, and based on an outcome of the error check, determining whether the resource block is assigned to the subordinate entity. In some cases, the determining occurs without decoding the TTI-level common control region. In some cases, the TTI-level common control region includes resource block (RB) allocation information for the TTI-level UE-specific control region. In some cases, the TTI-level UE-specific control region is time-division multiplexed with the data and indicates whether to release the SPS information. In some cases, the embedded control information is time-division multiplexed with the data and indicates whether to release the SPS configuration. In some cases, the using the embedded control information to confirm whether resource block is assigned to the subordinate entity includes: performing an error check on the embedded control information. In some cases, the TTI-level common control region is located at an intersection of a first subset of time resources of the TTI and a first subset of frequency resources of the TTI, and where the TTI-level common control region and the TTI-level UE-specific control region are non-overlapping. The cascaded control region demodulator 1640 may be used to demodulate at least one of the TTI-level common control region and the TTI-level UE-specific control region, as described, for example, with reference to FIG. 8.

In some examples, the cascaded control region demodulator 1640 may demodulate at least one of the TTI-level common control region or the TTI-level UE-specific control region, without retuning to the first frequency range, using the embedded control information to determine whether to release the SPS configuration, without decoding a common control channel, using the embedded control information to confirm whether the resource block is assigned to the subordinate entity, demodulate the TTI-level UE-specific control region, decode a signal including a grouped payload and the TTI-level UE-specific control region, where the grouped payload includes a first payload designated to the UE and a second payload designated to another UE, determine a portion of the signal that includes the second payload based on the TTI-level UE-specific control region, demodulate a second TTI-level UE-specific control region based on the first DMRS, the second TTI-level UE-specific control region occupying the first subset of frequency resources following the cascaded control region, demodulate, based on a second DMRS received in a second TTI, at least one of a FDM control region or data region in the second TTI, demodulate a second cascaded control region at an intersection of a second subset of time resources within a second TTI and a second subset of frequency resources within the second TTI, use the embedded control information to determine which portion of the decoded signal includes the payload designated for the subordinate entity, demodulate the TTI-level UE-specific control region at the location identified by the pointer, and demodulate the TTI-level common control region based on the first DMRS. In some cases, demodulating includes: refraining from demodulating the TTI-level common control region. In some cases, the demodulating includes: demodulating the TTI-level common control region to obtain the pointer.

Figure 17:
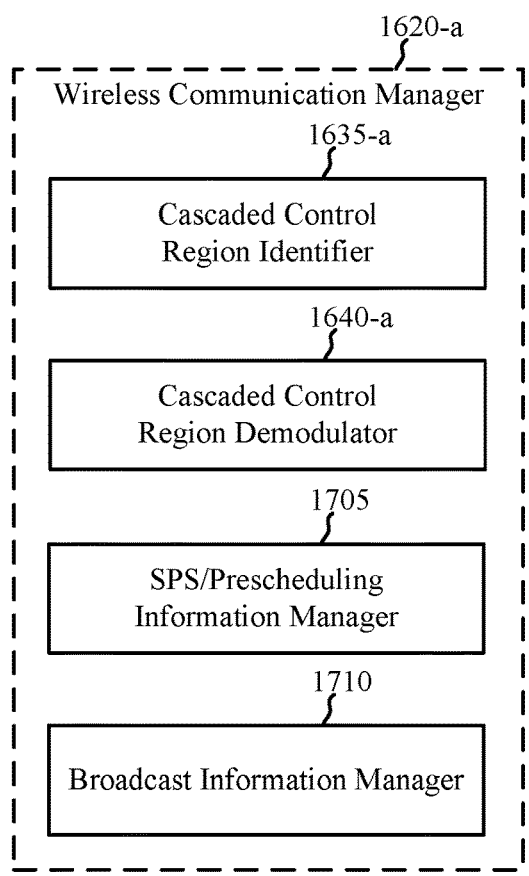
FIG. 17 shows a block diagram of a wireless communication manager for use in wireless communication, in accordance with one or more aspects of the present disclosure.

FIG. 17 shows a block diagram 1700 of a wireless communication manager 1620-*a* for use in wireless communication, in accordance with one or more aspects of the present disclosure. The wireless communication manager 1620-*a* may be an example of aspects of the wireless communication manager 140 or 1620 described with reference to FIG. 1 or 16.

The components of the wireless communication manager 1620-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1620-*a* may be used to manage one or more aspects of wireless communication for a UE or apparatus, such as one of the UEs 115 or apparatuses 1615 described with reference to FIG. 1 or 16. In some examples, part of the wireless communication manager 1620-*a* may be incorporated into or shared with a receiver or a transmitter (e.g., the receiver 1610 or the transmitter 1630 described with reference to FIG. 16). In some examples, the wireless communication manager 1620-*a* may include a cascaded control region identifier 1635-*a*, a cascaded control region demodulator 1640-*a*, a SPS/prescheduling information manager 1705, or a broadcast information manager 1710.

The cascaded control region identifier 1635-*a* may be used to identify a TTI (e.g., a subframe) including a cascaded control region. The cascaded control region may include a TTI-level common control region and a TTI-level UE-specific control region. The TTI-level common control region may include a pointer to a location of the TTI-level UE-specific control region. In some examples, the TTI-level common control region may include RB allocation information for the TTI-level UE-specific control region. The TTI-level UE-specific control region may be specific to a single UE or to a group of UEs, depending on configuration (and thus, the pointer to the location of the TTI-level UE-specific control region may be assigned to or coded for a single UE or group of UEs). In some examples, the TTI-level common control region may be located at an intersection of a first subset of time resources of the TTI and a first subset of frequency resources of the TTI, and the TTI-level common control region and the TTI-level UE-specific control region may be non-overlapping.

The cascaded control region demodulator 1640-*a* may be used to demodulate at least one of the TTI-level common control region and the TTI-level UE-specific control region, as described, for example, with reference to FIG. 8. In some examples, the demodulating may include demodulating the TTI-level common control region to obtain the pointer, and demodulating the TTI-level UE-specific control region at the location identified by the pointer. In some other examples, the demodulating may include refraining from demodulating the TTI-level common control region, and demodulating the TTI-level UE-specific control region based at least in part on SPS information or prescheduling information managed by the SPS/prescheduling information manager 1705.

The SPS/prescheduling information manager 1705 may be used to receive at least one of SPS information or prescheduling information prior to receiving a TTI. The SPS information or the prescheduling information may identify the location of a TTI-level UE-specific control region for the TTI.

In some examples, the SPS/prescheduling information manager 1705 may receive semi-persistent scheduling (SPS) information indicating semi-persistent resources prior to receiving the TTI, the SPS information identifying the location of the TTI-level UE-specific control region, release the SPS information is performed without retuning to the first frequency range, receive information including a semi-persistent scheduling (SPS) configuration for the subordinate entity, and use the SPS configuration, identifying a resource block that includes embedded control information.

The broadcast information manager 1710 may be used to demodulate broadcast control information received as unicast information in the TTI-level UE-specific control region.

Figure 18:
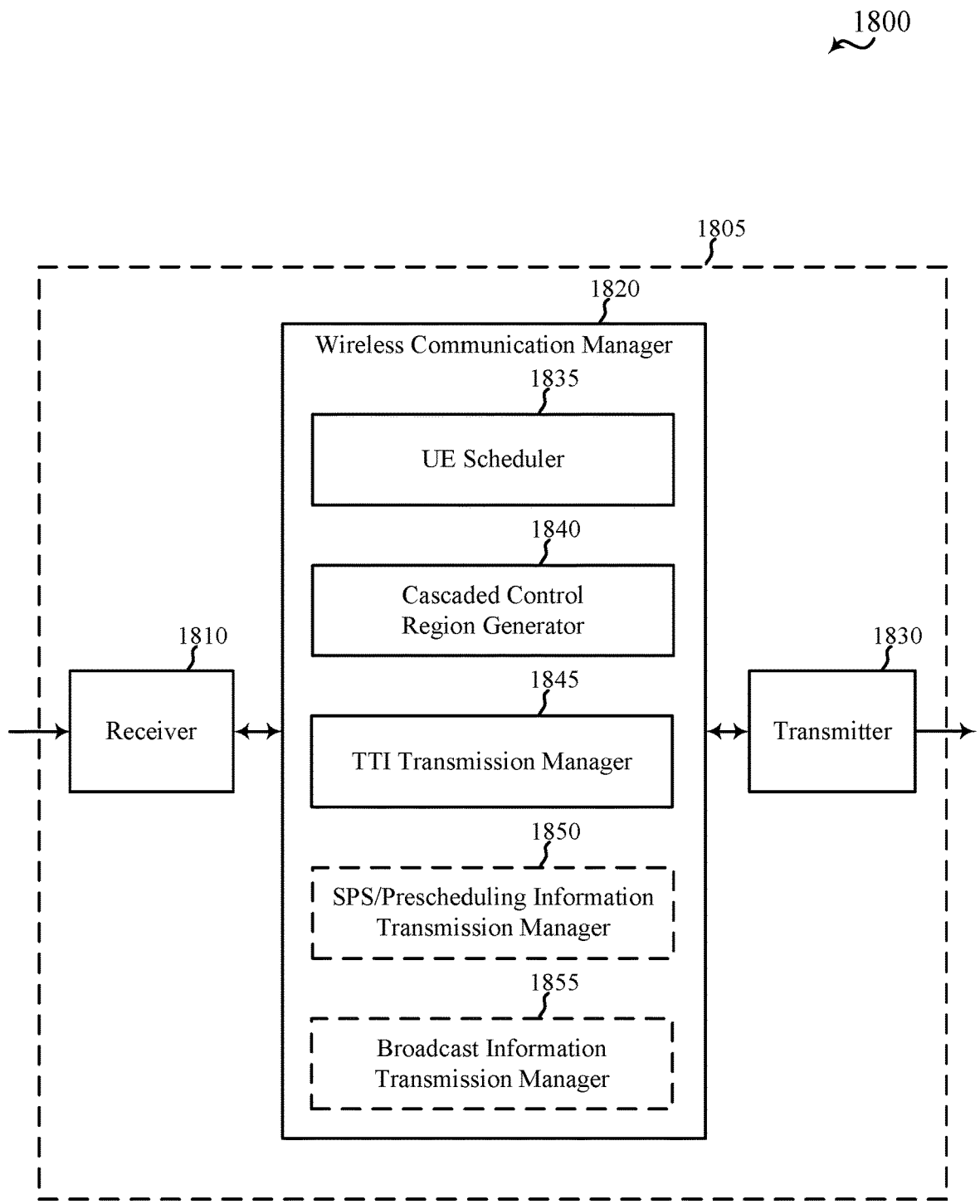
FIG. 18 shows a block diagram of an apparatus for use in wireless communication, in accordance with one or more aspects of the present disclosure.

FIG. 18 shows a block diagram 1800 of an apparatus 1805 for use in wireless communication, in accordance with one or more aspects of the present disclosure. The apparatus 1805 may be an example of aspects of one or more of the network access devices 105 described with reference to FIG. 1. The apparatus 1805 may also be or include a processor. The apparatus 1805 may include a receiver 1810, a wireless communication manager 1820, or a transmitter 1830. Each of these components may be in communication with each other.

The components of the apparatus 1805 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1810 may include at least one RF receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIGS. 1-12. The receiver 1810 may be used to receive various types of data or control signals (i.e., transmissions) over one or more communication links of a wireless communication system, such as one or more communication links of the wireless communication system 100 described with reference to FIG. 1. In some examples, the receiver 1810 may also or alternatively include one or more wired receivers.

In some examples, the transmitter 1830 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIGS. 1-12. The transmitter 1830 may be used to transmit various types of data or control signals (i.e., transmissions) over one or more communication links of a wireless communication system, such as one or more communication links of the wireless communication system 100 described with reference to FIG. 1. In some examples, the transmitter 1830 may also or alternatively include one or more wired transmitters.

In some examples, the wireless communication manager 1820 may be used to manage one or more aspects of wireless communication for the apparatus 1805. In some examples, part of the wireless communication manager 1820 may be incorporated into or shared with the receiver 1810 or the transmitter 1830. In some examples, the wireless communication manager 1820 may be an example of aspects of the network access device wireless communication manager 120 described with reference to FIG. 1. In some examples, the wireless communication manager 1820 may include a UE scheduler 1835, a cascaded control region generator 1840, a TTI transmission manager 1845, an optional SPS/prescheduling information transmission manager 1850, or an optional broadcast information transmission manager 1855.

The UE scheduler 1835 may be used to identify a set of UEs to receive information in a first TTI (e.g., a first subframe).

The cascaded control region generator 1840 may be used to generate the first TTI to include a cascaded control region. The cascaded control region may include a TTI-level common control region and a number of TTI-level UE-specific control regions. The TTI-level common control region may include a pointer to a location of each TTI-level UE-specific control region. In some examples, the TTI-level common control region may include RB allocation information for each TTI-level UE-specific control region. Each TTI-level UE-specific control region may be specific to a single UE or to a group of UEs, depending on configuration (and thus, a pointer to the location of a TTI-level UE-specific control region may be assigned to or coded for a single UE or group of UEs). In some examples, the TTI-level common control region may be located at an intersection of a first subset of time resources of the TTI and a first subset of frequency resources of the TTI, and the TTI-level common control region and the TTI-level UE-specific control region may be non-overlapping. The TTI transmission manager 1845 may be used to transmit the first TTI.

The SPS/prescheduling information transmission manager 1850 may be used to transmit at least one of SPS information or prescheduling information prior to the TTI transmission manager 1845 transmitting the first TTI. The SPS information or the prescheduling information may identify the location(s) of one or more of the TTI-level UE-specific control regions, enabling a UE that receives the SPS information or prescheduling information to refrain from demodulating the TTI-level common control region and just demodulate a TTI-level UE-specific control region transmitted for the UE.

The broadcast information transmission manager 1855 may be used to transmit broadcast control information for a UE or set of UEs. In some examples, the broadcast information transmission manager 1855 may transmit the broadcast control information as unicast information in a TTI-level UE-specific control region.

Figure 19:
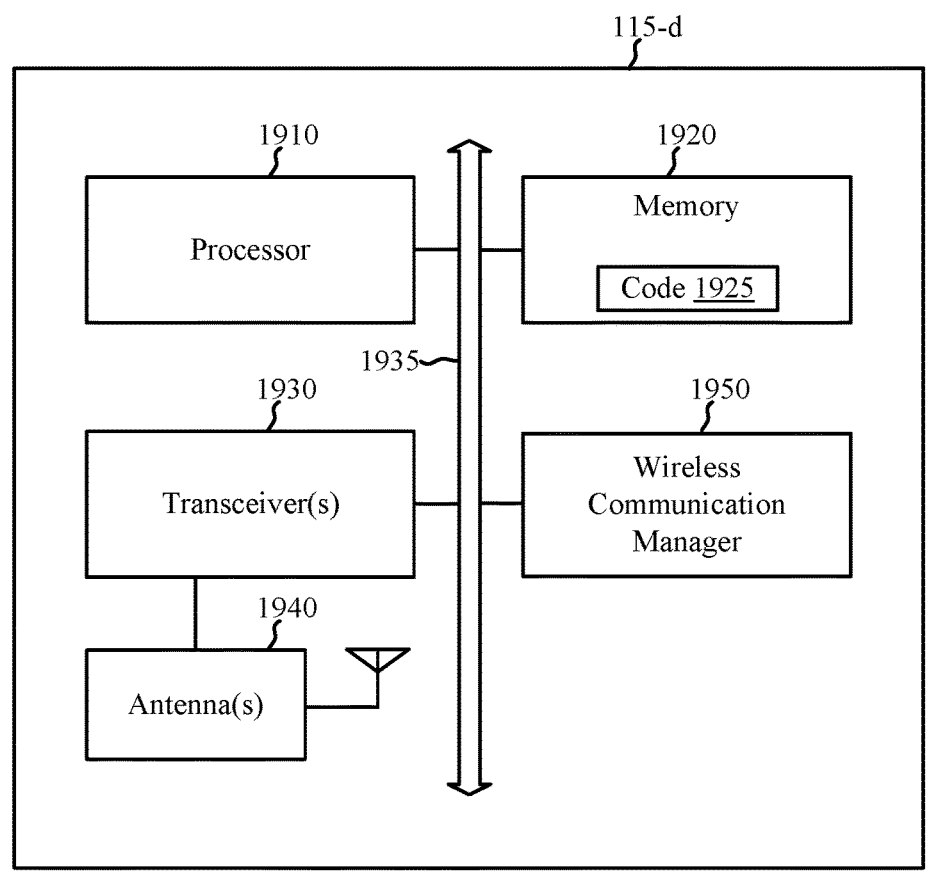
FIG. 19 shows a block diagram of a UE for use in wireless communication, in accordance with one or more aspects of the present disclosure.

FIG. 19 shows a block diagram 1900 of a UE 115-c for use in wireless communication, in accordance with one or more aspects of the present disclosure. The UE 115-c may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-c may, in some examples, have an internal power supply (not shown), such as a small battery, to facilitate mobile operation. In some examples, the UE 115-c may be an example of aspects of one or more of the UEs 115 described with reference to FIG. 1, or aspects of the apparatus 1315 or 1615 described with reference to FIG. 13 or 16. The UE 115-c may be configured to implement at least some of the UE or apparatus techniques and functions described with reference to FIG. 1, 2, 3, 4, 5, 6, 7, 8, 13, 14, 16, or 17.

The UE 115-c may include a processor 1910, a memory 1920, at least one transceiver (represented by transceiver(s) 1930), at least one antenna (represented by antenna(s) 1940), or a wireless communication manager 1950. Each of these components may be in communication with each other, directly or indirectly, over one or more buses 1935.

The memory 1920 may include random access memory (RAM) or read-only memory (ROM). The memory 1920 may store computer-readable, computer-executable code 1925 containing instructions that are configured to, when executed, cause the processor 1910 to perform various functions described herein related to wireless communication, including, for example, identifying and demodulating regions of TTIs transmitted according to TDM techniques, FDM techniques, or hybrid TDM-FDM techniques, and/or identifying and demodulating cascaded control regions of TTIs. Alternatively, the computer-executable code 1925 may not be directly executable by the processor 1910 but be configured to cause the UE 115-c (e.g., when compiled and executed) to perform various of the functions described herein.

The processor 1910 may include an intelligent hardware device, e.g., a central processing unit (CPU), a microcontroller, an ASIC, etc. The processor 1910 may process information received through the transceiver(s) 1930 or information to be sent to the transceiver(s) 1930 for transmission through the antenna(s) 1940. The processor 1910 may handle, alone or in connection with the wireless communication manager 1950, one or more aspects of communicating over (or managing communications over) one or more radio frequency spectrum bands.

The transceiver(s) 1930 may include a modem configured to modulate packets and provide the modulated packets to the antenna(s) 1940 for transmission, and to demodulate packets received from the antenna(s) 1940. The transceiver(s) 1930 may, in some examples, be implemented as one or more transmitters and one or more separate receivers. The transceiver(s) 1930 may support communications in one or more radio frequency spectrum bands. The transceiver(s) 1930 may be configured to communicate bi-directionally, via the antenna(s) 1940, with one or more of the network access devices 105 described with reference to FIG. 1, or one or more of the apparatus 1505 or the apparatus 1805 described with reference to FIG. 15 or 18. While the UE 115-*c* may include a single antenna, there may be examples in which the UE 115-*c* may include multiple antennas 1940.

The wireless communication manager 1950 may be configured to perform or control some or all of the UE or apparatus techniques or functions described with reference to FIG. 1, 2, 3, 4, 5, 6, 7, 8, 13, 14, 16, or 17 related to wireless communication over one or more radio frequency spectrum bands. The wireless communication manager 1950, or portions of it, may include a processor, or some or all of the functions of the wireless communication manager 1950 may be performed by the processor 1910 or in connection with the processor 1910. In some examples, the wireless communication manager 1950 may be an example of the wireless communication manager 140, 1320, or 1220 described with reference to FIG. 1, 13, or 16.

Figure 20:
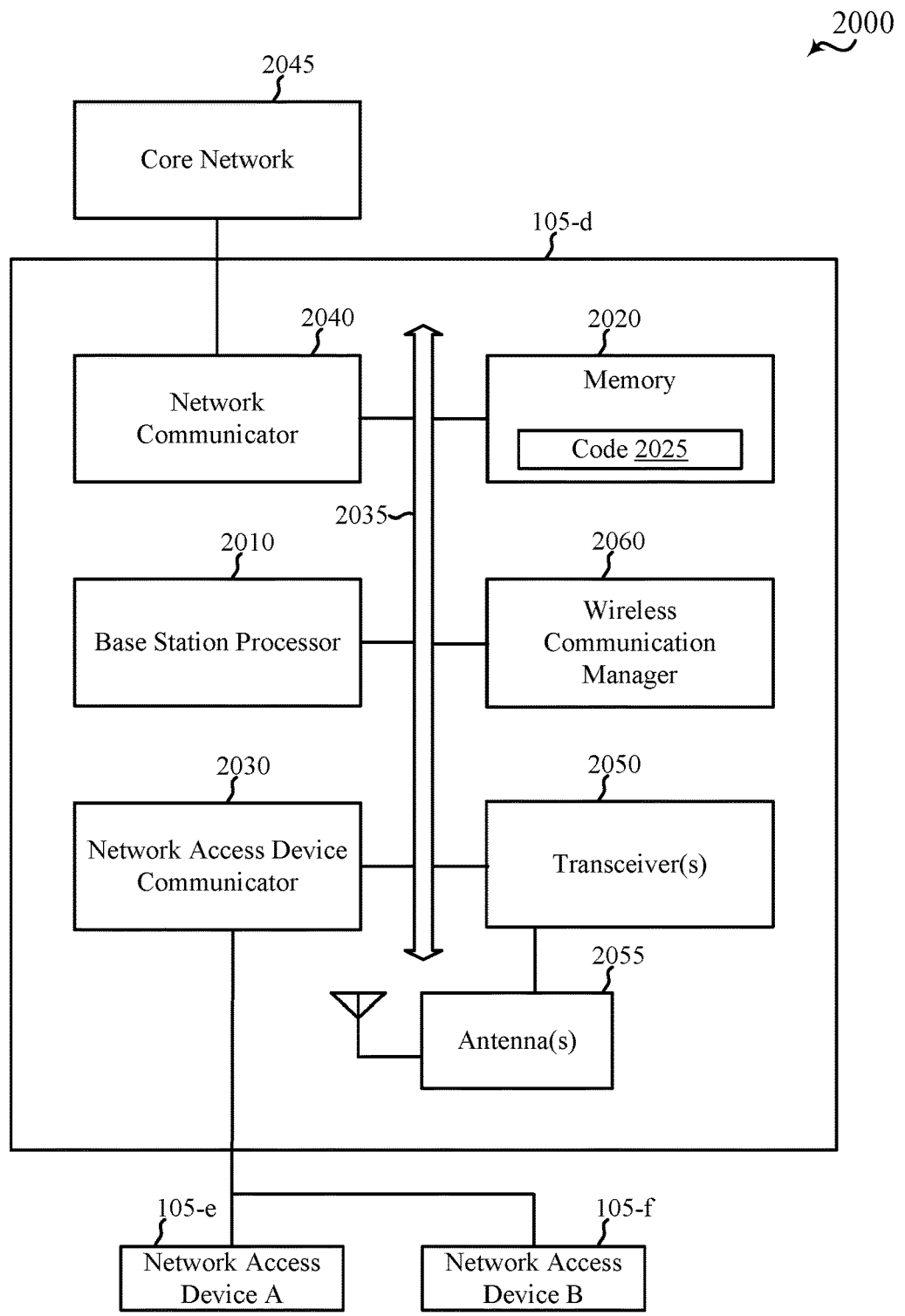
FIG. 20 shows a block diagram of a network access device for use in wireless communication, in accordance with one or more aspects of the present disclosure.

FIG. 20 shows a block diagram 2000 of a network access device 105-*d* for use in wireless communication, in accordance with one or more aspects of the present disclosure. In some examples, the network access device 105-*d* may be an example of one or more aspects of a network access device (e.g., an eNB, an ANC, a radio head, or a base station) described with reference to FIG. 1, or aspects of the apparatus 1505 or 1805 described with reference to FIG. 15 or 18. The network access device 105-*d* may be configured to implement or facilitate at least some of the network access device techniques and functions described with reference to FIG. 1, 2, 3, 4, 5, 6, 7, 8, 15, or 18.

The network access device 105-*d* may include a processor 2010, a memory 2020, at least one transceiver (represented by transceiver(s) 2050), at least one antenna (represented by base station antenna(s) 2055), or a wireless communication manager 2060. The network access device 105-*d* may also include one or more of a network access device communicator 2030 or a network communicator 2040. Each of these components may be in communication with each other, directly or indirectly, over one or more buses 2035.

The memory 2020 may include RAM or ROM. The memory 2020 may store computer-readable, computer-executable code 2025 containing instructions that are configured to, when executed, cause the processor 2010 to perform various functions described herein related to wireless communication, including, for example, scheduling UEs in TTIs generated and transmitted according to TDM techniques, FDM techniques, or hybrid TDM-FDM techniques, and/or scheduling UEs in TTIs having cascaded control regions. Alternatively, the computer-executable code 2025 may not be directly executable by the processor 2010 but be configured to cause the network access device 105-*d* (e.g., when compiled and executed) to perform various of the functions described herein.

The processor 2010 may include an intelligent hardware device, e.g., a CPU, a microcontroller, an ASIC, etc. The processor 2010 may process information received through the transceiver(s) 2050, the network access device communicator 2030, or the network communicator 2040. The processor 2010 may also process information to be sent to the transceiver(s) 2050 for transmission through the antenna(s) 2055, to the network access device communicator 2030, for transmission to one or more other network access devices (e.g., network access device 105-*e* and network access device 105-*f*), or to the network communicator 2040 for transmission to a core network 2045, which may be an example of one or more aspects of the core network 130 described with reference to FIG. 1. The processor 2010 may handle, alone or in connection with the wireless communication manager 2060, one or more aspects of communicating over (or managing communications over) one or more radio frequency spectrum bands.

The transceiver(s) 2050 may include a modem configured to modulate packets and provide the modulated packets to the antenna(s) 2055 for transmission, and to demodulate packets received from the antenna(s) 2055. The transceiver(s) 2050 may, in some examples, be implemented as one or more transmitters and one or more separate receivers. The transceiver(s) 2050 may support communications in one or more radio frequency spectrum bands. The transceiver(s) 2050 may be configured to communicate bi-directionally, via the antenna(s) 2055, with one or more UEs or apparatuses, such as one or more of the UEs 115 described with reference to FIG. 1 or 2, or one or more of the apparatus 1315 or the apparatus 1615 described with reference to FIG. 13, 14, 16, or 17. The network access device 105-*d* may, for example, include multiple antennas 2055 (e.g., an antenna array). The network access device 105-*d* may communicate with the core network 2045 through the network communicator 2040. The network access device 105-*d* may also communicate with other network access devices, such as the network access device 105-*e* and the network access device 105-*f*, using the network access device communicator 2030.

The wireless communication manager 2060 may be configured to perform or control some or all of the techniques or functions described with reference to FIG. 1, 2, 3, 4, 5, 6, 7, 8, 15, or 18 related to wireless communication over one or more radio frequency spectrum bands. The wireless communication manager 2060, or portions of it, may include a processor, or some or all of the functions of the wireless communication manager 2060 may be performed by the processor 2010 or in connection with the processor 2010. In some examples, the wireless communication manager 2060 may be an example of the wireless communication manager 120, 1520, or 1820 described with reference to FIG. 1, 15, or 18.

Figure 21:
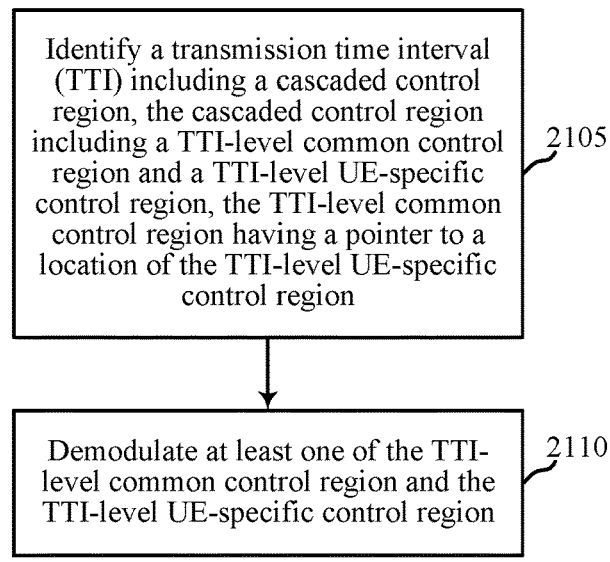
FIGS. 21-28 show methods for techniques for multiplexing or cascading control information and data within a transmission time interval in accordance with one or more aspects of the present disclosure.

FIG. 21 is a flow chart illustrating an example of a method 2100 for wireless communication, in accordance with one or more aspects of the present disclosure. For clarity, the method 2100 is described below with reference to aspects of one or more of the UEs 115 described with reference to FIG. 1 or 18, or aspects of the apparatus 1615 described with reference to FIG. 16, or aspects of the wireless communication manager 140, 1620, or 1950 described with reference to FIG. 1, 16, 17, or 19. In some examples, a wireless device (e.g., a UE, an apparatus, or a wireless communication manager) may execute one or more sets of codes to control the functional elements of the wireless device to perform the functions described below. Additionally or alternatively, the wireless device may perform one or more of the functions described below using special-purpose hardware.

At block 2105, the method 2100 may include identifying a TTI (e.g., a subframe) including a cascaded control region. The cascaded control region may include a TTI-level common control region and a TTI-level UE-specific control region. The TTI-level common control region may include a pointer to a location of the TTI-level UE-specific control region. In some examples, the TTI-level common control region may include RB allocation information for the TTI-level UE-specific control region. The TTI-level UE-specific control region may be specific to a single UE or to a group of UEs, depending on configuration (and thus, the pointer to the location of the TTI-level UE-specific control region may be assigned to or coded for a single UE or group of UEs). In some examples, the TTI-level common control region may be located at an intersection of a first subset of time resources of the TTI and a first subset of frequency resources of the TTI, and the TTI-level common control region and the TTI-level UE-specific control region may be non-overlapping. The operation(s) at block 2105 may be performed using the wireless communication manager 140, 1620, or 1950 described with reference to FIG. 1, 16, 17, or 19, or the cascaded control region identifier 1635 described with reference to FIG. 16 or 17.

At block 2110, the method 2100 may include demodulating at least one of the TTI-level common control region and the TTI-level UE-specific control region, as described, for example, with reference to FIG. 8. In some examples, the demodulating may include demodulating the TTI-level common control region to obtain the pointer, and demodulating the TTI-level UE-specific control region at the location identified by the pointer. In some other examples, the method 2100 may include receiving at least one of SPS information or prescheduling information prior to receiving the TTI at block 2105. The SPS information or the prescheduling information may identify the location of the TTI-level UE-specific control region, and the demodulating (at block 2110) may include refraining from demodulating the TTI-level common control region, and just demodulating the TTI-level UE-specific control region. The operation(s) at block 2110 may be performed using the wireless communication manager 140, 1620, or 1950 described with reference to FIG. 1, 16, 17, or 19, or the cascaded control region demodulator 1640 described with reference to FIG. 16 or 17.

In some examples, the method 2100 may include identifying and demodulating broadcast control information received as unicast information in the TTI-level UE-specific control region.

Thus, the method 2100 may provide for wireless communication. It should be noted that the method 2100 is just one implementation and that the operations of the method 2100 may be rearranged or otherwise modified such that other implementations are possible.

Figure 22:
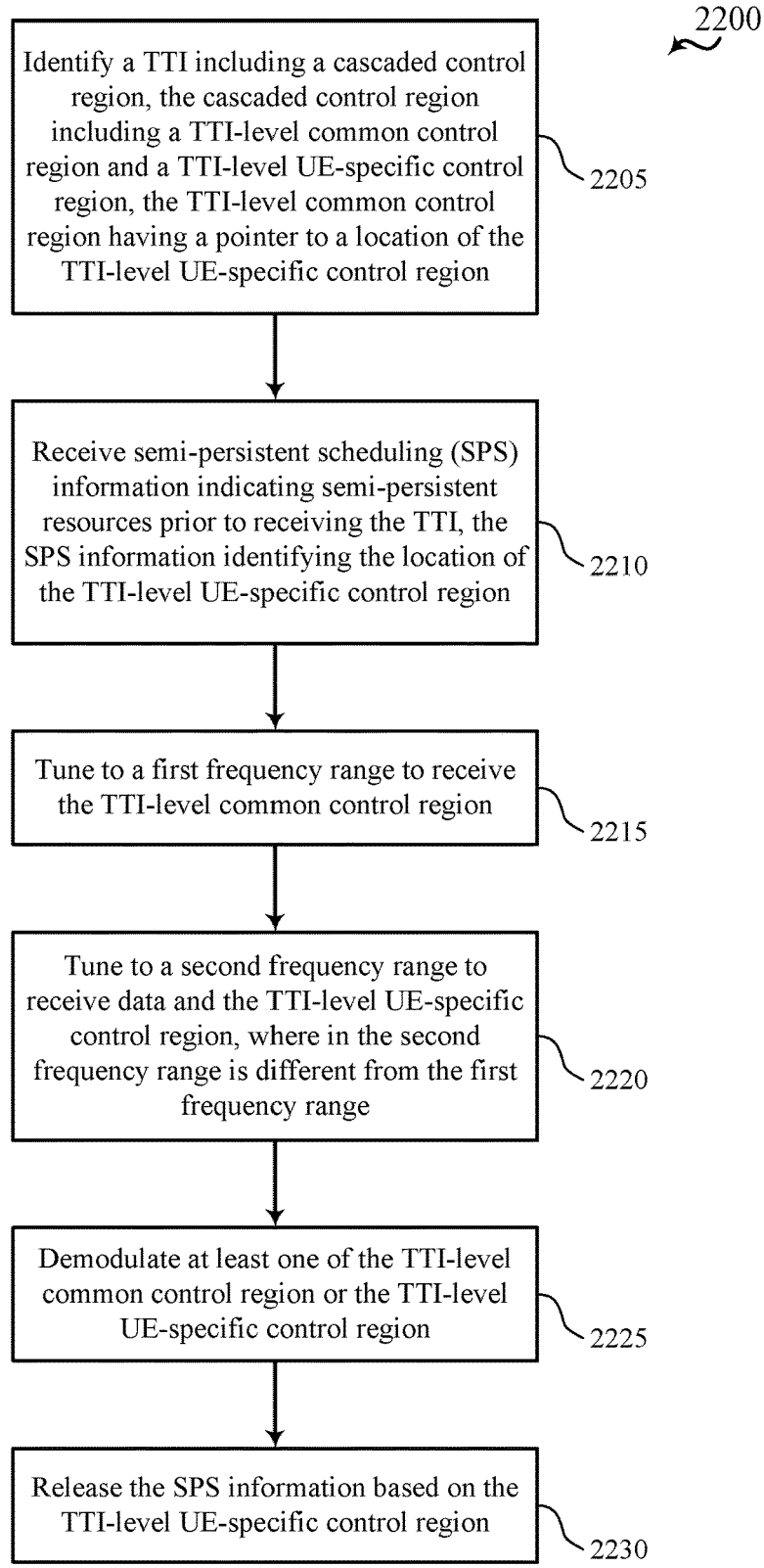

FIG. 22 shows a flowchart illustrating a method 2200 for techniques for multiplexing or cascading control information and data within a transmission time interval in accordance with one or more aspects of the present disclosure. The operations of method 2200 may be implemented by a UE 115 or its components as described herein. For example, the operations of method 2200 may be performed by a UE wireless communication manager as described with reference to FIGS. 13 through 19. In some examples, a UE 115 may execute a set of codes to control the functional elements of the device to perform the functions described below. Additionally or alternatively, the UE 115 may perform aspects the functions described below using special-purpose hardware.

At block 2205 the UE 115 may identify a transmission time interval (TTI) comprising a cascaded control region, the cascaded control region comprising a TTI-level common control region and a TTI-level UE-specific control region, the TTI-level common control region having a pointer to a location of the TTI-level UE-specific control region. The operations of block 2205 may be performed according to the methods described with reference to FIGS. 1 through 12. In certain examples, aspects of the operations of block 2205 may be performed by a cascaded control region identifier as described with reference to FIGS. 13 through 19.

At block 2210 the UE 115 may receive semi-persistent scheduling (SPS) information indicating semi-persistent resources prior to receiving the TTI, the SPS information identifying the location of the TTI-level UE-specific control region. The operations of block 2210 may be performed according to the methods described with reference to FIGS. 1 through 12. In certain examples, aspects of the operations of block 2210 may be performed by a SPS/prescheduling information manager as described with reference to FIGS. 13 through 19.

At block 2215 the UE 115 may tune to a first frequency range to receive the TTI-level common control region. The operations of block 2215 may be performed according to the methods described with reference to FIGS. 1 through 12. In certain examples, aspects of the operations of block 2215 may be performed by a cascaded control region identifier as described with reference to FIGS. 13 through 19.

At block 2220 the UE 115 may tune to a second frequency range to receive data and the TTI-level UE-specific control region, where in the second frequency range is different from the first frequency range. The operations of block 2220 may be performed according to the methods described with reference to FIGS. 1 through 12. In certain examples, aspects of the operations of block 2220 may be performed by a cascaded control region identifier as described with reference to FIGS. 13 through 19.

At block 2225 the UE 115 may demodulate at least one of the TTI-level common control region or the TTI-level UE-specific control region. The operations of block 2225 may be performed according to the methods described with reference to FIGS. 1 through 12. In certain examples, aspects of the operations of block 2225 may be performed by a cascaded control region demodulator as described with reference to FIGS. 13 through 19.

At block 2230 the UE 115 may release the SPS information based at least in part on the TTI-level UE-specific control region. The operations of block 2230 may be performed according to the methods described with reference to FIGS. 1 through 12. In certain examples, aspects of the operations of block 2230 may be performed by a cascaded control region identifier as described with reference to FIGS. 13 through 19.

Thus, the method 2200 may provide for wireless communication. It should be noted that the method 2200 is just one implementation and that the operations of the method 2200 may be rearranged or otherwise modified such that other implementations are possible.

Figure 23:
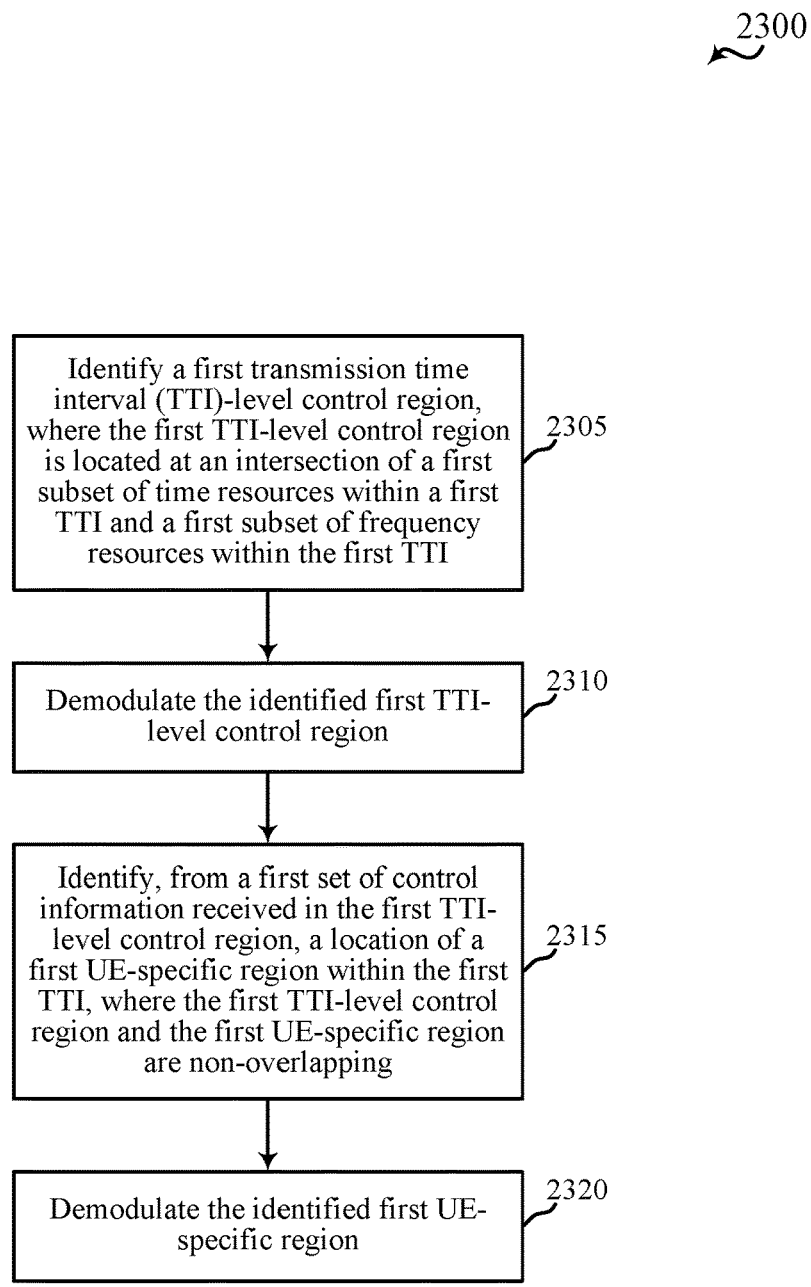

FIG. 23 is a flow chart illustrating an example of a method 2300 for wireless communication, in accordance with one or more aspects of the present disclosure. For clarity, the method 2300 is described below with reference to aspects of one or more of the UEs 115 described with reference to FIG. 1 or 15, or aspects of the apparatus 1315 described with reference to FIG. 13, or aspects of the wireless communication manager 140, 1320, or 1550 described with reference to FIG. 1, 13, 14, or 15. In some examples, a wireless device (e.g., a UE, an apparatus, or a wireless communication manager) may execute one or more sets of codes to control the functional elements of the wireless device to perform the functions described below. Additionally or alternatively, the wireless device may perform one or more of the functions described below using special-purpose hardware.

At block 2305, the method 2300 may include identifying a first TTI-level control region. The first TTI-level control region may be located at an intersection of a first subset of time resources within a first TTI (e.g., a first subframe) and a first subset of frequency resources within the first TTI. The operation(s) at block 2305 may be performed using the wireless communication manager 140, 1320, or 1550 described with reference to FIG. 1, 13, 14, or 15, or the TTI region identifier 1335 described with reference to FIG. 13 or 14.

At block 2310, the method 2300 may include demodulating the identified first TTI-level control region. The operation(s) at block 2310 may be performed using the wireless communication manager 140, 1320, or 1550 described with reference to FIG. 1, 13, 14, or 15, or the TTI region demodulator 1340 described with reference to FIG. 13 or 14.

At block 2315, the method 2300 may include identifying, from a first set of control information received in the first TTI-level control region, a location of a first UE-specific region within the first TTI. The first UE-specific region may be specific to a single UE or to a group of UEs, depending on configuration (and thus, a pointer to the first UE-specific region (or RB allocation for the first UE-specific region), contained in the first set of control information, may be assigned to or coded for a single UE or group of UEs). The first TTI-level control region and the first UE-specific region may be non-overlapping. The first UE-specific region may include a data region and/or a control region (e.g., a second tier of a cascaded TTI-level control region, or a RB-level control region). In some examples, a DCI payload for the wireless device (e.g., the UE) performing the method 2300 may be distributed among the first TTI-level control region and the first UE-specific region, as described, for example, with reference to FIG. 8. The operation(s) at block 2315 may be performed using the wireless communication manager 140, 1320, or 1550 described with reference to FIG. 1, 13, 14, or 15, or the TTI region identifier 1335 described with reference to FIG. 13 or 10.

At block 2320, the method 2300 may include demodulating the identified first UE-specific region. The operation(s) at block 2320 may be performed using the wireless communication manager 140, 1320, or 1550 described with reference to FIG. 1, 13, 14, or 15, or the TTI region demodulator 1340 described with reference to FIG. 13 or 10.

In some examples, the method 2300 may include receiving a CRS within the first TTI-level control region (at block 2305), and demodulating the first set of control information (at block 2310) based at least in part on the CRS, as described, for example, with reference to FIG. 4. In some examples, the method 2300 may include receiving a first DMRS within the first TTI-level control region (at block 2305), and demodulating the first set of control information (at block 2310) based at least in part on the first DMRS, as described, for example, with reference to FIG. 5. In some examples, the method 2300 may include determining the first TTI-level control region includes an incoming data assignment for the wireless device (e.g., UE) performing the method 2300, and optionally demodulating a second UE-specific region based on the first DMRS. The second UE-specific region may occupy the first subset of frequency resources following the first TTI-level control region (e.g., similarly to the second UE-specific region 510-b occupying the same subset of frequency resources as the first control region 505-a, as described with reference to FIG. 5).

In some examples of the method 2300, the wireless device performing the method 2300 may receive control information and/or data in some other TTIs configured similarly to the first TTI, and/or in other TTIs configured differently than the first TTI. In the latter case, the wireless device may in some cases demodulate at least one of a FDM control region or data region in a second TTI, and may demodulate the FDM control region or data region based at least in part on a second DMRS received in the second TTI (and in some cases may demodulate the control region based on a second DMRS and demodulate the data region based on a third DMRS), as described, for example, with reference to FIGS. 5 and 6.

In some examples of the method 2300, the wireless device performing the method 2300 may receive a second TTI-level control region within a second TTI (e.g., at an intersection of a second subset of time resources within the second TTI and a second subset of frequency resources within the second TTI); demodulate the second TTI-level control region; and determine, from a second set of control information received in the second TTI-level control region, that the second TTI does not contain a transmission for the wireless device. In these examples, the wireless device may enter a microsleep for a remainder of the second TTI.

Thus, the method 2300 may provide for wireless communication. It should be noted that the method 2300 is just one implementation and that the operations of the method 2300 may be rearranged or otherwise modified such that other implementations are possible.

In some examples, aspects of the methods 2100, 2200, and 2300 described with reference to FIGS. 21, 22, and 23 may be combined.

Figure 24:
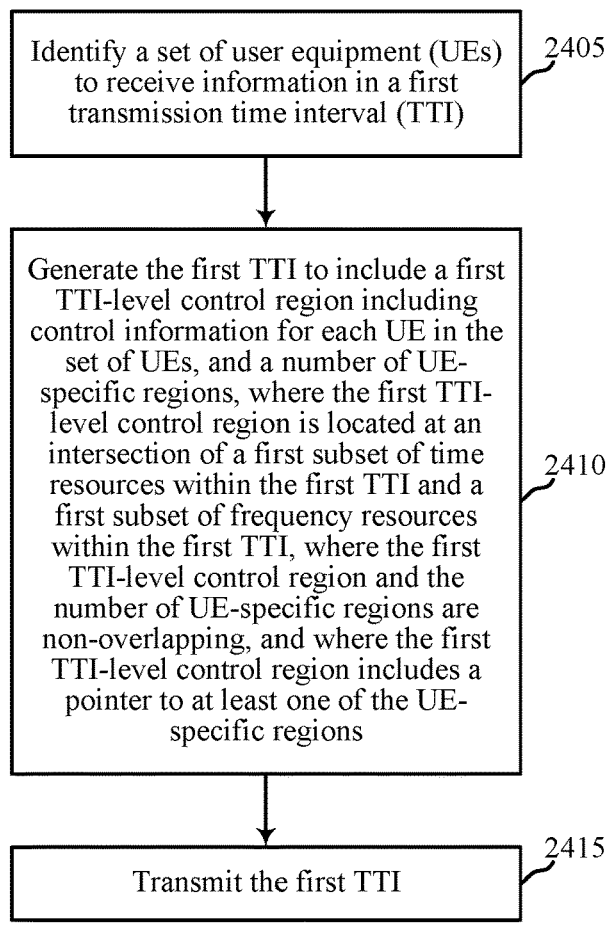

FIG. 24 is a flow chart illustrating an example of a method 2400 for wireless communication, in accordance with one or more aspects of the present disclosure. For clarity, the method 2400 is described below with reference to aspects of the network access devices 105 (e.g., eNBs, ANCs, radio heads, or base stations) described with reference to FIG. 1 or 20, or aspects of the apparatus 1505 described with reference to FIG. 15, or aspects of the wireless communication manager 120, 1520, or 2060 described with reference to FIG. 1, 15, or 20. In some examples, a network access device may execute one or more sets of codes to control the functional elements of the network access device to perform the functions described below. Additionally or alternatively, the network access device may perform one or more of the functions described below using special-purpose hardware.

At block 2405, the method 2400 may include identifying a set of UEs to receive information in a first TTI (e.g., a first subframe). The operation(s) at block 2405 may be performed using the wireless communication manager 120, 1520, or 2060 described with reference to FIG. 1, 15, or 20, or the UE scheduler 1535 described with reference to FIG. 15.

At block 2410, the method 2400 may include generating the first TTI to include a first TTI-level control region comprising control information for each UE in the set of UEs, and a number of UE-specific regions, as described, for example, with reference to FIG. 4, 5, 6, 7, or 8. The first TTI-level control region may be located at an intersection of a first subset of time resources within the first TTI and a first subset of frequency resources within the first TTI. The first TTI-level control region and the number of UE-specific regions may be non-overlapping. The first TTI-level control region may include a pointer to at least one of the UE-specific regions, and in some cases may include pointers to each UE-specific region. Each UE-specific region may be specific to a single UE or to a group of UEs, depending on configuration (and thus, a pointer to a UE-specific region (or RB allocation for a UE-specific region) may be assigned to or coded for a single UE or group of UEs). The operation(s) at block 2410 may be performed using the wireless communication manager 120, 1520, or 2060 described with reference to FIG. 1, 15, or 20, or the TTI generator 1540 described with reference to FIG. 15.

At block 2415, the method 2400 may include transmitting the first TTI. The operation(s) at block 2415 may be performed using the wireless communication manager 120, 1520, or 2060 described with reference to FIG. 1, 15, or 20, or the TTI transmission manager 1545 described with reference to FIG. 15.

In some examples of the method 2400, each of the UE-specific regions may include a data region and/or a control region (e.g., a second tier of a cascaded TTI-level control region, or a RB-level control region). In some examples, a DCI payload for a wireless device (e.g., a UE) may be distributed among the first TTI-level control region and one of the UE-specific regions, as described, for example, with reference to FIG. 8.

In some examples of the method 2400, the first TTI-level control region may include a CRS or DMRS for modulating a first set of control information included in the first TTI-level control region, as described, for example, with reference to FIG. 4, 5, 6, 7, or 8.

Thus, the method 2400 may provide for wireless communication. It should be noted that the method 2400 is just one implementation and that the operations of the method 2400 may be rearranged or otherwise modified such that other implementations are possible.

Figure 25:
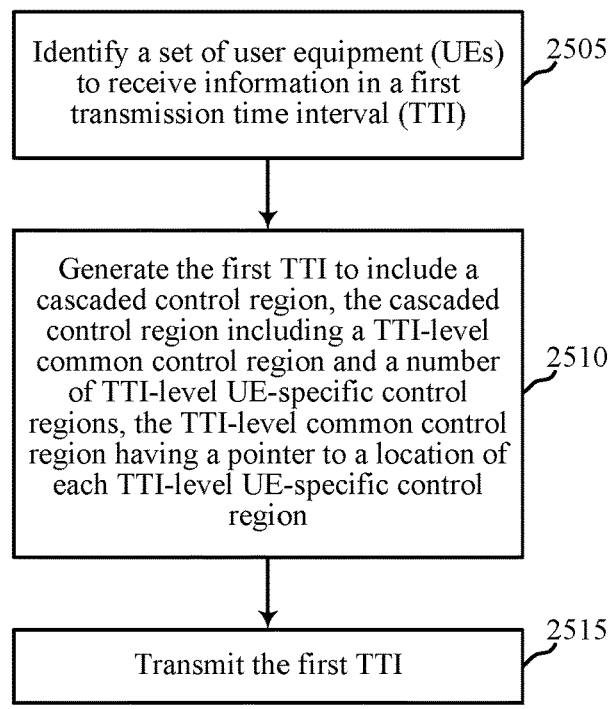

FIG. 25 is a flow chart illustrating an example of a method 2500 for wireless communication, in accordance with one or more aspects of the present disclosure. For clarity, the method 2500 is described below with reference to aspects of the network access devices 105 (e.g., eNBs, ANCs, radio heads, or base stations) described with reference to FIG. 1 or 20, or aspects of the apparatus 1805 described with reference to FIG. 18, or aspects of the wireless communication manager 120, 1820, or 2060 described with reference to FIG. 1, 18, or 20. In some examples, a network access device may execute one or more sets of codes to control the functional elements of the network access device to perform the functions described below. Additionally or alternatively, the network access device may perform one or more of the functions described below using special-purpose hardware.

At block 2505, the method 2500 may include identifying a set of UEs to receive information in a first TTI (e.g., a first subframe). The operation(s) at block 2405 may be performed using the wireless communication manager 120, 1820, or 2060 described with reference to FIG. 1, 18, or 20, or the UE scheduler 1835 described with reference to FIG. 18.

At block 2510, the method 2500 may include generating the first TTI to include a cascaded control region. The cascaded control region may include a TTI-level common control region and a number of TTI-level UE-specific control regions. The TTI-level common control region may include a pointer to a location of each TTI-level UE-specific control region. In some examples, the TTI-level common control region may include RB allocation information for each TTI-level UE-specific control region. Each TTI-level UE-specific control region may be specific to a single UE or to a group of UEs, depending on configuration (and thus, a pointer to the location of a TTI-level UE-specific control region may be assigned to or coded for a single UE or group of UEs). In some examples, the TTI-level common control region may be located at an intersection of a first subset of time resources of the TTI and a first subset of frequency resources of the TTI, and the TTI-level common control region and the TTI-level UE-specific control region may be non-overlapping. The operation(s) at block 2505 may be performed using the wireless communication manager 120, 1820, or 2060 described with reference to FIG. 1, 18, or 20, or the cascaded control region generator 1840 described with reference to FIG. 18.

At block 2515, the method 2500 may include transmitting the first TTI. The operation(s) at block 2515 may be performed using the wireless communication manager 120, 1820, or 2060 described with reference to FIG. 1, 18, or 20, or the TTI transmission manager 1845 described with reference to FIG. 18.

In some examples of the method 2500, the network access device performing the method 2500 may transmit at least one of SPS information or prescheduling information prior to transmitting the first TTI at block 2515. The SPS information or the prescheduling information may identify the location(s) of one or more of the TTI-level UE-specific control regions, enabling a UE that receives the SPS information or prescheduling information to refrain from demodulating the TTI-level common control region and just demodulate a TTI-level UE-specific control region transmitted for the UE.

In some examples, the method 2500 may include transmitting broadcast control information for a UE or set of UEs as unicast information in a TTI-level UE-specific control region.

Thus, the method 2500 may provide for wireless communication. It should be noted that the method 2500 is just one implementation and that the operations of the method 2500 may be rearranged or otherwise modified such that other implementations are possible.

In some examples, aspects of the methods 2400 and 2500 described with reference to FIGS. 24 and 25 may be combined.

Figure 26:
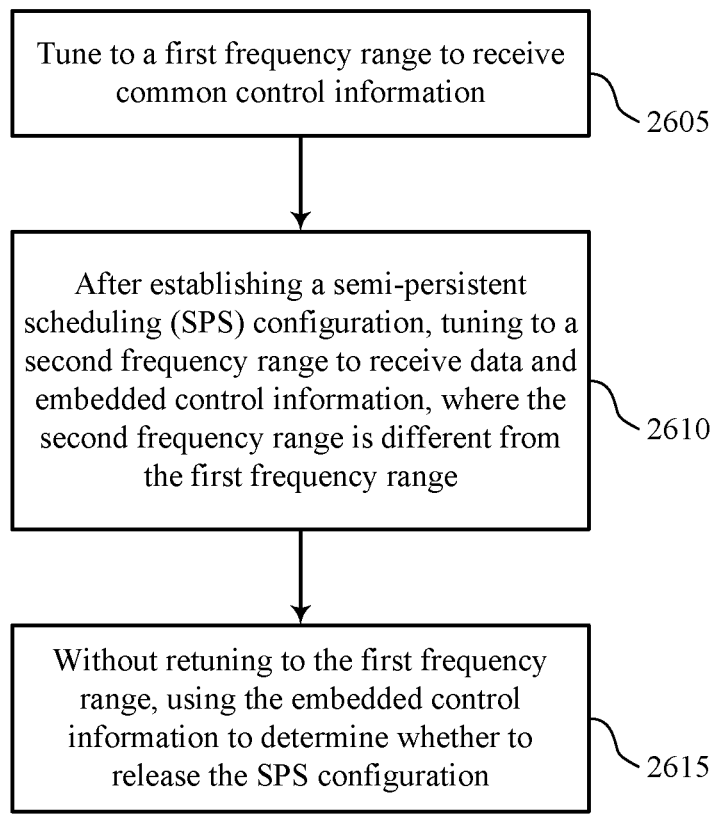

FIG. 26 is a flow chart illustrating an example of a method 2600 for wireless communication, in accordance with one or more aspects of the present disclosure. In some examples, such methods and/or processes may be performed by the UE 115-$b$. At block 2605, the UE 115-$b$ may tune to a first frequency range to receive common control information. For example, referring to FIG. 12, the UE 115-$b$ may tune to the control bandwidth illustrated with respect to $TTI_n$ in order to receive common control information ($Ctrl_n$). The operation(s) at block 2605 may be performed using the wireless communication manager 140, 1320, or 1550 described with reference to FIG. 1, 13, 14, or 15.

After establishing an SPS configuration, at block 2610, the UE 115-$b$ may tune to a second frequency range to receive data and embedded control information, wherein the second frequency range is different from the first frequency range. For example, referring to FIG. 12, the UE 115-$b$ may perform RF retuning, as illustrated during a portion of $TTI_n$. By RF retuning, the UE 115-$b$ may tune away from the control bandwidth utilized to receive the common control information ($Ctrl_n$) and tune to a bandwidth corresponding to the resource blocks allocated to the UE 115-*b*, as illustrated in the diagram 1200 with respect to $TTI_n$. As described in greater detail above, those allocated resource blocks may include embedded control information. In some examples, such embedded control information may include information indicating whether the UE 115-*b* should maintain or release the SPS configuration. The operation(s) at block 2610 may be performed using the wireless communication manager 140, 1320, or 1550 described with reference to FIG. 1, 13, 14, or 15.

Accordingly, at block 2615, without retuning to the first frequency range, the UE 115-*b* may use the embedded control information to determine whether to release the SPS configuration. For example, referring to FIG. 12, the UE 115-*b* may utilize control information embedded at the beginning portion of $TTI_{n+1}$ and $TTI_{n+2}$ to determine whether to release the SPS configuration, without retuning to the control bandwidth to monitor common control information ($Ctrl_{n+1}$, $Ctrl_{n+2}$). By making this determination without retuning to the first frequency range corresponding to the common control channel ($Ctrl_{n+1}$, $Ctrl_{n+2}$), the UE 115-*b* can avoid expending valuable time, computational resources, and battery power to determine whether to release the SPS configuration. Although existing systems may involve such a retuning process to monitor the common control channel (e.g., PDCCH) for the SPS release message, some aspects of the present disclosure provide features that may obviate such a retuning process, thereby providing certain enhancements to the overall communication system and ultimately the user experience. The operation(s) at block 2615 may be performed using the wireless communication manager 140, 1320, or 1550 described with reference to FIG. 1, 13, 14, or 15.

Figure 27:
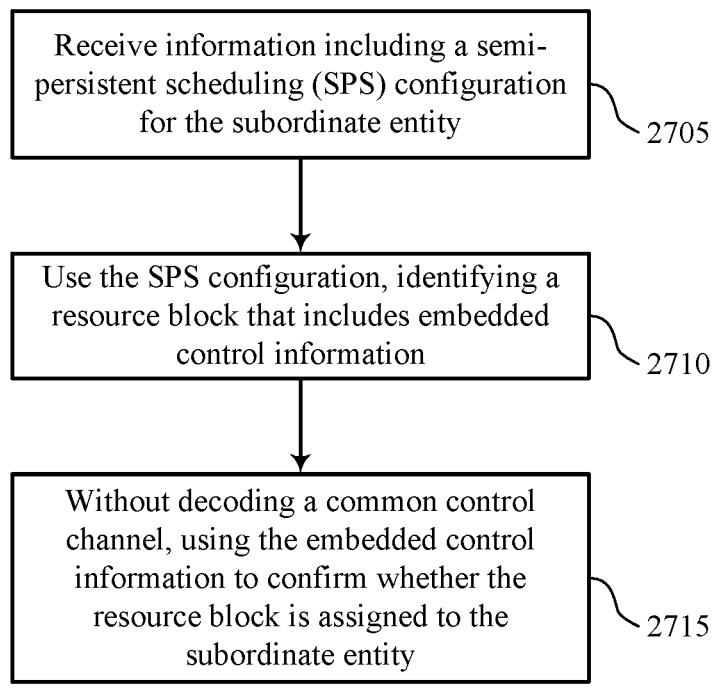

FIG. 27 is a flow chart illustrating an example of a method 2700 for wireless communication, in accordance with one or more aspects of the present disclosure. In some examples, such methods and/or processes may be performed by the UE 115-*b*. At block 2705, the UE 115-*b* may receive information including an SPS configuration. As described in greater detail above, SPS may enable prescheduling of resource blocks for the UE 115-*b*. The operation(s) at block 2705 may be performed using the wireless communication manager 140, 1320, or 1550 described with reference to FIG. 1, 13, 14, or 15.

At block 2710, using the SPS configuration, the UE 115-*b* may identify a resource block that includes embedded control information. While receiving the information included in the resource block, at block 2715, the UE 115-*b* may use the embedded control information to confirm whether the resource block is assigned to the UE 115-*b*. The UE 115-*b* may confirm whether the resource block is assigned to the subordinate entity without decoding a common control channel. The operation(s) at blocks 2710 and 2715 may be performed using the wireless communication manager 140, 1320, or 1550 described with reference to FIG. 1, 13, 14, or 15.

The UE 115-*b* may benefit from an opportunity to confirm an assignment of a resource block without having to decode a common control channel (e.g., PDCCH). By not having to decode the common control channel (e.g., PDCCH) to confirm the assignment of the resource block, the UE 115-*b* may be enabled to operate with less overhead than otherwise required. The UE 115-*b* may confirm the assignment using various techniques without deviating from the scope of the present disclosure. In some examples, the UE 115-*b* may confirm the assignment by performing an error check on the embedded control information and, based on the outcome of the error check, determine whether the resource block is assigned to the UE 115-*b*.

Because the embedded control information may be used to confirm an assignment of a resource block, some resource blocks may be assigned to more than one UE 115-*b* (which may sometimes be called 'overbooking' a resource block). Overbooking of resource blocks may not be possible in some existing systems, which typically allocate resource blocks on a deterministic, one-to-one (e.g., one resource block for one UE 115-*b*) manner. Accordingly, in some aspects of the present disclosure, two or more Internet of Everything (IoE) (which may sometimes be called Internet of Things (IoT)) devices (e.g., UEs 115-*b*) may be grouped together and assigned a common SPS configuration (e.g., schedule) and common resource block.

In some configurations, a PDDICH carried in the embedded control information may support link adaptation. In some configurations, various ad-hoc frequency hopping schemes may be implemented. In some configurations, such features may be utilized even for non-VoIP applications. In some configurations, the foregoing features may be deployed for a large number of IoE/IoT devices (e.g., UEs 115-*b*) with relatively low overhead (for control information).

Figure 28:
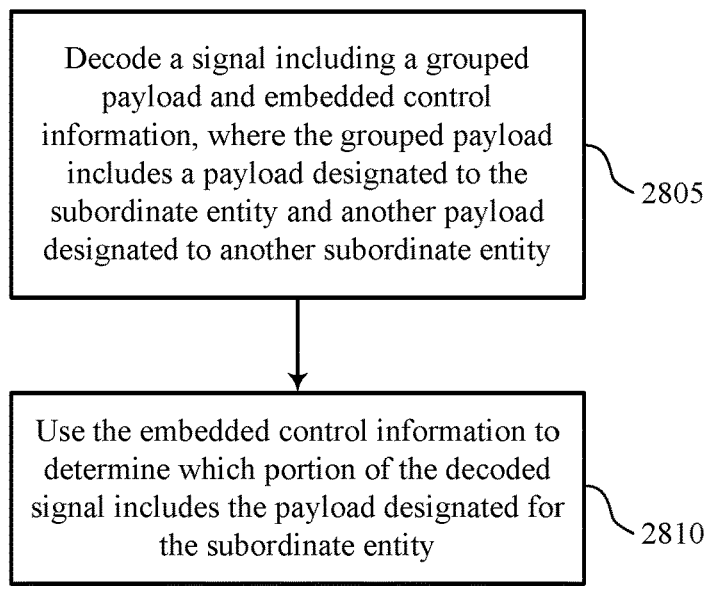

FIG. 28 is a flow chart illustrating an example of a method 2800 for wireless communication, in accordance with one or more aspects of the present disclosure. In some examples, such methods and/or processes may be performed by the UE 115-*b*. In some circumstances, the size of the payload for some transmissions is relatively small (e.g., tens of bytes). For instance, an application may wish to transmit only a few bytes at a time. In such circumstances, the available resource blocks may not be fully utilized, which may result in waste or underutilization of available communication resources.

According to some aspects of the present disclosure, such relatively small-sized payloads may be grouped together, encoded, and transmitted in a single packet as a multicast signal. Such a signal may be called a multi-user packet (MUP). So that the UEs 115-*b* receiving such a signal can determine which portion of that signal contains the payload designated for it, the signal may also include embedded control information. For example, the ANC 105-*b* may group two or more payloads that have a size less than a certain threshold value, embed control information, encode the grouped payloads and embedded control information, and transmit that encoded information as a multicast signal to a plurality of UEs 115-*b*.

After receiving such a signal, the UE 115-*b* may need to determine which of the payloads included in that signal is designated for it. Accordingly, at block 2805, the UE 115-*b* may decode the signal that includes the grouped payload and embedded control information. As indicated above, the grouped payload includes a payload designated to the UE 115-*b* and another payload designated to another subordinate entity. At block 2810, the UE 115-*b* may use the embedded control information to determine which portion of the decoded signal includes the payload designated to the UE 115-*b* (as oppose to another subordinate entity). The operation(s) at blocks 2805 and 2810 may be performed using the wireless communication manager 140, 1320, or 1550 described with reference to FIG. 1, 13, 14, or 15.

The methods and/or processes described with reference to FIGS. 26-28 are provided for illustrative purposes and are not intended to limit the scope of the present disclosure. The methods and/or processes described with reference to FIGS. 26-28 may be performed in sequences different from those illustrated therein without deviating from the scope of the present disclosure. Additionally, some or all of the methods and/or processes described with reference to FIGS. 26-28 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
identifying a transmission time interval (TTI) comprising cascaded control information, the cascaded control information comprising TTI-level common control information and TTI-level UE-specific control information, the TTI-level common control information having a pointer to a location of the TTI-level UE-specific control information;
receiving semi-persistent scheduling (SPS) information indicating semi-persistent resources, the SPS information identifying the location of the TTI-level UE-specific control information;
refraining from demodulating the TTI-level common control information based at least in part on receiving the SPS information; and
demodulating the TTI-level UE-specific control information at the location identified by the SPS information and based at least in part on receiving the SPS information.

2. The method of claim 1, wherein:
the pointer comprises resource block (RB) allocation information for the location of the TTI-level UE-specific control information.

3. The method of claim 1, wherein the SPS information indicating the semi-persistent resources is received prior to identifying the TTI.

4. The method of claim 1, further comprising:
tuning to a first frequency range to receive the TTI-level common control information;
tuning to a second frequency range to receive data and the TTI-level UE-specific control information, where in the second frequency range is different from the first frequency range; and
releasing the SPS information based at least in part on the TTI-level UE-specific control information.

5. The method of claim 4, wherein
releasing the SPS information is performed without retuning to the first frequency range.

6. The method of claim 4, wherein:
the TTI-level UE-specific control information is time-division multiplexed with the data and indicates whether to release the SPS information.

7. The method of claim 1, further comprising:
identifying a resource block that includes the TTI-level UE-specific control information; and
determining whether the identified resource block is assigned to the UE based at least in part on the TTI-level UE-specific control information.

8. The method of claim 7, wherein:
the determining occurs without decoding the TTI-level common control information.

9. The method of claim 7, further comprising:
performing an error check of the TTI-level UE-specific control information, wherein the determining is based at least in part on an outcome of the error check.

10. The method of claim 1, further comprising:
decoding a signal comprising a grouped payload and the TTI-level UE-specific control information, wherein the grouped payload comprises a first payload designated to the UE and a second payload designated to another UE; and
determining a portion of the signal that includes the second payload based at least in part on the TTI-level UE-specific control information.

11. The method of claim 1, further comprising:
identifying and demodulating broadcast control information received as unicast information in the TTI-level UE-specific control information.

12. The method of claim 1, wherein:
the location of the TTI-level UE-specific control information is at an intersection of a subset of time resources within the TTI and a subset of frequency resources within the TTI, and wherein the TTI-level common control information and the TTI-level UE-specific control information are non-overlapping.

13. The method of claim 1, further comprising:
receiving a first demodulation reference signal (DMRS) within the cascaded control information; and
demodulating the TTI-level common control information based at least in part on the first DMRS.

14. The method of claim 13, further comprising:
determining the cascaded control information comprises an incoming data assignment for the UE; and
demodulating a second TTI-level UE-specific control information based on the first DMRS, the second TTI-level UE-specific control information occupying a subset of frequency resources that follows the cascaded control information.

15. The method of claim 13, further comprising:
demodulating, based at least in part on a second DMRS received in a second TTI, at least one of an FDM control region or data region in the second TTI.

16. The method of claim 1, further comprising:
demodulating a second cascaded control information at an intersection of a second subset of time resources within a second TTI and a second subset of frequency resources within the second TTI; and
determining, from a second TTI-level common control information received in the second cascaded control information, that the second TTI does not contain a transmission for the UE.

17. The method of claim 16, further comprising:
entering a microsleep for a remainder of the second TTI upon determining that the second TTI does not contain the transmission for the UE.

18. An apparatus for wireless communication, in a system comprising:
a processor;
memory coupled with the processor; and
the processor and memory configured to:
identify a transmission time interval (TTI) comprising cascaded control information, the cascaded control information comprising TTI-level common control information and TTI-level UE-specific control information, the TTI-level common control information having a pointer to a location of the TTI-level UE-specific control information;
receive semi-persistent scheduling (SPS) information indicating semi- persistent resources, the SPS information identifying the location of the TTI-level UE-specific control information;

refrain from demodulating the TTI-level common control information based at least in part on receiving the SPS information; and demodulate the TTI-level UE-specific control information at the location identified by the SPS information and based at least in part on receiving the SPS information.

19. The apparatus of claim 18, wherein the SPS information indicating the semi-persistent resources is received prior to identifying the TTI.

20. The apparatus of claim 18, wherein the processor and memory further configured to:

tune to a first frequency range to receive the TTI-level common control information;

tune to a second frequency range to receive data and the TTI-level UE-specific control information, where in the second frequency range is different from the first frequency range; and release the SPS information based at least in part on the TTI-level UE-specific control information.

21. The apparatus of claim 18, wherein the processor and memory further configured to:

identify a resource block that includes the TTI-level UE-specific control information; and determine whether the identified resource block is assigned to the apparatus based at least in part on the TTI-level UE-specific control information.

22. The apparatus of claim 18, wherein the processor and memory further configured to:

decode a signal comprising a grouped payload and the TTI-level UE-specific control information, wherein the grouped payload comprises a first payload designated to the apparatus and a second payload designated to another user equipment (UE); and determine a portion of the signal that includes the second payload based at least in part on the TTI-level UE-specific control information.

23. The apparatus of claim 18, wherein:

the location of the TTI-level UE-specific control information is at an intersection of a subset of time resources within the TTI and a subset of frequency resources within the TTI, and wherein the TTI-level common control information and the TTI-level UE-specific control information are non-overlapping.

24. The apparatus of claim 18, wherein the processor and memory further configured to:

receive a first demodulation reference signal (DMRS) within the cascaded control information; and demodulate the TTI-level common control information based at least in part on the first DMRS.

25. The apparatus of claim 18, wherein the processor and memory further configured to:

demodulate a second cascaded control information at a second intersection of a second subset of time resources within a second TTI and a second subset of frequency resources within the second TTI; and determine, from a second TTI-level common control information received in the second cascaded control information, that the second TTI does not contain a transmission for the apparatus.

26. An apparatus for wireless communication at a user equipment (UE), comprising:

means for identifying a transmission time interval (TTI) comprising cascaded control information, the cascaded control information comprising TTI-level common control information and TTI-level UE-specific control information, the TTI-level common control information having a pointer to a location of the TTI-level UE-specific control information;

means for receiving semi-persistent scheduling (SPS) information indicating semi-persistent resources, the SPS information identifying the location of the TTI-level UE-specific control information;

means for refraining from demodulating the TTI-level common control information based at least in part on receiving the SPS information; and means for demodulating the TTI-level UE-specific control information at the location identified by the SPS information and based at least in part on receiving the SPS information.

27. A non-transitory computer readable medium storing code for wireless communication at a user equipment (UE), the code comprising instructions executable by a processor to:

identify a transmission time interval (TTI) comprising cascaded control information, the cascaded control information comprising TTI-level common control information and TTI-level UE-specific control information, the TTI-level common control information having a pointer to a location of the TTI-level UE-specific control information;

receive semi-persistent scheduling (SPS) information indicating semi-persistent resources, the SPS information identifying the location of the TTI-level UE-specific control information;

refrain from demodulating the TTI-level common control information based at least in part on receiving the SPS information; and demodulate the TTI-level UE-specific control information at the location identified by the SPS information and based at least in part on receiving the SPS information.

* * * * *